(12) United States Patent
Jung et al.

(10) Patent No.: US 11,436,757 B2
(45) Date of Patent: Sep. 6, 2022

(54) XR DEVICE AND METHOD FOR CONTROLLING THE SAME

(71) Applicant: LG ELECTRONICS INC., Seoul (KR)

(72) Inventors: Junyoung Jung, Seoul (KR); Aettie Ji, Seoul (KR); Kihyung Lee, Seoul (KR); Kyungjin Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/880,915

(22) Filed: May 21, 2020

(65) Prior Publication Data

US 2021/0192787 A1 Jun. 24, 2021

(30) Foreign Application Priority Data

Dec. 24, 2019 (KR) .......................... 10-2019-0174376

(51) Int. Cl.
*G06V 20/20* (2022.01)
*G06T 7/80* (2017.01)
(Continued)

(52) U.S. Cl.
CPC ................ *G06T 7/80* (2017.01); *G06T 7/20* (2013.01); *G06T 7/536* (2017.01); *G06T 7/70* (2017.01);
(Continued)

(58) Field of Classification Search
CPC . G06T 7/536; G06T 11/60; G06T 7/80; G06T 7/70; G06T 7/20;
(Continued)

(56) References Cited

U.S. PATENT DOCUMENTS

| 2015/0029338 A1* | 1/2015 | Lee ...................... H04N 17/002 348/148 |
| 2016/0189429 A1* | 6/2016 | Mallinson ............ H04N 13/398 345/633 |

(Continued)

FOREIGN PATENT DOCUMENTS

KR 1020150064767 6/2015

OTHER PUBLICATIONS

PCT International Application No. PCT/KR2020/003546, Notification of Transmittal of the International Search Report and the Written Opinion of the International Searching Authority, or Declaration dated Sep. 17, 2020, 12 pages.

*Primary Examiner* — Syed Haider
(74) *Attorney, Agent, or Firm* — Lee, Hong, Degerman, Kang & Waimey PC

(57) ABSTRACT

The present disclosure relates to an XR device and a method for controlling the same, and more particularly, is applicable to a 5G communication technology field, a robot technology field, an autonomous technology field and an artificial intelligence (AI) technology field. The method for controlling an XR device of a vehicle includes acquiring a camera view by capturing an image in front of the vehicle; acquiring position information of the vehicle by detecting a position of the vehicle, acquiring movement information of the vehicle by detecting movement of the vehicle, and providing navigation of an augmented reality (AR) mode displaying at least one virtual object for guiding a path by overlapping the at least one virtual object on the camera view based on at least the position information of the vehicle or the movement information of the vehicle.

26 Claims, 35 Drawing Sheets

(51) Int. Cl.
  *G06T 7/20* (2017.01)
  *G06T 7/70* (2017.01)
  *G06T 7/536* (2017.01)
  *G06T 11/60* (2006.01)

(52) U.S. Cl.
  CPC .... *G06T 11/60* (2013.01); *G06T 2207/20084* (2013.01); *G06T 2207/20132* (2013.01); *G06T 2207/30244* (2013.01); *G06T 2207/30256* (2013.01); *G06T 2207/30261* (2013.01)

(58) Field of Classification Search
  CPC . G06T 2207/20084; G06T 2207/30256; G06T 2207/30261; G06T 2207/20132; G06T 2207/30244; G06K 9/00; G06F 3/011; G06V 20/20; G06V 20/588; G06V 10/82
  See application file for complete search history.

(56) References Cited

U.S. PATENT DOCUMENTS

| | | |
|---|---|---|
| 2017/0199049 A1 | 7/2017 | Cho et al. |
| 2017/0212633 A1* | 7/2017 | You ........................ G06F 3/0412 |
| 2019/0057552 A1* | 2/2019 | Ko ........................... G06T 17/05 |
| 2020/0271450 A1* | 8/2020 | Gorur Sheshagiri .. G01C 21/20 |

* cited by examiner

FIG. 5
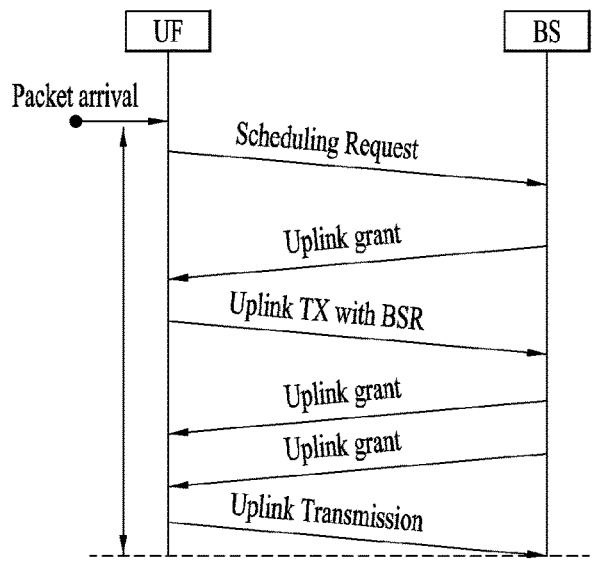
Fig. Uplink TX prcedure with grant
(a)
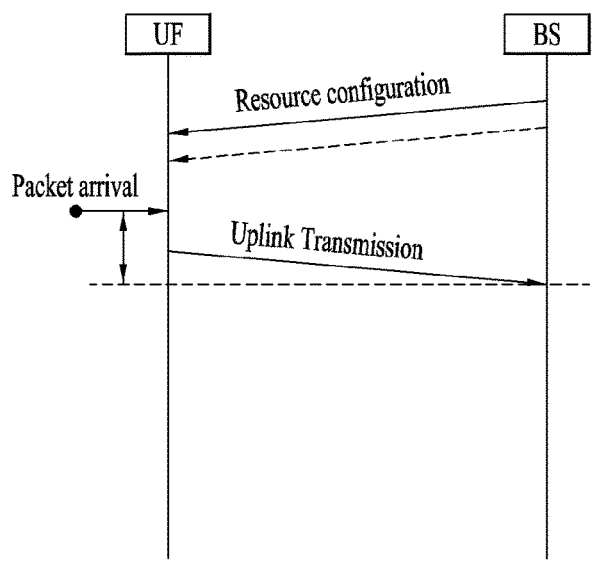
Fig. Uplink TX prcedure without grant
(b)

FIG. 27
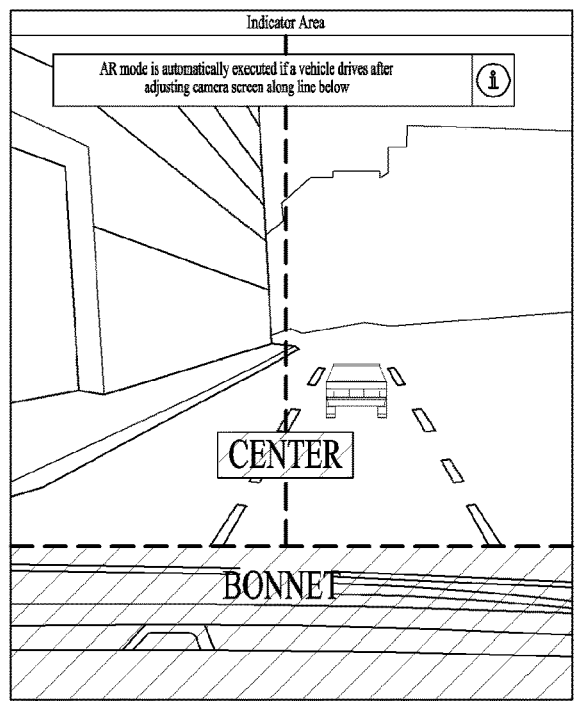
(a)
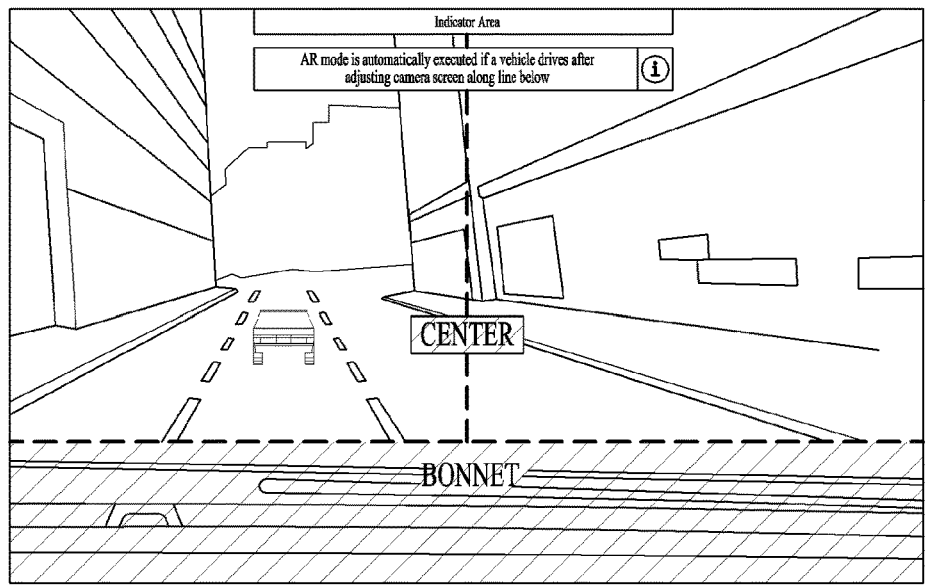
(b)

FIG. 28
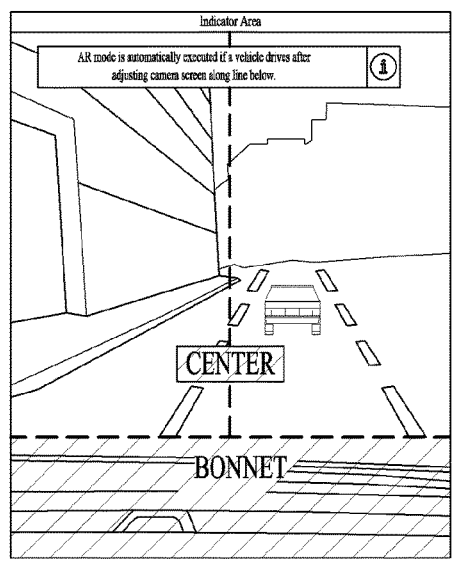
(a)
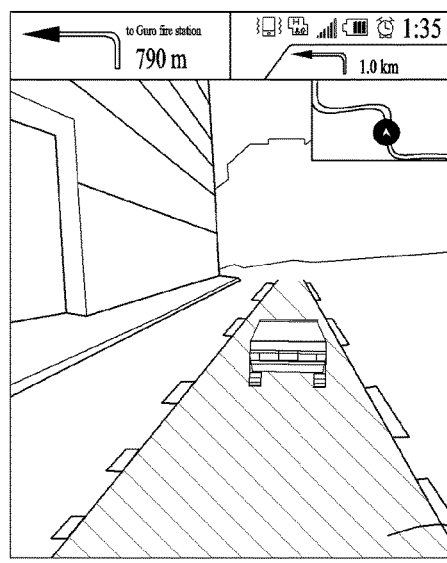
(b)
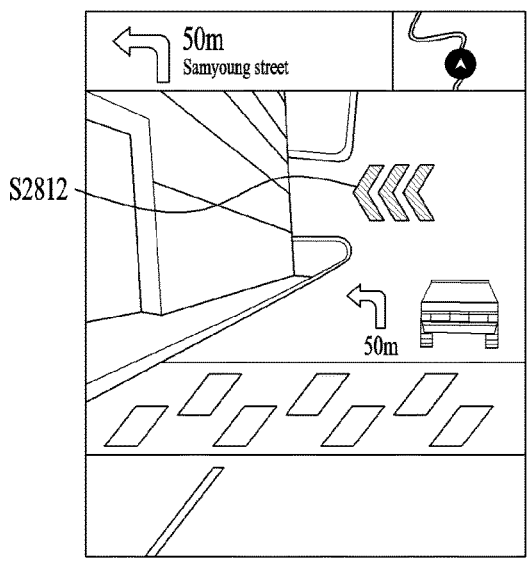
(c)
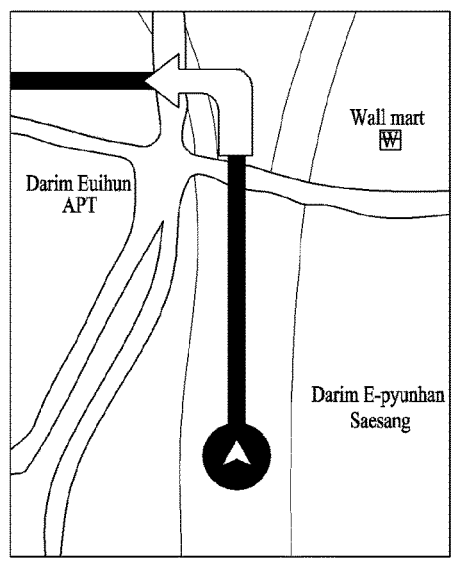
(d)

FIG. 31

| CHECK |
|---|
| Camera position and angle readjustment are required. Do you want to reset camera? |

| Switching to map mode | Camera reset |
|---|---|

FIG. 32
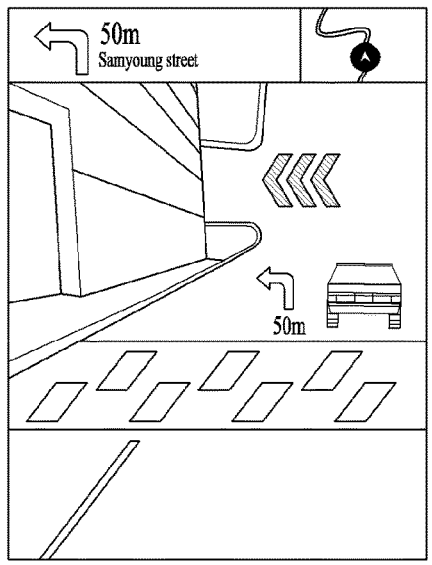
(a)
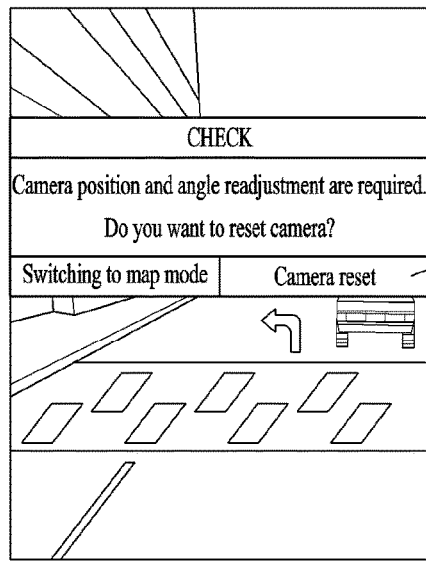
(b)
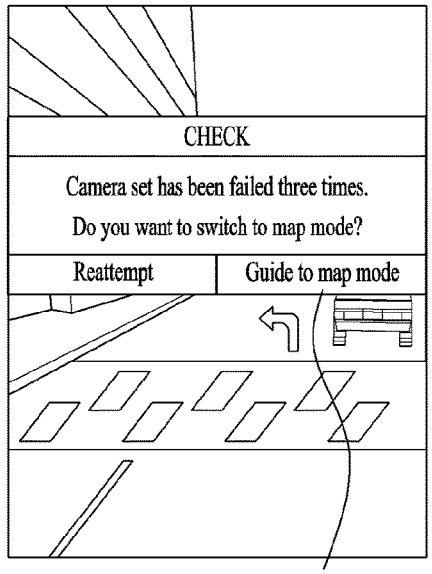
(c)
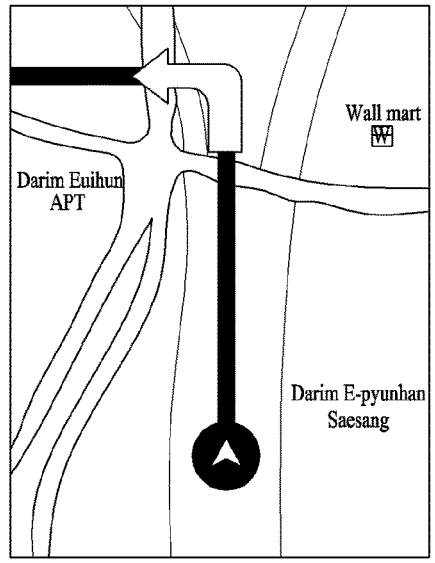
(d)

FIG. 36
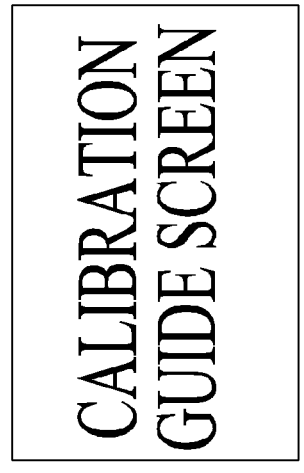
(a)
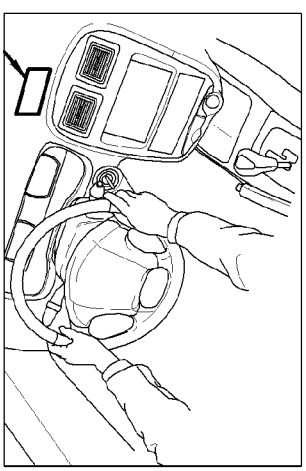
(b)

XR DEVICE AND METHOD FOR CONTROLLING THE SAME

Pursuant to 35 U.S.C. § 119(a), this application claims the benefit of earlier filing date and right of priority to Korean Patent Application No. 10-2019-0174376, filed on Dec. 24, 2019, the contents of which are hereby incorporated by reference herein in its entirety.

BACKGROUND OF THE INVENTION

Field of the Invention

The present disclosure relates to an extended reality (XR) device for providing augmented reality (AR) mode and virtual reality (VR) mode and a method of controlling the same. More particularly, the present disclosure is applicable to all of the technical fields of $5^{th}$ generation (5G) communication, robots, self-driving, and artificial intelligence (AI).

Discussion of the Related Art

Virtual reality (VR) simulates objects or a background in the real world only in computer graphic (CG) images. Augmented reality (AR) is an overlay of virtual CG images on images of objects in the real world. Mixed reality (MR) is a CG technology of merging the real world with virtual objects. All of VR, AR and MR are collectively referred to shortly as extended reality (XR).

A main example of the XR technology includes a navigation function. That is, if a navigation service is requested and a destination is input in an XR device, AR based virtual objects such as arrows are displayed to be overlapped on a real space displayed on a screen of the XR device and therefore navigation to a destination is guided to a user. However, since a camera for capturing a real space is generally provided in a portable XR device and then installed in a vehicle, its position may easily be changed due to movement and vibration characteristics of the vehicle. For this reason, a problem occurs in that it is difficult to render an AR view through AR based navigation.

SUMMARY OF THE INVENTION

Accordingly, the present disclosure is directed to an XR device and a method for controlling the same, which substantially obviate one or more problems due to limitations and disadvantages of the related art.

An object of the present disclosure is to provide an XR device and a method for controlling the same, in which calibration is performed for AR based navigation by using an XR device sensor and information of a camera view to display AR based virtual objects on a proper position of a camera preview.

Another object of the present disclosure is to provide an XR device and a method for controlling the same, in which obstacle elements displayed on a preview screen of a camera are cropped during calibration to allow a driver to sufficiently make sure of a road screen.

In addition to the objects of the present disclosure as mentioned above, additional objects and features of the present disclosure will be clearly understood by those skilled in the art from the following description of the present disclosure.

To achieve these objects and other advantages and in accordance with the purpose of the present disclosure, as embodied and broadly described herein, an XR device according to one aspect of the present disclosure comprises a camera module outputting a camera view by capturing an image in front of the vehicle, a position information detector outputting position information of the vehicle by detecting a position of the vehicle, a sensing module outputting movement information of the vehicle by detecting movement of the vehicle, and a processor providing navigation of an augmented reality (AR) mode displaying at least one virtual object for guiding a path by overlapping the at least one virtual object on the camera view based on at least the position information of the vehicle or the movement information of the vehicle, wherein the processor performs calibration based on the camera view, a vanish point of a road and a bonnet line of the vehicle included in the camera view, or the movement information of the vehicle.

In one embodiment, the processor manually performs calibration by receiving information related to the vanish point of the road and the bonnet line of the vehicle included in the camera view from a user.

In one embodiment, the processor automatically performs calibration by calculating the vanish point of the road and the bonnet line of the vehicle included in the camera view.

In one embodiment, the processor detects one or more lanes of the road included in the camera view and determines a point where the detected lanes meet, as the vanish point.

In one embodiment, the processor determines the bonnet line of the vehicle included in the camera view based on a deep neural network (DNN) model capable of learning position and time information.

In one embodiment, the processor performs calibration for matching a coordinate of the at least one virtual object with a coordinate of the camera view by controlling the coordinate of the camera view based on the vanish point of the road and the bonnet line of the vehicle included in the camera view.

In one embodiment, the processor maintains the AR mode if the calibration is successfully performed, and provides navigation of a map mode if the calibration is failed.

In one embodiment, the processor crops at least a portion of a bonnet of the vehicle included in the camera view based on the vanish point of the road and the bonnet line of the vehicle included in the camera view.

In one embodiment, the processor crops at least a portion of the bonnet of the vehicle included in the camera view before performing the calibration.

In one embodiment, the processor determines a region to be cropped, based on the vanish point of the road included in the camera view.

In another aspect of the present disclosure, a method for controlling an XR device of a vehicle comprises acquiring a camera view by capturing an image in front of the vehicle, acquiring position information of the vehicle by detecting a position of the vehicle, acquiring movement information of the vehicle by detecting movement of the vehicle, and providing navigation of an augmented reality (AR) mode displaying at least one virtual object for guiding a path by overlapping the at least one virtual object on the camera view based on at least the position information of the vehicle or the movement information of the vehicle, wherein the step of providing navigation further comprises performing calibration based on the camera view, a vanish point of a road and a bonnet line of the vehicle included in the camera view, or the movement information of the vehicle.

In one embodiment, the calibration step includes manually performing calibration by receiving information related to the vanish point of the road and the bonnet line of the vehicle included in the camera view from a user.

In one embodiment, the calibration step includes automatically performing calibration by calculating the vanish point of the road and the bonnet line of the vehicle included in the camera view.

In one embodiment, the calibration step includes detecting one or more lanes of the road included in the camera view and determining a point where the detected lanes meet, as the vanish point.

In one embodiment, the calibration step includes determining the bonnet line of the vehicle included in the camera view based on a deep neural network (DNN) model capable of learning position and time information.

In one embodiment, the calibration step includes performing calibration for matching a coordinate of the at least one virtual object with a coordinate of the camera view by controlling the coordinate of the camera view based on the vanish point of the road and the bonnet line of the vehicle included in the camera view.

In one embodiment, the step of providing navigation includes maintaining the AR mode if the calibration is successfully performed, and providing navigation of a map mode if the calibration is failed.

In one embodiment, the step of providing navigation further includes cropping at least a portion of a bonnet of the vehicle included in the camera view based on the vanish point of the road and the bonnet line of the vehicle included in the camera view.

In one embodiment, the step of cropping includes cropping at least a portion of the bonnet of the vehicle included in the camera view before performing the calibration.

In one embodiment, the step of cropping includes determining a region to be cropped, based on the vanish point of the road included in the camera view.

In the XR device and the method for controlling the same according to the embodiments of the present disclosure, virtual objects that include information for guiding a path or information related to road are displayed to be overlapped with each other on an image of a real space captured by a camera, whereby recognition of a driver for a corresponding place is enhanced. Particularly, although navigation information displayed on a map causes confusion, information related to road is displayed as it is, whereby there is no confusion in navigation, especially it is more effective for a complicated downtown or a first road.

In the XR device and the method for controlling the same according to the embodiments of the present disclosure, calibration may be performed for AR based navigation by using an XR device sensor and information of a camera view to display AR based virtual objects on a proper position of a camera preview.

In the XR device and the method for controlling the same according to the embodiments of the present disclosure, obstacle elements displayed on a preview screen of a camera may be cropped during calibration to allow a driver to sufficiently make sure of a road screen.

The embodiments of the present disclosure is applicable to all portable devices having mobility, in which AR based navigator is provided. Particularly, the XR device and the method for controlling the same according to the present specification are applicable to all statuses for providing AR based navigation by receiving an image of a camera which is not fixed. In this case, a driver may be guided a navigation with convenience regardless of an arrangement position of the portable XR device in a vehicle.

According to the embodiments of the present disclosure, a driver may remove inconvenience for changing an arrangement position of the XR device to display an AR object in the portable XR device arranged in a vehicle.

The XR device according to the embodiments of the present disclosure is applicable to HUD, CID, and all fields for autonomous driving, which use a portable camera not an ADAS camera fixed to a vehicle.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 5 is a diagram illustrating exemplary uplink (UL) transmission based on a UL grant;

FIG. 27 illustrates one example of a calibration guide screen when a navigation mode is set in a horizontal mode and one example of a calibration guide screen when a navigation mode is set in a vertical mode in an XR device according to the present disclosure;

FIG. 28 illustrates examples of a calibration guide screen, an AR mode and a map mode, which are displayed on a display module 2580 when a navigation mode of an XR device according to the present disclosure is set in a vertical mode;

FIG. 31 is a screen illustrating an example of a message for guiding calibration according to the present disclosure;

FIG. 32 illustrates examples of a navigation screen of an AR mode, guide messages related to calibration, and a navigation screen of a map mode according to the present disclosure;

FIG. 36 illustrates a method for arranging an XR device in a vehicle and an example of guiding calibration when a navigation app is executed in accordance with the present disclosure.

DETAILED DESCRIPTION OF THE INVENTION

Figure 1:
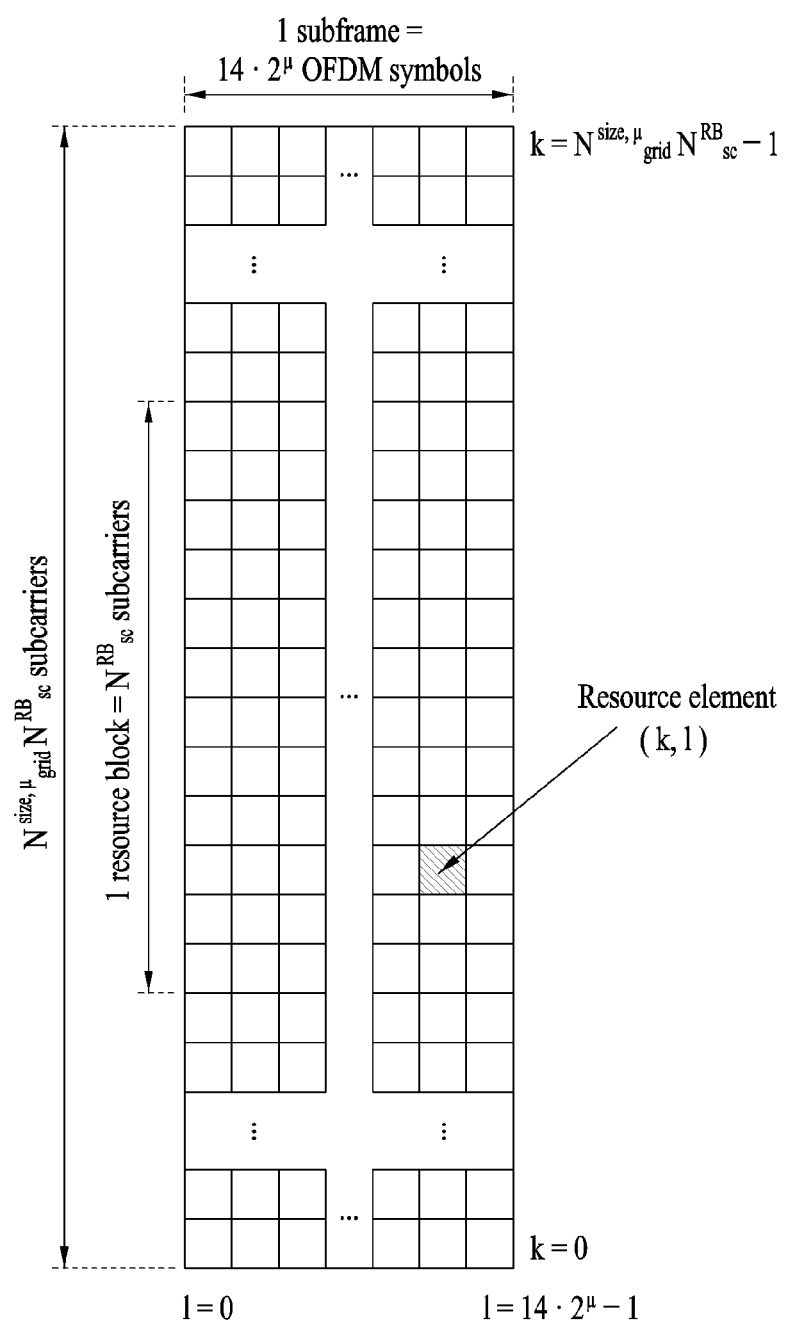
FIG. 1 is a diagram illustrating an exemplary resource grid to which physical signals/channels are mapped in a $3^{rd}$ generation partnership project (3GPP) system.

Reference will now be made in detail to embodiments of the present disclosure, examples of which are illustrated in the accompanying drawings. Wherever possible, the same reference numbers will be used throughout the drawings to refer to the same or like parts, and a redundant description will be avoided. The terms "module" and "unit" are interchangeably used only for easiness of description and thus they should not be considered as having distinctive meanings or roles. Further, a detailed description of well-known technology will not be given in describing embodiments of the present disclosure lest it should obscure the subject matter of the embodiments. The attached drawings are provided to help the understanding of the embodiments of the present disclosure, not limiting the scope of the present disclosure. It is to be understood that the present disclosure covers various modifications, equivalents, and/or alternatives falling within the scope and spirit of the present disclosure.

The following embodiments of the present disclosure are intended to embody the present disclosure, not limiting the scope of the present disclosure. What could easily be derived from the detailed description of the present disclosure and the embodiments by a person skilled in the art is interpreted as falling within the scope of the present disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INTRODUCTION

In the disclosure, downlink (DL) refers to communication from a base station (BS) to a user equipment (UE), and uplink (UL) refers to communication from the UE to the BS. On DL, a transmitter may be a part of the BS and a receiver may be a part of the UE, whereas on UL, a transmitter may be a part of the UE and a receiver may be a part of the BS. A UE may be referred to as a first communication device, and a BS may be referred to as a second communication device in the present disclosure. The term BS may be replaced with fixed station, Node B, evolved Node B (eNB), next generation Node B (gNB), base transceiver system (BTS), access point (AP), network or $5^{th}$ generation (5G) network node, artificial intelligence (AI) system, road side unit (RSU), robot, augmented reality/virtual reality (AR/VR) system, and so on. The term UE may be replaced with terminal, mobile station (MS), user terminal (UT), mobile subscriber station (MSS), subscriber station (SS), advanced mobile station (AMS), wireless terminal (WT), device-to-device (D2D) device, vehicle, robot, AI device (or module), AR/VR device (or module), and so on.

The following technology may be used in various wireless access systems including code division multiple access (CDMA), frequency division multiple access (FDMA), time division multiple access (TDMA), orthogonal frequency division multiple access (OFDMA), and single carrier FDMA (SC-FDMA).

For the convenience of description, the present disclosure is described in the context of a $3^{rd}$ generation partnership project (3GPP) communication system (e.g., long term evolution-advanced (LTE-A) and new radio or new radio access technology (NR)), which should not be construed as limiting the present disclosure. For reference, 3GPP LTE is part of evolved universal mobile telecommunications system (E-UMTS) using evolved UMTS terrestrial radio access (E-UTRA), and LTE-A/LTE-A pro is an evolution of 3GPP LTE. 3GPP NR is an evolution of 3GPP/LTE-A/LTE-A pro.

In the present disclosure, a node refers to a fixed point capable of transmitting/receiving wireless signals by communicating with a UE. Various types of BSs may be used as nodes irrespective of their names. For example, any of a BS, an NB, an eNB, a pico-cell eNB (PeNB), a home eNB (HeNB), a relay, and a repeater may be a node. At least one antenna is installed in one node. The antenna may refer to a physical antenna, an antenna port, a virtual antenna, or an antenna group. A node is also referred to as a point.

In the present disclosure, a cell may refer to a certain geographical area or radio resources, in which one or more nodes provide a communication service. A "cell" as a geographical area may be understood as coverage in which a service may be provided in a carrier, while a "cell" as radio resources is associated with the size of a frequency configured in the carrier, that is, a bandwidth (BW). Because a range in which a node may transmit a valid signal, that is, DL coverage and a range in which the node may receive a valid signal from a UE, that is, UL coverage depend on a carrier carrying the signals, and thus the coverage of the node is associated with the "cell" coverage of radio resources used by the node. Accordingly, the term "cell" may mean the service overage of a node, radio resources, or a range in which a signal reaches with a valid strength in the radio resources, under circumstances.

In the present disclosure, communication with a specific cell may amount to communication with a BS or node that provides a communication service to the specific cell. Further, a DL/UL signal of a specific cell means a DL/UL signal from/to a BS or node that provides a communication service to the specific cell. Particularly, a cell that provides a UL/DL communication service to a UE is called a serving cell for the UE. Further, the channel state/quality of a specific cell refers to the channel state/quality of a channel or a communication link established between a UE and a BS or node that provides a communication service to the specific cell.

A "cell" associated with radio resources may be defined as a combination of DL resources and UL resources, that is, a combination of a DL component carrier (CC) and a UL CC. A cell may be configured with DL resources alone or both DL resources and UL resources in combination. When carrier aggregation (CA) is supported, linkage between the carrier frequency of DL resources (or a DL CC) and the carrier frequency of UL resources (or a UL CC) may be indicated by system information transmitted in a corresponding cell. A carrier frequency may be identical to or different from the center frequency of each cell or CC. Hereinbelow, a cell operating in a primary frequency is referred to as a primary cell (Pcell) or PCC, and a cell operating in a secondary frequency is referred to as a secondary cell (Scell) or SCC. The Scell may be configured after a UE and a BS perform a radio resource control (RRC) connection establishment procedure and thus an RRC connection is established between the UE and the BS, that is, the UE is RRC_CONNECTED. The RRC connection may mean a path in which the RRC of the UE may exchange RRC messages with the RRC of the BS. The Scell may be configured to provide additional radio resources to the UE. The Scell and the Pcell may form a set of serving cells for the UE according to the capabilities of the UE. Only one serving cell configured with a Pcell exists for an RRC_CONNECTED UE which is not configured with CA or does not support CA.

A cell supports a unique radio access technology (RAT). For example, LTE RAT-based transmission/reception is performed in an LTE cell, and 5G RAT-based transmission/reception is performed in a 5G cell.

CA aggregates a plurality of carriers each having a smaller system BW than a target BW to support broadband. CA differs from OFDMA in that DL or UL communication is conducted in a plurality of carrier frequencies each forming a system BW (or channel BW) in the former, and DL or UL communication is conducted by loading a basic frequency band divided into a plurality of orthogonal subcarriers in one carrier frequency in the latter. In OFDMA or orthogonal frequency division multiplexing (OFDM), for example, one frequency band having a certain system BW is divided into a plurality of subcarriers with a predetermined subcarrier spacing, information/data is mapped to the plurality of subcarriers, and the frequency band in which the information/data has been mapped is transmitted in a carrier frequency of the frequency band through frequency upconversion. In wireless CA, frequency bands each having a system BW and a carrier frequency may be used simultaneously for communication, and each frequency band used in CA may be divided into a plurality of subcarriers with a predetermined subcarrier spacing.

The 3GPP communication standards define DL physical channels corresponding to resource elements (REs) conveying information originated from upper layers of the physical layer (e.g., the medium access control (MAC) layer, the radio link control (RLC) layer, the packet data convergence protocol (PDCP) layer, the radio resource control (RRC) layer, the service data adaptation protocol (SDAP) layer, and the non-access stratum (NAS) layer), and DL physical signals corresponding to REs which are used in the physical layer but do not deliver information originated from the upper layers. For example, physical downlink shared channel (PDSCH), physical broadcast channel (PBCH), physical multicast channel (PMCH), physical control format indicator channel (PCFICH), and physical downlink control channel (PDCCH) are defined as DL physical channels, and a reference signal (RS) and a synchronization signal are defined as DL physical signals. An RS, also called a pilot is a signal in a predefined special waveform known to both a BS and a UE. For example, cell specific RS (CRS), UE-specific RS (UE-RS), positioning RS (PRS), channel state information RS (CSI-RS), and demodulation RS (DMRS) are defined as DL RSs. The 3GPP communication standards also define UL physical channels corresponding to REs conveying information originated from upper layers, and UL physical signals corresponding to REs which are used in the physical layer but do not carry information originated from the upper layers. For example, physical uplink shared channel (PUSCH), physical uplink control channel (PUCCH), and physical random access channel (PRACH) are defined as UL physical channels, and DMRS for a UL control/data signal and sounding reference signal (SRS) used for UL channel measurement are defined.

In the present disclosure, physical shared channels (e.g., PUSCH and PDSCH) are used to deliver information originated from the upper layers of the physical layer (e.g., the MAC layer, the RLC layer, the PDCP layer, the RRC layer, the SDAP layer, and the NAS layer).

In the present disclosure, an RS is a signal in a predefined special waveform known to both a BS and a UE. In a 3GPP communication system, for example, the CRS being a cell common RS, the UE-RS for demodulation of a physical channel of a specific UE, the CSI-RS used to measure/estimate a DL channel state, and the DMRS used to demodulate a physical channel are defined as DL RSs, and the DMRS used for demodulation of a UL control/data signal and the SRS used for UL channel state measurement/estimation are defined as UL RSs.

In the present disclosure, a transport block (TB) is payload for the physical layer. For example, data provided to the physical layer by an upper layer or the MAC layer is basically referred to as a TB. A UE which is a device including an AR/VR module (i.e., an AR/VR device) may transmit a TB including AR/VR data to a wireless communication network (e.g., a 5G network) on a PUSCH. Further, the UE may receive a TB including AR/VR data of the 5G network or a TB including a response to AR/VR data transmitted by the UE from the wireless communication network.

In the present disclosure, hybrid automatic repeat and request (HARQ) is a kind of error control technique. An HARQ acknowledgement (HARQ-ACK) transmitted on DL is used for error control of UL data, and a HARQ-ACK transmitted on UL is used for error control of DL data. A transmitter performing an HARQ operation awaits reception of an ACK after transmitting data (e.g., a TB or a codeword). A receiver performing an HARQ operation transmits an ACK only when data has been successfully received, and a negative ACK (NACK) when the received data has an error. Upon receipt of the ACK, the transmitter may transmit (new) data, and upon receipt of the NACK, the transmitter may retransmit the data.

In the present disclosure, CSI generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

In the present disclosure, frequency division multiplexing (FDM) is transmission/reception of signals/channels/users in different frequency resources, and time division multiplexing (TDM) is transmission/reception of signals/channels/users in different time resources.

In the present disclosure, frequency division duplex (FDD) is a communication scheme in which UL communication is performed in a UL carrier, and DL communication is performed in a DL carrier linked to the UL carrier, whereas time division duplex (TDD) is a communication scheme in which UL communication and DL communication are performed in time division in the same carrier. In the present disclosure, half-duplex is a scheme in which a communication device operates on UL or UL only in one frequency at one time point, and on DL or UL in another frequency at another time point. For example, when the communication device operates in half-duplex, the communication device communicates in UL and DL frequencies, wherein the communication device performs a UL transmission in the UL frequency for a predetermined time, and retunes to the DL frequency and performs a DL reception in the DL frequency for another predetermined time, in time division, without simultaneously using the UL and DL frequencies.

FIG. 1 is a diagram illustrating an exemplary resource grid to which physical signals/channels are mapped in a 3GPP system.

Referring to FIG. 1, for each subcarrier spacing configuration and carrier, a resource grid of $N^{size,\mu}_{grid} \ast N^{RB}_{sc}$ subcarriers by $14 \cdot 2^{\mu}$ OFDM symbols is defined. Herein, $N^{size,\mu}_{grid}$ is indicated by RRC signaling from a BS, and $\rho$ represents a subcarrier spacing $\Delta f$ given by $\Delta f = 2^{\mu} \ast 15$ [kHz] where $\mu \in \{0, 1, 2, 3, 4\}$ in a 5G system.

$N^{size,\mu}_{grid}$ may be different between UL and DL as well as a subcarrier spacing configuration $\mu$. For the subcarrier spacing configuration $\mu$, an antenna port p, and a transmission direction (UL or DL), there is one resource grid. Each element of a resource grid for the subcarrier spacing configuration $\mu$ and the antenna port p is referred to as an RE, uniquely identified by an index pair (k,l) where k is a frequency-domain index and l is the position of a symbol in a relative time domain with respect to a reference point. A frequency unit used for mapping physical channels to REs, resource block (RB) is defined by 12 consecutive subcarriers ($N^{RB}_{sc} = 12$) in the frequency domain. Considering that a UE may not support a wide BW supported by the 5G system at one time, the UE may be configured to operate in a part (referred to as a bandwidth part (BWP)) of the frequency BW of a cell.

For the background technology, terminology, and abbreviations used in the present disclosure, standard specifications published before the present disclosure may be referred to. For example, the following documents may be referred to.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP TS 23.303: Proximity-based services (Prose); Stage 2
3GPP TS 23.285: Architecture enhancements for V2X services
3GPP TS 23.401: General Packet Radio Service (GPRS) enhancements for Evolved Universal Terrestrial Radio Access Network (E-UTRAN) access
3GPP TS 23.402: Architecture enhancements for non-3GPP accesses
3GPP TS 23.286: Application layer support for V2X services; Functional architecture and information flows
3GPP TS 24.301: Non-Access-Stratum (NAS) protocol for Evolved Packet System (EPS); Stage 3
3GPP TS 24.302: Access to the 3GPP Evolved Packet Core (EPC) via non-3GPP access networks; Stage 3
3GPP TS 24.334: Proximity-services (ProSe) User Equipment (UE) to ProSe function protocol aspects; Stage 3
3GPP TS 24.386: User Equipment (UE) to V2X control function; protocol aspects; Stage 3
3GPP NR (e.g. 5G)
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description
3GPP TS 23.287: Application layer support for V2X services; Functional architecture and information flows
3GPP TS 23.501: System Architecture for the 5G System
3GPP TS 23.502: Procedures for the 5G System 3GPP TS 23.503: Policy and Charging Control Framework for the 5G System; Stage 2

3GPP TS 24.501: Non-Access-Stratum (NAS) protocol for 5G System (5GS); Stage 3

3GPP TS 24.502: Access to the 3GPP 5G Core Network (5GCN) via non-3GPP access networks 3GPP TS 24.526: User Equipment (UE) policies for 5G System (5GS); Stage 3

Figure 2:
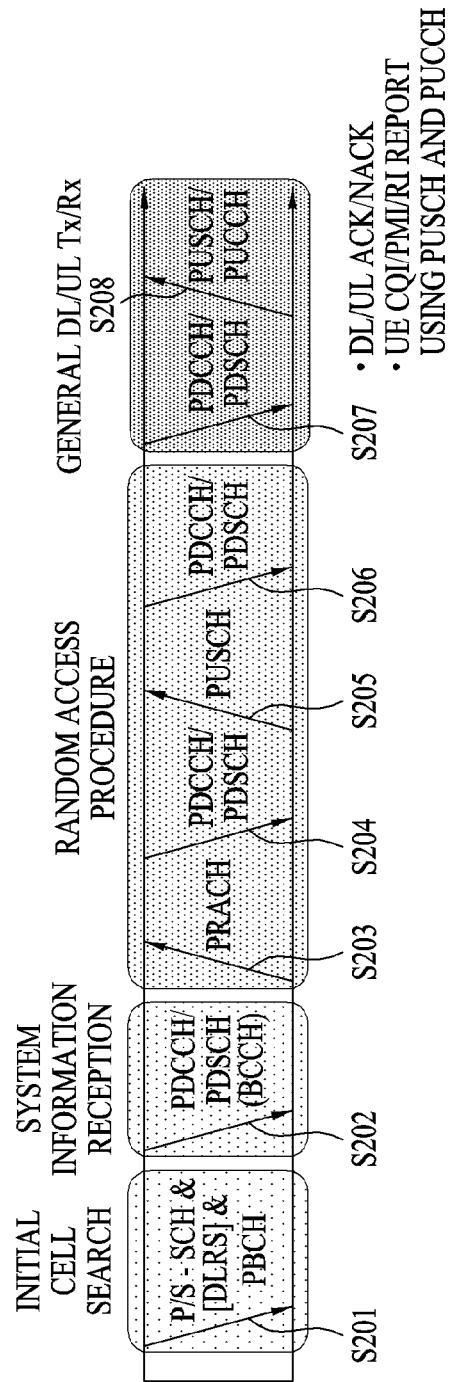
FIG. 2 is a diagram illustrating an exemplary method of transmitting and receiving 3GPP signals.

FIG. 2 is a diagram illustrating an exemplary method of transmitting/receiving 3GPP signals.

Referring to FIG. 2, when a UE is powered on or enters a new cell, the UE performs an initial cell search involving acquisition of synchronization with a BS (S201). For the initial cell search, the UE receives a primary synchronization channel (P-SCH) and a secondary synchronization channel (S-SCH), acquires synchronization with the BS, and obtains information such as a cell identifier (ID) from the P-SCH and the S-SCH. In the LTE system and the NR system, the P-SCH and the S-SCH are referred to as a primary synchronization signal (PSS) and a secondary synchronization signal (SSS), respectively. The initial cell search procedure will be described below in greater detail.

After the initial cell search, the UE may receive a PBCH from the BS and acquire broadcast information within a cell from the PBCH. During the initial cell search, the UE may check a DL channel state by receiving a DL RS.

Upon completion of the initial cell search, the UE may acquire more specific system information by receiving a PDCCH and receiving a PDSCH according to information carried on the PDCCH (S202).

When the UE initially accesses the BS or has no radio resources for signal transmission, the UE may perform a random access procedure with the BS (S203 to S206). For this purpose, the UE may transmit a predetermined sequence as a preamble on a PRACH (S203 and S205) and receive a PDCCH, and a random access response (RAR) message in response to the preamble on a PDSCH corresponding to the PDCCH (S204 and S206). If the random access procedure is contention-based, the UE may additionally perform a contention resolution procedure. The random access procedure will be described below in greater detail.

After the above procedure, the UE may then perform PDCCH/PDSCH reception (S207) and PUSCH/PUCCH transmission (S208) in a general UL/DL signal transmission procedure. Particularly, the UE receives DCI on a PDCCH.

The UE monitors a set of PDCCH candidates in monitoring occasions configured for one or more control element sets (CORESETs) in a serving cell according to a corresponding search space configuration. The set of PDCCH candidates to be monitored by the UE is defined from the perspective of search space sets. A search space set may be a common search space set or a UE-specific search space set. A CORESET includes a set of (physical) RBs that last for a time duration of one to three OFDM symbols. The network may configure a plurality of CORESETs for the UE. The UE monitors PDCCH candidates in one or more search space sets. Herein, monitoring is attempting to decode PDCCH candidate(s) in a search space. When the UE succeeds in decoding one of the PDCCH candidates in the search space, the UE determines that a PDCCH has been detected from among the PDCCH candidates and performs PDSCH reception or PUSCH transmission based on DCI included in the detected PDCCH.

The PDCCH may be used to schedule DL transmissions on a PDSCH and UL transmissions on a PUSCH. DCI in the PDCCH includes a DL assignment (i.e., a DL grant) including at least a modulation and coding format and resource allocation information for a DL shared channel, and a UL grant including a modulation and coding format and resource allocation information for a UL shared channel.

Initial Access (IA) Procedure

Synchronization Signal Block (SSB) Transmission and Related Operation

Figure 3:
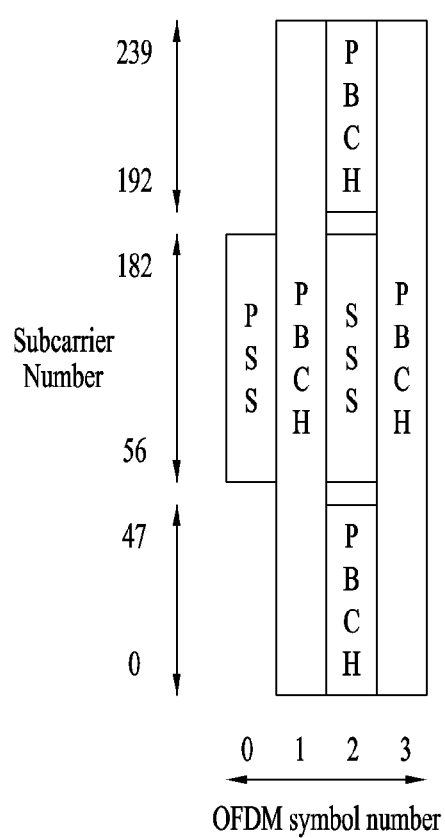
FIG. 3 is a diagram illustrating an exemplary structure of a synchronization signal block (SSB)

FIG. 3 is a diagram illustrating an exemplary SSB structure. The UE may perform cell search, system information acquisition, beam alignment for initial access, DL measurement, and so on, based on an SSB. The term SSB is interchangeably used with synchronization signal/physical broadcast channel (SS/PBCH).

Referring to FIG. 3, an SSB includes a PSS, an SSS, and a PBCH. The SSB includes four consecutive OFDM symbols, and the PSS, the PBCH, the SSS/PBCH, or the PBCH is transmitted in each of the OFDM symbols. The PBCH is encoded/decoded based on a polar code and modulated/demodulated in quadrature phase shift keying (QPSK). The PBCH in an OFDM symbol includes data REs to which a complex modulated value of the PBCH is mapped and DMRS REs to which a DMRS for the PBCH is mapped. There are three DMRS REs per RB in an OFDM symbol and three data REs between every two of the DMRS REs.

Cell Search

Cell search is a process of acquiring the time/frequency synchronization of a cell and detecting the cell ID (e.g., physical cell ID (PCI)) of the cell by a UE. The PSS is used to detect a cell ID in a cell ID group, and the SSS is used to detect the cell ID group. The PBCH is used for SSB (time) index detection and half-frame detection.

In the 5G system, there are 336 cell ID groups each including 3 cell IDs. Therefore, a total of 1008 cell IDs are available. Information about a cell ID group to which the cell ID of a cell belongs is provided/acquired by/from the SSS of the cell, and information about the cell ID among 336 cells within the cell ID is provided/acquired by/from the PSS.

The SSB is periodically transmitted with an SSB periodicity. The UE assumes a default SSB periodicity of 20 ms during initial cell search. After cell access, the SSB periodicity may be set to one of {5 ms, 10 ms, 20 ms, 40 ms, 80 ms, 160 ms} by the network (e.g., a BS). An SSB burst set is configured at the start of an SSB period. The SSB burst set is composed of a 5-ms time window (i.e., half-frame), and the SSB may be transmitted up to L times within the SSB burst set. The maximum number L of SSB transmissions may be given as follows according to the frequency band of a carrier.

For frequency range up to 3 GHz, L=4

For frequency range from 3 GHz to 6 GHz, L=8

For frequency range from 6 GHz to 52.6 GHz, L=64

The possible time positions of SSBs in a half-frame are determined by a subcarrier spacing, and the periodicity of half-frames carrying SSBs is configured by the network. The time positions of SSB candidates are indexed as 0 to L−1 (SSB indexes) in a time order in an SSB burst set (i.e., half-frame). Other SSBs may be transmitted in different spatial directions (by different beams spanning the coverage area of the cell) during the duration of a half-frame. Accordingly, an SSB index (SSBI) may be associated with a BS transmission (Tx) beam in the 5G system.

The UE may acquire DL synchronization by detecting an SSB. The UE may identify the structure of an SSB burst set based on a detected (time) SSBI and hence a symbol/slot/half-frame boundary. The number of a frame/half-frame to which the detected SSB belongs may be identified by using system frame number (SFN) information and half-frame indication information.

Specifically, the UE may acquire the 10-bit SFN of a frame carrying the PBCH from the PBCH. Subsequently, the UE may acquire 1-bit half-frame indication information. For example, when the UE detects a PBCH with a half-frame indication bit set to 0, the UE may determine that an SSB to which the PBCH belongs is in the first half-frame of the frame. When the UE detects a PBCH with a half-frame indication bit set to 1, the UE may determine that an SSB to which the PBCH belongs is in the second half-frame of the frame. Finally, the UE may acquire the SSBI of the SSB to which the PBCH belongs based on a DMRS sequence and PBCH payload delivered on the PBCH.

System Information (SI) Acquisition

SI is divided into a master information block (MIB) and a plurality of system information blocks (SIBs). The SI except for the MIB may be referred to as remaining minimum system information (RMSI). For details, the following may be referred to.

The MIB includes information/parameters for monitoring a PDCCH that schedules a PDSCH carrying systemInformationBlock1 (SIB1), and transmitted on a PBCH of an SSB by a BS. For example, a UE may determine from the MIB whether there is any CORESET for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB.

SIB1 includes information related to availability and scheduling (e.g., a transmission period and an SI-window size) of the remaining SIBs (hereinafter, referred to SIBx where x is an integer equal to or larger than 2). For example, SIB1 may indicate whether SIBx is broadcast periodically or in an on-demand manner upon user request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Random Access Procedure

The random access procedure serves various purposes. For example, the random access procedure may be used for network initial access, handover, and UE-triggered UL data transmission. The UE may acquire UL synchronization and UL transmission resources in the random access procedure. The random access procedure may be contention-based or contention-free.

Figure 4:
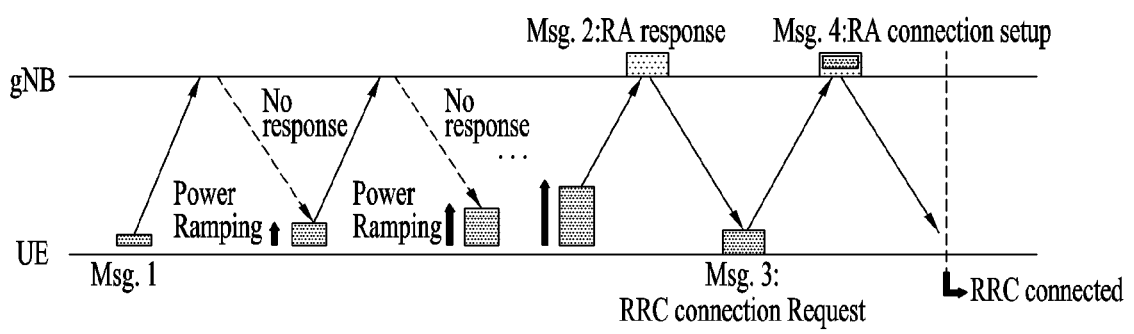
FIG. 4 is a diagram illustrating an exemplary random access procedure.

FIG. 4 is a diagram illustrating an exemplary random access procedure. Particularly, FIG. 4 illustrates a contention-based random access procedure.

First, a UE may transmit a random access preamble as a first message (Msg1) of the random access procedure on a PRACH. In the present disclosure, a random access procedure and a random access preamble are also referred to as a RACH procedure and a RACH preamble, respectively.

A plurality of preamble formats are defined by one or more RACH OFDM symbols and different cyclic prefixes (CPs) (and/or guard times). A RACH configuration for a cell is included in system information of the cell and provided to the UE. The RACH configuration includes information about a subcarrier spacing, available preambles, a preamble format, and so on for a PRACH. The RACH configuration includes association information between SSBs and RACH (time-frequency) resources, that is, association information between SSBIs and RACH (time-frequency) resources. The SSBIs are associated with Tx beams of a BS, respectively. The UE transmits a RACH preamble in RACH time-frequency resources associated with a detected or selected SSB. The BS may identify a preferred BS Tx beam of the UE based on time-frequency resources in which the RACH preamble has been detected.

An SSB threshold for RACH resource association may be configured by the network, and a RACH preamble transmission (i.e., PRACH transmission) or retransmission is performed based on an SSB in which an RSRP satisfying the threshold has been measured. For example, the UE may select one of SSB(s) satisfying the threshold and transmit or retransmit the RACH preamble in RACH resources associated with the selected SSB.

Upon receipt of the RACH preamble from the UE, the BS transmits an RAR message (a second message (Msg2)) to the UE. A PDCCH that schedules a PDSCH carrying the RAR message is cyclic redundancy check (CRC)-masked by an RA radio network temporary identifier (RNTI) (RA-RNTI) and transmitted. When the UE detects the PDCCH masked by the RA-RNTI, the UE may receive the RAR message on the PDSCH scheduled by DCI delivered on the PDCCH. The UE determines whether RAR information for the transmitted preamble, that is, Msg1 is included in the RAR message. The UE may determine whether random access information for the transmitted Msg1 is included by checking the presence or absence of the RACH preamble ID of the transmitted preamble. If the UE fails to receive a response to Msg1, the UE may transmit the RACH preamble a predetermined number of or fewer times, while performing power ramping. The UE calculates the PRACH transmission power of a preamble retransmission based on the latest pathloss and a power ramping counter.

Upon receipt of the RAR information for the UE on the PDSCH, the UE may acquire timing advance information for UL synchronization, an initial UL grant, and a UE temporary cell RNTI (C-RNTI). The timing advance information is used to control a UL signal transmission timing. To enable better alignment between PUSCH/PUCCH transmission of the UE and a subframe timing at a network end, the network (e.g., BS) may measure the time difference between PUSCH/PUCCH/SRS reception and a subframe and transmit the timing advance information based on the measured time difference. The UE may perform a UL transmission as a third message (Msg3) of the RACH procedure on a PUSCH. Msg3 may include an RRC connection request and a UE ID. The network may transmit a fourth message (Msg4) in response to Msg3, and Msg4 may be treated as a contention solution message on DL. As the UE receives Msg4, the UE may enter an RRC_CONNECTED state.

The contention-free RACH procedure may be used for handover of the UE to another cell or BS or performed when requested by a BS command. The contention-free RACH procedure is basically similar to the contention-based RACH procedure. However, compared to the contention-based RACH procedure in which a preamble to be used is randomly selected among a plurality of RACH preambles, a preamble to be used by the UE (referred to as a dedicated RACH preamble) is allocated to the UE by the BS in the contention-free RACH procedure. Information about the dedicated RACH preamble may be included in an RRC message (e.g., a handover command) or provided to the UE by a PDCCH order. When the RACH procedure starts, the UE transmits the dedicated RACH preamble to the BS. When the UE receives the RACH procedure from the BS, the RACH procedure is completed.

DL and UL Transmission/Reception Operations

DL Transmission/Reception Operation

DL grants (also called DL assignments) may be classified into (1) dynamic grant and (2) configured grant. A dynamic grant is a data transmission/reception method based on dynamic scheduling of a BS, aiming to maximize resource utilization.

The BS schedules a DL transmission by DCI. The UE receives the DCI for DL scheduling (i.e., including scheduling information for a PDSCH) (referred to as DL grant DCI) from the BS. The DCI for DL scheduling may include, for example, the following information: a BWP indicator, a frequency-domain resource assignment, a time-domain resource assignment, and a modulation and coding scheme (MCS).

The UE may determine a modulation order, a target code rate, and a TB size (TBS) for the PDSCH based on an MCS field in the DCI. The UE may receive the PDSCH in time-frequency resources according to the frequency-domain resource assignment and the time-domain resource assignment.

The DL configured grant is also called semi-persistent scheduling (SPS). The UE may receive an RRC message including a resource configuration for DL data transmission from the BS. In the case of DL SPS, an actual DL configured grant is provided by a PDCCH, and the DL SPS is activated or deactivated by the PDCCH. When DL SPS is configured, the BS provides the UE with at least the following parameters by RRC signaling: a configured scheduling RNTI (CS-RNTI) for activation, deactivation, and retransmission; and a periodicity. An actual DL grant (e.g., a frequency resource assignment) for DL SPS is provided to the UE by DCI in a PDCCH addressed to the CS-RNTI. If a specific field in the DCI of the PDCCH addressed to the CS-RNTI is set to a specific value for scheduling activation, SPS associated with the CS-RNTI is activated. The DCI of the PDCCH addressed to the CS-RNTI includes actual frequency resource allocation information, an MCS index, and so on. The UE may receive DL data on a PDSCH based on the SPS.

UL Transmission/Reception Operation

UL grants may be classified into (1) dynamic grant that schedules a PUSCH dynamically by UL grant DCI and (2) configured grant that schedules a PUSCH semi-statically by RRC signaling.

FIG. 5 is a diagram illustrating exemplary UL transmissions according to UL grants. Particularly, FIG. 5(a) illustrates a UL transmission procedure based on a dynamic grant, and FIG. 5(b) illustrates a UL transmission procedure based on a configured grant.

In the case of a UL dynamic grant, the BS transmits DCI including UL scheduling information to the UE. The UE receives DCI for UL scheduling (i.e., including scheduling information for a PUSCH) (referred to as UL grant DCI) on a PDCCH. The DCI for UL scheduling may include, for example, the following information: a BWP indicator, a frequency-domain resource assignment, a time-domain resource assignment, and an MCS. For efficient allocation of UL radio resources by the BS, the UE may transmit information about UL data to be transmitted to the BS, and the BS may allocate UL resources to the UE based on the information. The information about the UL data to be transmitted is referred to as a buffer status report (BSR), and the BSR is related to the amount of UL data stored in a buffer of the UE.

Referring to FIG. 5(a), the illustrated UL transmission procedure is for a UE which does not have UL radio resources available for BSR transmission. In the absence of a UL grant available for UL data transmission, the UE is not capable of transmitting a BSR on a PUSCH. Therefore, the UE should request resources for UL data, starting with transmission of an SR on a PUCCH. In this case, a 5-step UL resource allocation procedure is used.

Referring to FIG. 5(a), in the absence of PUSCH resources for BSR transmission, the UE first transmits an SR to the BS, for PUSCH resource allocation. The SR is used for the UE to request PUSCH resources for UL transmission to the BS, when no PUSCH resources are available to the UE in spite of occurrence of a buffer status reporting event. In the presence of valid PUCCH resources for the SR, the UE transmits the SR on a PUCCH, whereas in the absence of valid PUCCH resources for the SR, the UE starts the afore-described (contention-based) RACH procedure. Upon receipt of a UL grant in UL grant DCI from the BS, the UE transmits a BSR to the BS in PUSCH resources allocated by the UL grant. The BS checks the amount of UL data to be transmitted by the UE based on the BSR and transmits a UL grant in UL grant DCI to the UE. Upon detection of a PDCCH including the UL grant DCI, the UE transmits actual UL data to the BS on a PUSCH based on the UL grant included in the UL grant DCI.

Referring to FIG. 5(b), in the case of a configured grant, the UE receives an RRC message including a resource configuration for UL data transmission from the BS. In the NR system, two types of UL configured grants are defined: type 1 and type 2. In the case of UL configured grant type 1, an actual UL grant (e.g., time resources and frequency resources) is provided by RRC signaling, whereas in the case of UL configured grant type 2, an actual UL grant is provided by a PDCCH, and activated or deactivated by the PDCCH. If configured grant type 1 is configured, the BS provides the UE with at least the following parameters by RRC signaling: a CS-RNTI for retransmission; a periodicity of configured grant type 1; information about a starting symbol index S and the number L of symbols for a PUSCH in a slot; a time-domain offset representing a resource offset with respect to SFN=0 in the time domain; and an MCS index representing a modulation order, a target code rate, and a TB size. If configured grant type 2 is configured, the BS provides the UE with at least the following parameters by RRC signaling: a CS-RNTI for activation, deactivation, and retransmission; and a periodicity of configured grant type 2. An actual UL grant of configured grant type 2 is provided to the UE by DCI of a PDCCH addressed to a CS-RNTI. If a specific field in the DCI of the PDCCH addressed to the CS-RNTI is set to a specific value for scheduling activation, configured grant type 2 associated with the CS-RNTI is activated. The DCI set to a specific value for scheduling activation in the PDCCH includes actual frequency resource allocation information, an MCS index, and so on. The UE may perform a UL transmission on a PUSCH based on a configured grant of type 1 or type 2.

Figure 6:
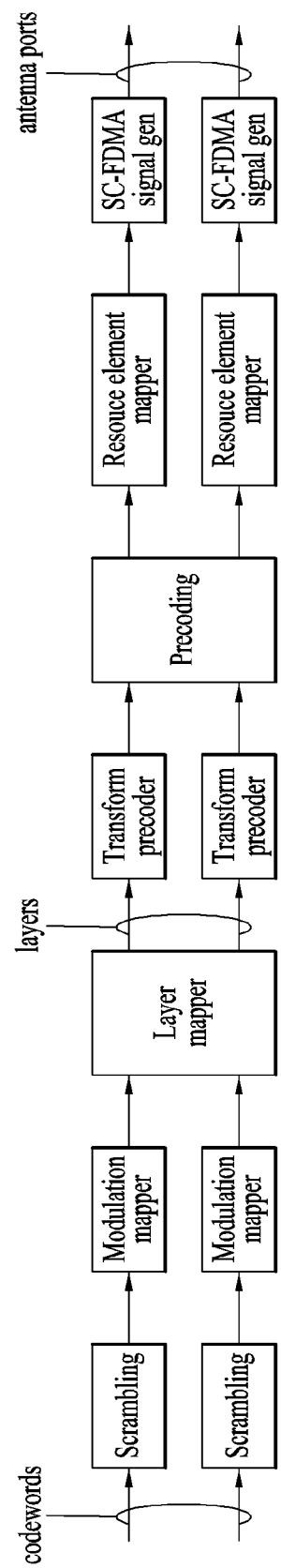
FIG. 6 is a conceptual diagram illustrating exemplary physical channel processing.

FIG. 6 is a conceptual diagram illustrating exemplary physical channel processing.

Each of the blocks illustrated in FIG. 6 may be performed in a corresponding module of a physical layer block in a transmission device. More specifically, the signal processing depicted in FIG. 6 may be performed for UL transmission by a processor of a UE described in the present disclosure. Signal processing of FIG. 6 except for transform precoding, with CP-OFDM signal generation instead of SC-FDMA signal generation may be performed for DL transmission in a processor of a BS described in the present disclosure. Referring to FIG. 6, UL physical channel processing may include scrambling, modulation mapping, layer mapping, transform precoding, precoding, RE mapping, and SC-FDMA signal generation. The above processes may be performed separately or together in the modules of the transmission device. The transform precoding, a kind of discrete Fourier transform (DFT), is to spread UL data in a special manner that reduces the peak-to-average power ratio (PAPR) of a waveform. OFDM which uses a CP together with transform precoding for DFT spreading is referred to as DFT-s-OFDM, and OFDM using a CP without DFT spreading is referred to as CP-OFDM. An SC-FDMA signal is generated by DFT-s-OFDM. In the NR system, if transform precoding is enabled for UL, transform precoding may be applied optionally. That is, the NR system supports two options for a UL waveform: one is CP-OFDM and the other is DFT-s-OFDM. The BS provides RRC parameters to the UE such that the UE determines whether to use CP-OFDM or DFT-s-OFDM for a UL transmission waveform. FIG. 6 is a conceptual view illustrating UL physical channel processing for DFT-s-OFDM. For CP-OFDM, transform precoding is omitted from the processes of FIG. 6. For DL transmission, CP-OFDM is used for DL waveform transmission.

Each of the above processes will be described in greater detail. For one codeword, the transmission device may scramble coded bits of the codeword by a scrambler and then transmit the scrambled bits on a physical channel. The codeword is obtained by encoding a TB. The scrambled bits are modulated to complex-valued modulation symbols by a modulation mapper. The modulation mapper may modulate the scrambled bits in a predetermined modulation scheme and arrange the modulated bits as complex-valued modulation symbols representing positions on a signal constellation. Pi/2-binay phase shift keying (pi/2-BPSK), m-phase shift keying (m-PSK), m-quadrature amplitude modulation (m-QAM), or the like is available for modulation of the coded data. The complex-valued modulation symbols may be mapped to one or more transmission layers by a layer mapper. A complexed-value modulation symbol on each layer may be precoded by a precoder, for transmission through an antenna port. If transform precoding is possible for UL transmission, the precoder may perform precoding after the complex-valued modulation symbols are subjected to transform precoding, as illustrated in FIG. 6. The precoder may output antenna-specific symbols by processing the complex-valued modulation symbols in a multiple input multiple output (MIMO) scheme according to multiple Tx antennas, and distribute the antenna-specific symbols to corresponding RE mappers. An output z of the precoder may be obtained by multiplying an output y of the layer mapper by an N×M precoding matrix, W where N is the number of antenna ports and M is the number of layers. The RE mappers map the complex-valued modulation symbols for the respective antenna ports to appropriate REs in an RB allocated for transmission. The RE mappers may map the complex-valued modulation symbols to appropriate subcarriers, and multiplex the mapped symbols according to users. SC-FDMA signal generators (CP-OFDM signal generators, when transform precoding is disabled in DL transmission or UL transmission) may generate complex-valued time domain OFDM symbol signals by modulating the complex-valued modulation symbols in a specific modulations scheme, for example, in OFDM. The SC-FDMA signal generators may perform inverse fast Fourier transform (IFFT) on the antenna-specific symbols and insert CPs into the time-domain IFFT-processed symbols. The OFDM symbols are subjected to digital-to-analog conversion, frequency upconversion, and so on, and then transmitted to a reception device through the respective Tx antennas. Each of the SC-FDMA signal generators may include an IFFT module, a CP inserter, a digital-to-analog converter (DAC), a frequency upconverter, and so on.

A signal processing procedure of the reception device is performed in a reverse order of the signal processing procedure of the transmission device. For details, refer to the above description and FIG. 6.

Now, a description will be given of the PUCCH.

The PUCCH is used for UCI transmission. UCI includes an SR requesting UL transmission resources, CSI representing a UE-measured DL channel state based on a DL RS, and/or an HARQ-ACK indicating whether a UE has successfully received DL data.

The PUCCH supports multiple formats, and the PUCCH formats are classified according to symbol durations, payload sizes, and multiplexing or non-multiplexing.

[Table 1] below lists exemplary PUCCH formats.

TABLE 1

| Format | PUCCH length in OFDM symbols | Number of bits | Etc. |
|---|---|---|---|
| 0 | 1-2 | ≤2 | Sequence selection |
| 1 | 4-14 | ≤2 | Sequence modulation |
| 2 | 1-2 | >2 | CP-OFDM |
| 3 | 4-14 | >2 | DFT-s-OFDM (no UE multiplexing) |
| 4 | 4-14 | >2 | DFT-s-OFDM (Pre DFT orthogonal cover code (OCC)) |

The BS configures PUCCH resources for the UE by RRC signaling. For example, to allocate PUCCH resources, the BS may configure a plurality of PUCCH resource sets for the UE, and the UE may select a specific PUCCH resource set corresponding to a UCI (payload) size (e.g., the number of UCI bits). For example, the UE may select one of the following PUCCH resource sets according to the number of UCI bits, $N_{UCI}$.

PUCCH resource set #0, if the number of UCI bits ≤2

PUCCH resource set #1, if 2<the number of UCI bits ≤$N_1$

. . .

PUCCH resource set #(K−1), if NK−2<the number of UCI bits ≤$N_{K-1}$

Herein, K represents the number of PUCCH resource sets (K>1), and Ni represents the maximum number of UCI bits supported by PUCCH resource set #i. For example, PUCCH resource set #1 may include resources of PUCCH format 0 to PUCCH format 1, and the other PUCCH resource sets may include resources of PUCCH format 2 to PUCCH format 4.

Subsequently, the BS may transmit DCI to the UE on a PDCCH, indicating a PUCCH resource to be used for UCI transmission among the PUCCH resources of a specific PUCCH resource set by an ACK/NACK resource indicator (ARI) in the DCI. The ARI may be used to indicate a PUCCH resource for HARQ-ACK transmission, also called a PUCCH resource indicator (PRI).

enhanced Mobile Broadband Communication (eMBB)

In the NR system, a massive MIMO environment in which the number of Tx/Rx antennas is significantly increased is under consideration. On the other hand, in an NR system operating at or above 6 GHz, beamforming is considered, in which a signal is transmitted with concentrated energy in a specific direction, not omni-directionally, to compensate for rapid propagation attenuation. Accordingly, there is a need for hybrid beamforming with analog beamforming and digital beamforming in combination according to a position to which a beamforming weight vector/precoding vector is applied, for the purpose of increased performance, flexible resource allocation, and easiness of frequency-wise beam control.

Hybrid Beamforming

Figure 7:
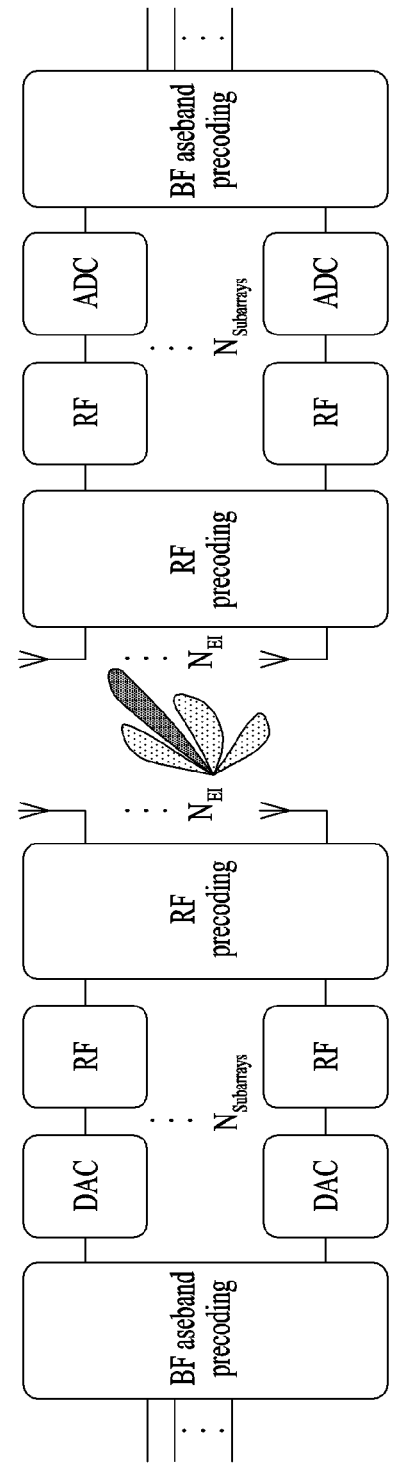
FIG. 7 is a block diagram illustrating an exemplary transmitter and receiver for hybrid beamforming.

FIG. 7 is a block diagram illustrating an exemplary transmitter and receiver for hybrid beamforming.

In hybrid beamforming, a BS or a UE may form a narrow beam by transmitting the same signal through multiple antennas, using an appropriate phase difference and thus increasing energy only in a specific direction.

Beam Management (BM)

BM is a series of processes for acquiring and maintaining a set of BS (or transmission and reception point (TRP)) beams and/or UE beams available for DL and UL transmissions/receptions. BM may include the following processes and terminology.

Beam measurement: the BS or the UE measures the characteristics of a received beamformed signal.

Beam determination: the BS or the UE selects its Tx beam/Rx beam.

Beam sweeping: a spatial domain is covered by using a Tx beam and/or an Rx beam in a predetermined method for a predetermined time interval.

Beam report: the UE reports information about a signal beamformed based on a beam measurement.

The BM procedure may be divided into (1) a DL BM procedure using an SSB or CSI-RS and (2) a UL BM procedure using an SRS. Further, each BM procedure may include Tx beam sweeping for determining a Tx beam and Rx beam sweeping for determining an Rx beam. The following description will focus on the DL BM procedure using an SSB.

The DL BM procedure using an SSB may include (1) transmission of a beamformed SSB from the BS and (2) beam reporting of the UE. An SSB may be used for both of Tx beam sweeping and Rx beam sweeping. SSB-based Rx beam sweeping may be performed by attempting SSB reception while changing Rx beams at the UE.

SSB-based beam reporting may be configured, when CSI/beam is configured in the RRC_CONNECTED state.

The UE receives information about an SSB resource set used for BM from the BS. The SSB resource set may be configured with one or more SSBIs. For each SSB resource set, SSBI 0 to SSBI 63 may be defined.

The UE receives signals in SSB resources from the BS based on the information about the SSB resource set.

When the BS configures the UE with an SSBRI and RSRP reporting, the UE reports a (best) SSBRI and an RSRP corresponding to the SSBRI to the BS.

The BS may determine a BS Tx beam for use in DL transmission to the UE based on a beam report received from the UE.

Beam Failure Recovery (BFR) Procedure

In a beamforming system, radio link failure (RLF) may often occur due to rotation or movement of a UE or beamforming blockage. Therefore, BFR is supported to prevent frequent occurrence of RLF in NR.

For beam failure detection, the BS configures beam failure detection RSs for the UE. If the number of beam failure indications from the physical layer of the UE reaches a threshold configured by RRC signaling within a period configured by RRC signaling of the BS, the UE declares beam failure.

After the beam failure is detected, the UE triggers BFR by initiating a RACH procedure on a Pcell, and performs BFR by selecting a suitable beam (if the BS provides dedicated RACH resources for certain beams, the UE performs the RACH procedure for BFR by using the dedicated RACH resources first of all). Upon completion of the RACH procedure, the UE considers that the BFR has been completed.

Ultra-Reliable and Low Latency Communication (URLLC)

A URLLC transmission defined in NR may mean a transmission with (1) a relatively small traffic size, (2) a relatively low arrival rate, (3) an extremely low latency requirement (e.g., 0.5 ms or 1 ms), (4) a relatively short transmission duration (e.g., 2 OFDM symbols), and (5) an emergency service/message.

Pre-Emption Indication

Although eMBB and URLLC services may be scheduled in non-overlapped time/frequency resources, a URLLC transmission may take place in resources scheduled for on-going eMBB traffic. To enable a UE receiving a PDSCH to determine that the PDSCH has been partially punctured due to URLLC transmission of another UE, a preemption indication may be used. The preemption indication may also be referred to as an interrupted transmission indication.

In relation to a preemption indication, the UE receives DL preemption RRC information (e.g., a DownlinkPreemption IE) from the BS by RRC signaling.

The UE receives DCI format 2_1 based on the DL preemption RRC information from the BS. For example, the UE attempts to detect a PDCCH conveying preemption indication-related DCI, DCI format 2_1 by using an int-RNTI configured by the DL preemption RRC information.

Upon detection of DCI format 2_1 for serving cell(s) configured by the DL preemption RRC information, the UE may assume that there is no transmission directed to the UE in RBs and symbols indicated by DCI format 2_1 in a set of RBs and a set of symbols during a monitoring interval shortly previous to a monitoring interval to which DCI format 2_1 belongs. For example, the UE decodes data based on signals received in the remaining resource areas, considering that a signal in a time-frequency resource indicated by a preemption indication is not a DL transmission scheduled for the UE.

Massive MTC (mMTC)

mMTC is one of 5G scenarios for supporting a hyper-connectivity service in which communication is conducted with multiple UEs at the same time. In this environment, a UE intermittently communicates at a very low transmission rate with low mobility. Accordingly, mMTC mainly seeks long operation of a UE with low cost. In this regard, MTC and narrow band-Internet of things (NB-IoT) handled in the 3GPP will be described below.

The following description is given with the appreciation that a transmission time interval (TTI) of a physical channel is a subframe. For example, a minimum time interval between the start of transmission of a physical channel and the start of transmission of the next physical channel is one subframe. However, a subframe may be replaced with a slot, a mini-slot, or multiple slots in the following description.

Machine Type Communication (MTC)

MTC is an application that does not require high throughput, applicable to machine-to-machine (M2M) or IoT. MTC is a communication technology which the 3GPP has adopted to satisfy the requirements of the IoT service.

While the following description is given mainly of features related to enhanced MTC (eMTC), the same thing is applicable to MTC, eMTC, and MTC to be applied to 5G (or NR), unless otherwise mentioned. The term MTC as used herein may be interchangeable with eMTC, LTE-M1/M2, bandwidth reduced low complexity (BL)/coverage enhanced (CE), non-BL UE (in enhanced coverage), NR MTC, enhanced BL/CE, and so on.

MTC General (1) MTC operates only in a specific system BW (or channel BW).

MTC may use a predetermined number of RBs among the RBs of a system band in the legacy LTE system or the NR system. The operating frequency BW of MTC may be defined in consideration of a frequency range and a subcarrier spacing in NR. A specific system or frequency BW in which MTC operates is referred to as an MTC narrowband (NB) or MTC subband. In NR, MTC may operate in at least one BWP or a specific band of a BWP.

While MTC is supported by a cell having a much larger BW (e.g., 10 MHz) than 1.08 MHz, a physical channel and signal transmitted/received in MTC is always limited to 1.08 MHz or 6 (LTE) RBs. For example, a narrowband is defined as 6 non-overlapped consecutive physical resource blocks (PRBs) in the frequency domain in the LTE system.

Figure 8:
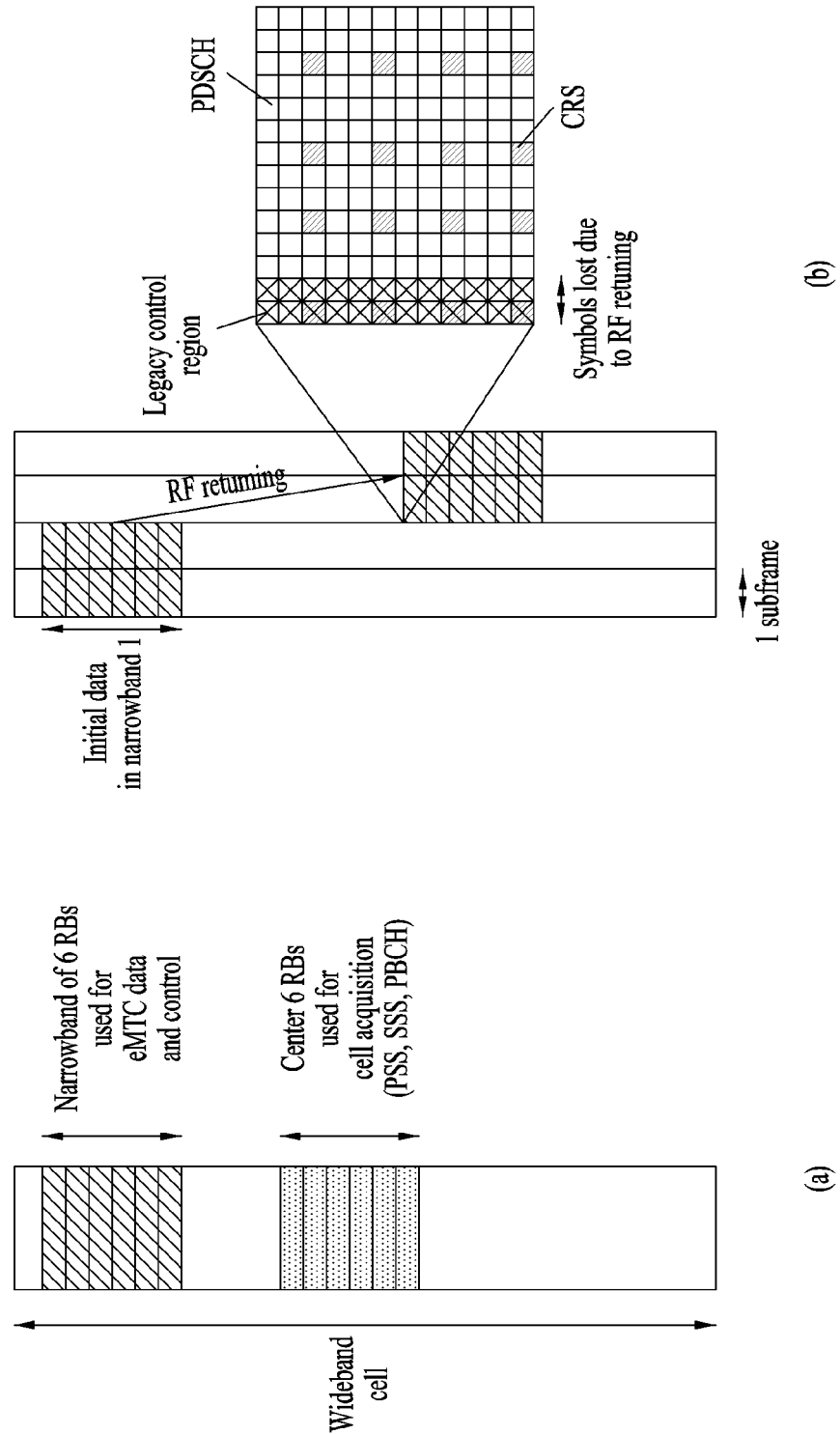
FIG. 8, (a) is a diagram illustrating an exemplary narrowband operation and (b) is a diagram illustrating exemplary machine type communication (MTC) channel repetition with radio frequency (RF) retuning.

In MTC, some DL and UL channels are allocated restrictively within a narrowband, and one channel does not occupy a plurality of narrowbands in one time unit. FIG. 8(a) is a diagram illustrating an exemplary narrowband operation, and FIG. 8(b) is a diagram illustrating exemplary MTC channel repetition with RF retuning.

An MTC narrowband may be configured for a UE by system information or DCI transmitted by a BS.

(2) MTC does not use a channel (defined in legacy LTE or NR) which is to be distributed across the total system BW of the legacy LTE or NR. For example, because a legacy LTE PDCCH is distributed across the total system BW, the legacy PDCCH is not used in MTC. Instead, a new control channel, MTC PDCCH (MPDCCH) is used in MTC. The MPDCCH is transmitted/received in up to 6 RBs in the frequency domain. In the time domain, the MPDCCH may be transmitted in one or more OFDM symbols starting with an OFDM symbol of a starting OFDM symbol index indicated by an RRC parameter from the BS among the OFDM symbols of a subframe.

(3) In MTC, PBCH, PRACH, MPDCCH, PDSCH, PUCCH, and PUSCH may be transmitted repeatedly. The MTC repeated transmissions may make these channels decodable even when signal quality or power is very poor as in a harsh condition like basement, thereby leading to the effect of an increased cell radius and signal penetration.

MTC Operation Modes and Levels

For CE, two operation modes, CE Mode A and CE Mode B and four different CE levels are used in MTC, as listed in [Table 2] below.

TABLE 2

| Mode | Level | Description |
| --- | --- | --- |
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

An MTC operation mode is determined by a BS and a CE level is determined by an MTC UE.

MTC Guard Period

The position of a narrowband used for MTC may change in each specific time unit (e.g., subframe or slot). An MTC UE may tune to different frequencies in different time units. A certain time may be required for frequency retuning and thus used as a guard period for MTC. No transmission and reception take place during the guard period.

MTC Signal Transmission/Reception Method

Apart from features inherent to MTC, an MTC signal transmission/reception procedure is similar to the procedure illustrated in FIG. 2. The operation of S201 in FIG. 2 may also be performed for MTC. A PSS/SSS used in an initial cell search operation in MTC may be the legacy LTE PSS/SSS.

After acquiring synchronization with a BS by using the PSS/SSS, an MTC UE may acquire broadcast information within a cell by receiving a PBCH signal from the BS. The broadcast information transmitted on the PBCH is an MIB. In MTC, reserved bits among the bits of the legacy LTE MIB are used to transmit scheduling information for a new system information block 1 bandwidth reduced (SIB1-BR). The scheduling information for the SIB1-BR may include information about a repetition number and a TBS for a PDSCH conveying SIB1-BR. A frequency resource assignment for the PDSCH conveying SIB-BR may be a set of 6 consecutive RBs within a narrowband. The SIB-BR is transmitted directly on the PDSCH without a control channel (e.g., PDCCH or MPDCCH) associated with SIB-BR.

After completing the initial cell search, the MTC UE may acquire more specific system information by receiving an MPDCCH and a PDSCH based on information of the MPDCCH (S202).

Subsequently, the MTC UE may perform a RACH procedure to complete connection to the BS (S203 to S206). A basic configuration for the RACH procedure of the MTC UE may be transmitted in SIB2. Further, SIB2 includes paging-related parameters. In the 3GPP system, a paging occasion (PO) means a time unit in which a UE may attempt to receive paging. Paging refers to the network's indication of the presence of data to be transmitted to the UE. The MTC UE attempts to receive an MPDCCH based on a P-RNTI in a time unit corresponding to its PO in a narrowband configured for paging, paging narrowband (PNB). When the UE succeeds in decoding the MPDCCH based on the P-RNTI, the UE may check its paging message by receiving a PDSCH scheduled by the MPDCCH. In the presence of its paging message, the UE accesses the network by performing the RACH procedure.

In MTC, signals and/or messages (Msg1, Msg2, Msg3, and Msg4) may be transmitted repeatedly in the RACH procedure, and a different repetition pattern may be set according to a CE level.

For random access, PRACH resources for different CE levels are signaled by the BS. Different PRACH resources for up to 4 respective CE levels may be signaled to the MTC UE. The MTC UE measures an RSRP using a DL RS (e.g., CRS, CSI-RS, or TRS) and determines one of the CE levels signaled by the BS based on the measurement. The UE selects one of different PRACH resources (e.g., frequency, time, and preamble resources for a PARCH) for random access based on the determined CE level and transmits a PRACH. The BS may determine the CE level of the UE based on the PRACH resources that the UE has used for the PRACH transmission. The BS may determine a CE mode for the UE based on the CE level that the UE indicates by the PRACH transmission. The BS may transmit DCI to the UE in the CE mode.

Search spaces for an RAR for the PRACH and contention resolution messages are signaled in system information by the BS.

After the above procedure, the MTC UE may receive an MPDCCH signal and/or a PDSCH signal (S207) and transmit a PUSCH signal and/or a PUCCH signal (S208) in a general UL/DL signal transmission procedure. The MTC UE may transmit UCI on a PUCCH or a PUSCH to the BS.

Once an RRC connection for the MTC UE is established, the MTC UE attempts to receive an MDCCH by monitoring an MPDCCH in a configured search space in order to acquire UL and DL data allocations.

In legacy LTE, a PDSCH is scheduled by a PDCCH. Specifically, the PDCCH may be transmitted in the first N (N=1, 2 or 3) OFDM symbols of a subframe, and the PDSCH scheduled by the PDCCH is transmitted in the same subframe.

Compared to legacy LTE, an MPDCCH and a PDSCH scheduled by the MPDCCH are transmitted/received in different subframes in MTC. For example, an MPDCCH with a last repetition in subframe #n schedules a PDSCH starting in subframe #n+2. The MPDCCH may be transmitted only once or repeatedly. A maximum repetition number of the MPDCCH is configured for the UE by RRC signaling from the BS. DCI carried on the MPDCCH provides information on how many times the MPDCCH is repeated so that the UE may determine when the PDSCH transmission starts. For example, if DCI in an MPDCCH starting in subframe #n includes information indicating that the MPDCCH is repeated 10 times, the MPDCCH may end in subframe #n+9 and the PDSCH may start in subframe #n+11. The DCI carried on the MPDCCH may include information about a repetition number for a physical data channel (e.g., PUSCH or PDSCH) scheduled by the DCI. The UE may transmit/receive the physical data channel repeatedly in the time domain according to the information about the repetition number of the physical data channel scheduled by the DCI. The PDSCH may be scheduled in the same or different narrowband as or from a narrowband in which the MPDCCH scheduling the PDSCH is transmitted. When the MPDCCH and the PDSCH are in different narrowbands, the MTC UE needs to retune to the frequency of the narrowband carrying the PDSCH before decoding the PDSCH. For UL scheduling, the same timing as in legacy LTE may be followed. For example, an MPDCCH ending in subframe #n may schedule a PUSCH transmission starting in subframe #n+4. If a physical channel is repeatedly transmitted, frequency hopping is supported between different MTC subbands by RF retuning. For example, if a PDSCH is repeatedly transmitted in 32 subframes, the PDSCH is transmitted in the first 16 subframes in a first MTC subband, and in the remaining 16 subframes in a second MTC subband. MTC may operate in half-duplex mode.

Narrowband-Internet of Things (NB-IoT)

NB-IoT may refer to a system for supporting low complexity, low power consumption, and efficient use of frequency resources by a system BW corresponding to one RB of a wireless communication system (e.g., the LTE system or the NR system). NB-IoT may operate in half-duplex mode. NB-IoT may be used as a communication scheme for implementing IoT by supporting, for example, an MTC device (or UE) in a cellular system.

In NB-IoT, each UE perceives one RB as one carrier. Therefore, an RB and a carrier as mentioned in relation to NB-IoT may be interpreted as the same meaning.

While a frame structure, physical channels, multi-carrier operations, and general signal transmission/reception in relation to NB-IoT will be described below in the context of the legacy LTE system, the description is also applicable to the next generation system (e.g., the NR system). Further, the description of NB-IoT may also be applied to MTC serving similar technical purposes (e.g., low power, low cost, and coverage enhancement).

NB-IoT Frame Structure and Physical Resources

A different NB-IoT frame structure may be configured according to a subcarrier spacing. For example, for a subcarrier spacing of 15 kHz, the NB-IoT frame structure may be identical to that of a legacy system (e.g., the LTE system). For example, a 10-ms NB-IoT frame may include 10 1-ms NB-IoT subframes each including two 0.5-ms slots. Each 0.5-ms NB-IoT slot may include 7 OFDM symbols. In another example, for a BWP or cell/carrier having a subcarrier spacing of 3.75 kHz, a 10-ms NB-IoT frame may include five 2-ms NB-IoT subframes each including 7 OFDM symbols and one guard period (GP). Further, a 2-ms NB-IoT subframe may be represented in NB-IoT slots or NB-IoT resource units (RUs). The NB-IoT frame structures are not limited to the subcarrier spacings of 15 kHz and 3.75 kHz, and NB-IoT for other subcarrier spacings (e.g., 30 kHz) may also be considered by changing time/frequency units.

NB-IoT DL physical resources may be configured based on physical resources of other wireless communication systems (e.g., the LTE system or the NR system) except that a system BW is limited to a predetermined number of RBs (e.g., one RB, that is, 180 kHz). For example, if the NB-IoT DL supports only the 15-kHz subcarrier spacing as described before, the NB-IoT DL physical resources may be configured as a resource area in which the resource grid illustrated in FIG. 1 is limited to one RB in the frequency domain.

Like the NB-IoT DL physical resources, NB-IoT UL resources may also be configured by limiting a system BW to one RB. In NB-IoT, the number of UL subcarriers $N^{UL}_{sc}$ and a slot duration $T_{slot}$ may be given as illustrated in [Table 3] below. In NB-IoT of the LTE system, the duration of one slot, $T_{slot}$ is defined by 7 SC-FDMA symbols in the time domain.

TABLE 3

| Subcarrier spacing | $N^{UL}_{SC}$ | $T_{slot}$ |
|---|---|---|
| Δf = 3.75 kHz | 48 | 6144 · $T_s$ |
| Δf = 15 kHz | 12 | 15360 · $T_s$ |

In NB-IoT, RUs are used for mapping to REs of a PUSCH for NB-IoT (referred to as an NPUSCH). An RU may be defined by $N^{UL}_{symb} * N^{UL}_{slot}$ SC-FDMA symbols in the time domain by $N^{RU}_{sc}$ consecutive subcarriers in the frequency domain. For example, $N^{RU}_{sc}$ and $N^{UL}_{symb}$ are listed in [Table 4] for a cell/carrier having an FDD frame structure and in [Table 5] for a cell/carrier having a TDD frame structure.

TABLE 4

| NPUSCH format | Δf | $N^{RU}_{SC}$ | $N^{UL}_{slots}$ | $N^{UL}_{symb}$ |
|---|---|---|---|---|
| 1 | 3.75 kHz | 1 | 16 | 7 |
|  | 15 kHz | 1 | 16 |  |
|  |  | 3 | 8 |  |
|  |  | 6 | 4 |  |
|  |  | 12 | 2 |  |

TABLE 4-continued

| NPUSCH format | Δf | $N^{RU}_{SC}$ | $N^{UL}_{slots}$ | $N^{UL}_{symb}$ |
|---|---|---|---|---|
| 2 | 3.75 kHz | 1 | 4 | |
| | 15 kHz | 1 | 4 | |

TABLE 5

| NPUSCH format | Δf | Support uplink-downlink configurations | $N^{RU}_{SC}$ | $N^{UL}_{slots}$ | $N^{UL}_{symb}$ |
|---|---|---|---|---|---|
| 1 | 3.75 kHz | 1, 4 | 1 | 16 | 7 |
| | 15 kHz | 1, 2, 3, 4, 5 | 1 | 16 | |
| | | | 3 | 8 | |
| | | | 6 | 4 | |
| | | | 12 | 2 | |
| 2 | 3.75 kHz | 1, 4 | 1 | 4 | |
| | 15 kHz | 1, 2, 3, 4, 5 | 1 | 4 | |

NB-IoT Physical Channels

OFDMA may be adopted for NB-IoT DL based on the 15-kHz subcarrier spacing. Because OFDMA provides orthogonality between subcarriers, co-existence with other systems (e.g., the LTE system or the NR system) may be supported efficiently. The names of DL physical channels/signals of the NB-IoT system may be prefixed with "N (narrowband)" to be distinguished from their counterparts in the legacy system. For example, DL physical channels may be named NPBCH, NPDCCH, NPDSCH, and so on, and DL physical signals may be named NPSS, NSSS, narrowband reference signal (NRS), narrowband positioning reference signal (NPRS), narrowband wake up signal (NWUS), and so on. The DL channels, NPBCH, NPDCCH, NPDSCH, and so on may be repeatedly transmitted to enhance coverage in the NB-IoT system. Further, new defined DCI formats may be used in NB-IoT, such as DCI format N0, DCI format N1, and DCI format N2.

SC-FDMA may be applied with the 15-kHz or 3.75-kHz subcarrier spacing to NB-IoT UL. As described in relation to DL, the names of physical channels of the NB-IoT system may be prefixed with "N (narrowband)" to be distinguished from their counterparts in the legacy system. For example, UL channels may be named NPRACH, NPUSCH, and so on, and UL physical signals may be named NDMRS and so on. NPUSCHs may be classified into NPUSCH format 1 and NPUSCH format 2. For example, NPUSCH format 1 may be used to transmit (or deliver) an uplink shared channel (UL-SCH), and NPUSCH format 2 may be used for UCI transmission such as HARQ ACK signaling. A UL channel, NPRACH in the NB-IoT system may be repeatedly transmitted to enhance coverage. In this case, the repeated transmissions may be subjected to frequency hopping.

Multi-Carrier Operation in NB-IoT

NB-IoT may be implemented in multi-carrier mode. A multi-carrier operation may refer to using multiple carriers configured for different usages (i.e., multiple carriers of different types) in transmitting/receiving channels and/or signals between a BS and a UE.

In the multi-carrier mode in NB-IoT, carriers may be divided into anchor type carrier (i.e., anchor carrier or anchor PRB) and non-anchor type carrier (i.e., non-anchor carrier or non-anchor PRB).

The anchor carrier may refer to a carrier carrying an NPSS, an NSSS, and an NPBCH for initial access, and an NPDSCH for a system information block, N-SIB from the perspective of a BS. That is, a carrier for initial access is referred to as an anchor carrier, and the other carrier(s) is referred to as a non-anchor carrier in NB-IoT.

NB-IoT Signal Transmission/Reception Process

In NB-IoT, a signal is transmitted/received in a similar manner to the procedure illustrated in FIG. 2, except for features inherent to NB-IoT. Referring to FIG. 2, when an NB-IoT UE is powered on or enters a new cell, the NB-IoT UE may perform an initial cell search (S201). For the initial cell search, the NB-IoT UE may acquire synchronization with a BS and obtain information such as a cell ID by receiving an NPSS and an NSSS from the BS. Further, the NB-IoT UE may acquire broadcast information within a cell by receiving an NPBCH from the BS.

Upon completion of the initial cell search, the NB-IoT UE may acquire more specific system information by receiving an NPDCCH and receiving an NPDSCH corresponding to the NPDCCH (S202). In other words, the BS may transmit more specific system information to the NB-IoT UE which has completed the initial call search by transmitting an NPDCCH and an NPDSCH corresponding to the NPDCCH.

The NB-IoT UE may then perform a RACH procedure to complete a connection setup with the BS (S203 to S206). For this purpose, the NB-IoT UE may transmit a preamble on an NPRACH to the BS (S203). As described before, it may be configured that the NPRACH is repeatedly transmitted based on frequency hopping, for coverage enhancement. In other words, the BS may (repeatedly) receive the preamble on the NPRACH from the NB-IoT UE. The NB-IoT UE may then receive an NPDCCH, and a RAR in response to the preamble on an NPDSCH corresponding to the NPDCCH from the BS (S204). In other words, the BS may transmit the NPDCCH, and the RAR in response to the preamble on the NPDSCH corresponding to the NPDCCH to the NB-IoT UE. Subsequently, the NB-IoT UE may transmit an NPUSCH to the BS, using scheduling information in the RAR (S205) and perform a contention resolution procedure by receiving an NPDCCH and an NPDSCH corresponding to the NPDCCH (S206).

After the above process, the NB-IoT UE may perform an NPDCCH/NPDSCH reception (S207) and an NPUSCH transmission (S208) in a general UL/DL signal transmission procedure. In other words, after the above process, the BS may perform an NPDCCH/NPDSCH transmission and an NPUSCH reception with the NB-IoT UE in the general UL/DL signal transmission procedure.

In NB-IoT, the NPBCH, the NPDCCH, and the NPDSCH may be transmitted repeatedly, for coverage enhancement. A UL-SCH (i.e., general UL data) and UCI may be delivered on the PUSCH in NB-IoT. It may be configured that the UL-SCH and the UCI are transmitted in different NPUSCH formats (e.g., NPUSCH format 1 and NPUSCH format 2).

In NB-IoT, UCI may generally be transmitted on an NPUSCH. Further, the UE may transmit the NPUSCH periodically, a periodically, or semi-persistently according to request/indication of the network (e.g., BS).

Wireless Communication Apparatus

Figure 9:
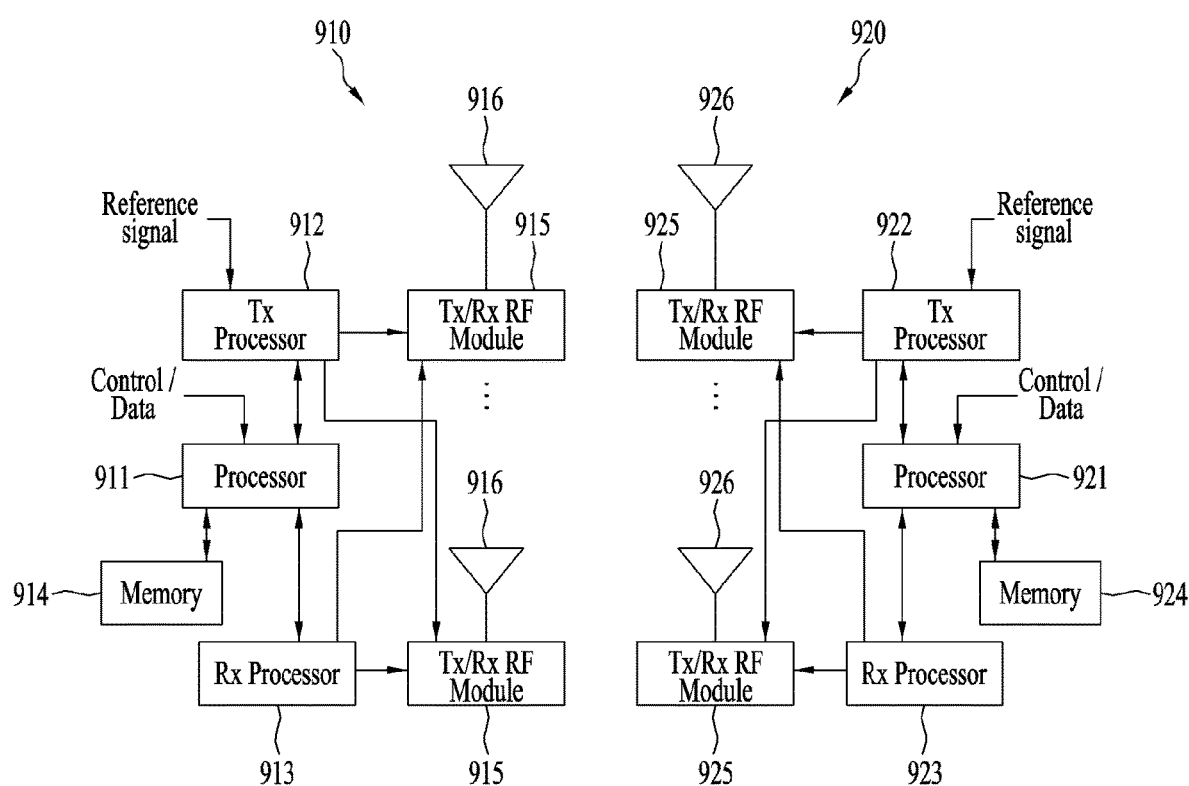
FIG. 9 is a block diagram illustrating an exemplary wireless communication system to which proposed methods according to the present disclosure are applicable.

FIG. 9 is a block diagram of an exemplary wireless communication system to which proposed methods of the present disclosure are applicable.

Referring to FIG. 9, the wireless communication system includes a first communication device 910 and/or a second communication device 920. The phrases "A and/or B" and "at least one of A or B" are may be interpreted as the same meaning. The first communication device 910 may be a BS, and the second communication device 920 may be a UE (or the first communication device 910 may be a UE, and the second communication device 920 may be a BS).

Each of the first communication device 910 and the second communication device 920 includes a processor 911 or 921, a memory 914 or 924, one or more Tx/Rx RF modules 915 or 925, a Tx processor 912 or 922, an Rx processor 913 or 923, and antennas 916 or 926. A Tx/Rx module may also be called a transceiver. The processor performs the afore-described functions, processes, and/or methods. More specifically, on DL (communication from the first communication device 910 to the second communication device 920), a higher-layer packet from a core network is provided to the processor 911. The processor 911 implements Layer 2 (i.e., L2) functionalities. On DL, the processor 911 is responsible for multiplexing between a logical channel and a transport channel, provisioning of a radio resource assignment to the second communication device 920, and signaling to the second communication device 920. The Tx processor 912 executes various signal processing functions of L1 (i.e., the physical layer). The signal processing functions facilitate forward error correction (FEC) of the second communication device 920, including coding and interleaving. An encoded and interleaved signal is modulated to complex-valued modulation symbols after scrambling and modulation. For the modulation, BPSK, QPSK, 16QAM, 64QAM, 246QAM, and so on are available according to channels. The complex-valued modulation symbols (hereinafter, referred to as modulation symbols) are divided into parallel streams. Each stream is mapped to OFDM subcarriers and multiplexed with an RS in the time and/or frequency domain. A physical channel is generated to carry a time-domain OFDM symbol stream by subjecting the mapped signals to IFFT. The OFDM symbol stream is spatially precoded to multiple spatial streams. Each spatial stream may be provided to a different antenna 916 through an individual Tx/Rx module (or transceiver) 915. Each Tx/Rx module 915 may upconvert the frequency of each spatial stream to an RF carrier, for transmission. In the second communication device 920, each Tx/Rx module (or transceiver) 925 receives a signal of the RF carrier through each antenna 926. Each Tx/Rx module 925 recovers the signal of the RF carrier to a baseband signal and provides the baseband signal to the Rx processor 923. The Rx processor 923 executes various signal processing functions of L1 (i.e., the physical layer). The Rx processor 923 may perform spatial processing on information to recover any spatial stream directed to the second communication device 920. If multiple spatial streams are directed to the second communication device 920, multiple Rx processors may combine the multiple spatial streams into a single OFDMA symbol stream. The Rx processor 923 converts an OFDM symbol stream being a time-domain signal to a frequency-domain signal by FFT. The frequency-domain signal includes an individual OFDM symbol stream on each subcarrier of an OFDM signal. Modulation symbols and an RS on each subcarrier are recovered and demodulated by determining most likely signal constellation points transmitted by the first communication device 910. These soft decisions may be based on channel estimates. The soft decisions are decoded and deinterleaved to recover the original data and control signal transmitted on physical channels by the first communication device 910. The data and control signal are provided to the processor 921.

On UL (communication from the second communication device 920 to the first communication device 910), the first communication device 910 operates in a similar manner as described in relation to the receiver function of the second communication device 920. Each Tx/Rx module 925 receives a signal through an antenna 926. Each Tx/Rx module 925 provides an RF carrier and information to the Rx processor 923. The processor 921 may be related to the memory 924 storing a program code and data. The memory 924 may be referred to as a computer-readable medium.

Artificial Intelligence (AI)

Artificial intelligence is a field of studying AI or methodologies for creating AI, and machine learning is a field of defining various issues dealt with in the AI field and studying methodologies for addressing the various issues. Machine learning is defined as an algorithm that increases the performance of a certain operation through steady experiences for the operation.

An artificial neural network (ANN) is a model used in machine learning and may generically refer to a model having a problem-solving ability, which is composed of artificial neurons (nodes) forming a network via synaptic connections. The ANN may be defined by a connection pattern between neurons in different layers, a learning process for updating model parameters, and an activation function for generating an output value.

The ANN may include an input layer, an output layer, and optionally, one or more hidden layers. Each layer includes one or more neurons, and the ANN may include a synapse that links between neurons. In the ANN, each neuron may output the function value of the activation function, for the input of signals, weights, and deflections through the synapse.

Model parameters refer to parameters determined through learning and include a weight value of a synaptic connection and deflection of neurons. A hyperparameter means a parameter to be set in the machine learning algorithm before learning, and includes a learning rate, a repetition number, a mini batch size, and an initialization function.

The purpose of learning of the ANN may be to determine model parameters that minimize a loss function. The loss function may be used as an index to determine optimal model parameters in the learning process of the ANN.

Machine learning may be classified into supervised learning, unsupervised learning, and reinforcement learning according to learning methods.

Supervised learning may be a method of training an ANN in a state in which a label for training data is given, and the label may mean a correct answer (or result value) that the ANN should infer with respect to the input of training data to the ANN. Unsupervised learning may be a method of training an ANN in a state in which a label for training data is not given. Reinforcement learning may be a learning method in which an agent defined in a certain environment is trained to select a behavior or a behavior sequence that maximizes cumulative compensation in each state.

Machine learning, which is implemented by a deep neural network (DNN) including a plurality of hidden layers among ANNs, is also referred to as deep learning, and deep learning is part of machine learning. The following description is given with the appreciation that machine learning includes deep learning.

<Robot>

A robot may refer to a machine that automatically processes or executes a given task by its own capabilities. Particularly, a robot equipped with a function of recognizing an environment and performing an operation based on its decision may be referred to as an intelligent robot.

Robots may be classified into industrial robots, medical robots, consumer robots, military robots, and so on according to their usages or application fields.

A robot may be provided with a driving unit including an actuator or a motor, and thus perform various physical operations such as moving robot joints. Further, a movable robot may include a wheel, a brake, a propeller, and the like in a driving unit, and thus travel on the ground or fly in the air through the driving unit.

<Self-Driving>

Self-driving refers to autonomous driving, and a self-driving vehicle refers to a vehicle that travels with no user manipulation or minimum user manipulation.

For example, self-driving may include a technology of maintaining a lane while driving, a technology of automatically adjusting a speed, such as adaptive cruise control, a technology of automatically traveling along a predetermined route, and a technology of automatically setting a route and traveling along the route when a destination is set.

Vehicles may include a vehicle having only an internal combustion engine, a hybrid vehicle having both an internal combustion engine and an electric motor, and an electric vehicle having only an electric motor, and may include not only an automobile but also a train, a motorcycle, and the like.

Herein, a self-driving vehicle may be regarded as a robot having a self-driving function.

<eXtended Reality (XR)>

Extended reality is a generical term covering virtual reality (VR), augmented reality (AR), and mixed reality (MR). VR provides a real-world object and background only as a computer graphic (CG) image, AR provides a virtual CG image on a real object image, and MR is a computer graphic technology that mixes and combines virtual objects into the real world.

MR is similar to AR in that the real object and the virtual object are shown together. However, in AR, the virtual object is used as a complement to the real object, whereas in MR, the virtual object and the real object are handled equally.

XR may be applied to a head-mounted display (HMD), a head-up display (HUD), a portable phone, a tablet PC, a laptop computer, a desktop computer, a TV, a digital signage, and so on. A device to which XR is applied may be referred to as an XR device.

Figure 10:
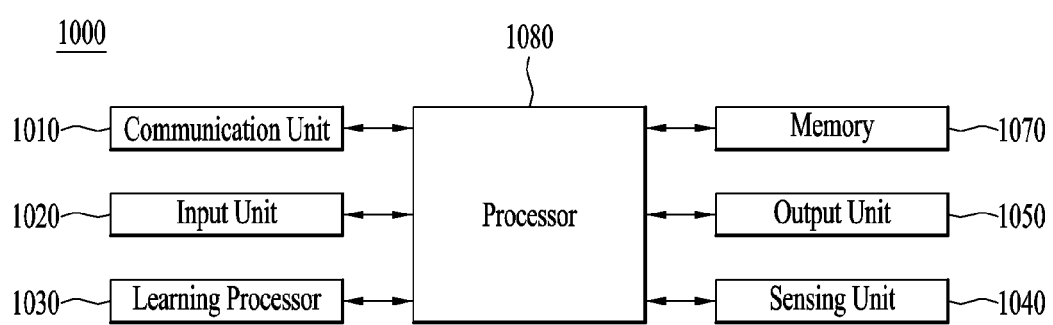
FIG. 10 is a block diagram illustrating an artificial intelligence (AI) device 100 according to an embodiment of the present disclosure.

FIG. 10 illustrates an AI device 1000 according to an embodiment of the present disclosure.

The AI device 1000 illustrated in FIG. 10 may be configured as a stationary device or a mobile device, such as a TV, a projector, a portable phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a digital signage, a robot, or a vehicle.

Referring to FIG. 10, the AI device 1000 may include a communication unit 1010, an input unit 1020, a learning processor 1030, a sensing unit 1040, an output unit 1050, a memory 1070, and a processor 1080.

The communication unit 1010 may transmit and receive data to and from an external device such as another AI device or an AI server by wired or wireless communication. For example, the communication unit 1010 may transmit and receive sensor information, a user input, a learning model, and a control signal to and from the external device.

Communication schemes used by the communication unit 1010 include global system for mobile communication (GSM), CDMA, LTE, 5G, wireless local area network (WLAN), wireless fidelity (Wi-Fi), Bluetooth™, radio frequency identification (RFID), infrared data association (IrDA), ZigBee, near field communication (NFC), and so on. Particularly, the 5G technology described before with reference to FIGS. 1 to 9 may also be applied.

The input unit 1020 may acquire various types of data. The input unit 1020 may include a camera for inputting a video signal, a microphone for receiving an audio signal, and a user input unit for receiving information from a user. The camera or the microphone may be treated as a sensor, and thus a signal acquired from the camera or the microphone may be referred to as sensing data or sensor information.

The input unit 1020 may acquire training data for model training and input data to be used to acquire an output by using a learning model. The input unit 1020 may acquire raw input data. In this case, the processor 1080 or the learning processor 1030 may extract an input feature by preprocessing the input data.

The learning processor 1030 may train a model composed of an ANN by using training data. The trained ANN may be referred to as a learning model. The learning model may be used to infer a result value for new input data, not training data, and the inferred value may be used as a basis for determination to perform a certain operation.

The learning processor 1030 may perform AI processing together with a learning processor of an AI server.

The learning processor 1030 may include a memory integrated or implemented in the AI device 1000. Alternatively, the learning processor 1030 may be implemented by using the memory 1070, an external memory directly connected to the AI device 1000, or a memory maintained in an external device.

The sensing unit 1040 may acquire at least one of internal information about the AI device 1000, ambient environment information about the AI device 1000, and user information by using various sensors.

The sensors included in the sensing unit 1040 may include a proximity sensor, an illumination sensor, an accelerator sensor, a magnetic sensor, a gyro sensor, an inertial sensor, a red, green, blue (RGB) sensor, an IR sensor, a fingerprint recognition sensor, an ultrasonic sensor, an optical sensor, a microphone, a light detection and ranging (LiDAR), and a radar.

The output unit 1050 may generate a visual, auditory, or haptic output.

Accordingly, the output unit 1050 may include a display unit for outputting visual information, a speaker for outputting auditory information, and a haptic module for outputting haptic information.

The memory 1070 may store data that supports various functions of the AI device 1000. For example, the memory 1070 may store input data acquired by the input unit 1020, training data, a learning model, a learning history, and so on.

The processor 1080 may determine at least one executable operation of the AI device 100 based on information determined or generated by a data analysis algorithm or a machine learning algorithm. The processor 1080 may control the components of the AI device 1000 to execute the determined operation.

To this end, the processor 1080 may request, search, receive, or utilize data of the learning processor 1030 or the memory 1070. The processor 1080 may control the components of the AI device 1000 to execute a predicted operation or an operation determined to be desirable among the at least one executable operation.

When the determined operation needs to be performed in conjunction with an external device, the processor 1080 may generate a control signal for controlling the external device and transmit the generated control signal to the external device.

The processor 1080 may acquire intention information with respect to a user input and determine the user's requirements based on the acquired intention information.

The processor 1080 may acquire the intention information corresponding to the user input by using at least one of a speech to text (STT) engine for converting a speech input into a text string or a natural language processing (NLP) engine for acquiring intention information of a natural language.

At least one of the STT engine or the NLP engine may be configured as an ANN, at least part of which is trained according to the machine learning algorithm. At least one of the STT engine or the NLP engine may be trained by the learning processor, a learning processor of the AI server, or distributed processing of the learning processors. For reference, specific components of the AI server are illustrated in FIG. 11.

The processor 1080 may collect history information including the operation contents of the AI device 1000 or the user's feedback on the operation and may store the collected history information in the memory 1070 or the learning processor 1030 or transmit the collected history information to the external device such as the AI server. The collected history information may be used to update the learning model.

The processor 1080 may control at least a part of the components of AI device 1000 so as to drive an application program stored in the memory 1070. Furthermore, the processor 1080 may operate two or more of the components included in the AI device 1000 in combination so as to drive the application program.

Figure 11:
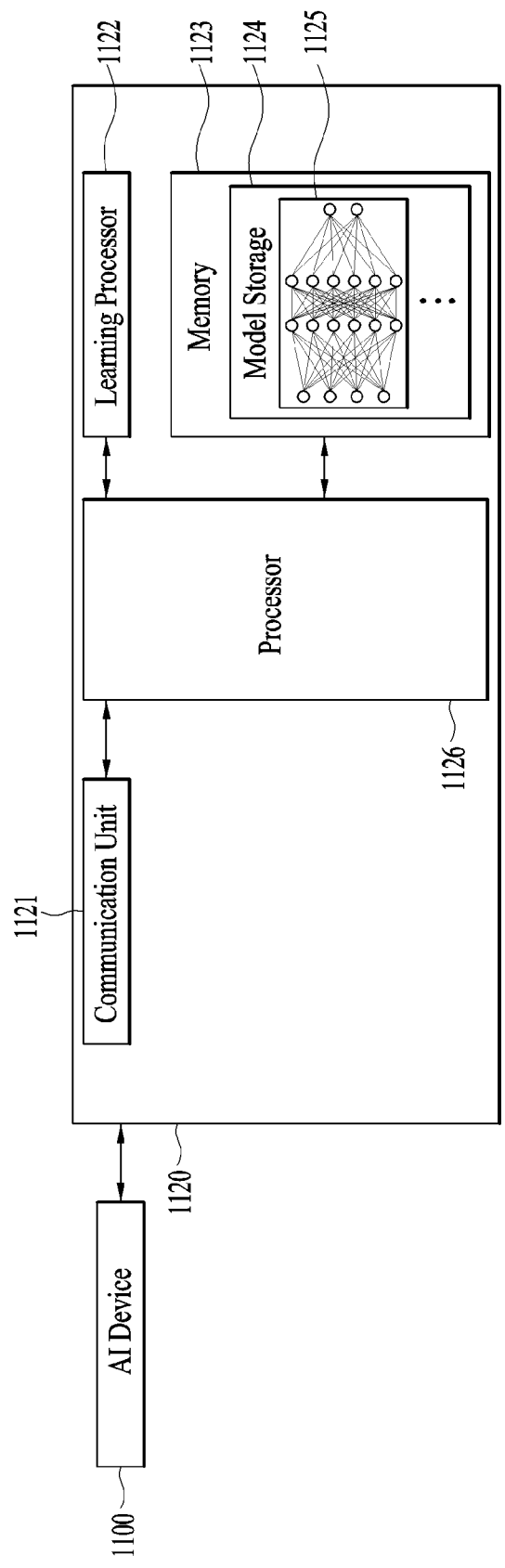
FIG. 11 is a block diagram illustrating an AI server 200 according to an embodiment of the present disclosure.

FIG. 11 illustrates an AI server 1120 according to an embodiment of the present disclosure.

Referring to FIG. 11, the AI server 1120 may refer to a device that trains an ANN by a machine learning algorithm or uses a trained ANN. The AI server 1120 may include a plurality of servers to perform distributed processing, or may be defined as a 5G network. The AI server 1120 may be included as part of the AI device 1100, and perform at least part of the AI processing.

The AI server 1120 may include a communication unit 1121, a memory 1123, a learning processor 1122, a processor 1126, and so on.

The communication unit 1121 may transmit and receive data to and from an external device such as the AI device 1100.

The memory 1123 may include a model storage 1124. The model storage 1124 may store a model (or an ANN 1125) which has been trained or is being trained through the learning processor 1122.

The learning processor 1122 may train the ANN 1125 by training data. The learning model may be used, while being loaded on the AI server 1120 of the ANN, or on an external device such as the AI device 1110.

The learning model may be implemented in hardware, software, or a combination of hardware and software. If all or part of the learning model is implemented in software, one or more instructions of the learning model may be stored in the memory 1123.

The processor 1126 may infer a result value for new input data by using the learning model and may generate a response or a control command based on the inferred result value.

Figure 12:
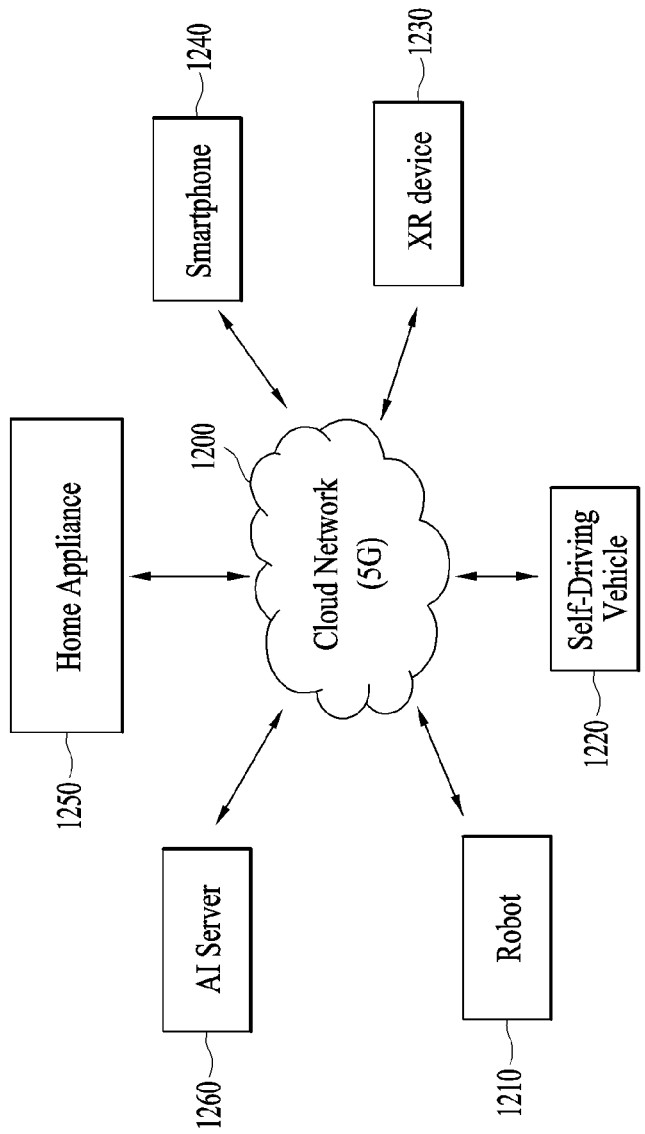
FIG. 12 is a diagram illustrating an AI system 1 according to an embodiment of the present disclosure.

FIG. 12 illustrates an AI system according to an embodiment of the present disclosure.

Referring to FIG. 12, in the AI system, at least one of an AI server 1260, a robot 1210, a self-driving vehicle 1220, an XR device 1230, a smartphone 1240, or a home appliance 1250 is connected to a cloud network 1200. The robot 1210, the self-driving vehicle 1220, the XR device 1230, the smartphone 1240, or the home appliance 1250, to which AI is applied, may be referred to as an AI device.

The cloud network 1200 may refer to a network that forms part of cloud computing infrastructure or exists in the cloud computing infrastructure. The cloud network 1200 may be configured by using a 3G network, a 4G or LTE network, or a 5G network.

That is, the devices 1210 to 1260 included in the AI system may be interconnected via the cloud network 1200. In particular, each of the devices 1210 to 1260 may communicate with each other directly or through a BS.

The AI server 1260 may include a server that performs AI processing and a server that performs computation on big data.

The AI server 1260 may be connected to at least one of the AI devices included in the AI system, that is, at least one of the robot 1210, the self-driving vehicle 1220, the XR device 1230, the smartphone 1240, or the home appliance 1250 via the cloud network 1200, and may assist at least part of AI processing of the connected AI devices 1210 to 1250.

The AI server 1260 may train the ANN according to the machine learning algorithm on behalf of the AI devices 1210 to 1250, and may directly store the learning model or transmit the learning model to the AI devices 1210 to 1250.

The AI server 1260 may receive input data from the AI devices 1210 to 1250, infer a result value for received input data by using the learning model, generate a response or a control command based on the inferred result value, and transmit the response or the control command to the AI devices 1210 to 1250.

Alternatively, the AI devices 1210 to 1250 may infer the result value for the input data by directly using the learning model, and generate the response or the control command based on the inference result.

Hereinafter, various embodiments of the AI devices 1210 to 1250 to which the above-described technology is applied will be described. The AI devices 1210 to 1250 illustrated in FIG. 12 may be regarded as a specific embodiment of the AI device 1000 illustrated in FIG. 10.

<AI+XR>

The XR device 1230, to which AI is applied, may be configured as a HMD, a HUD provided in a vehicle, a TV, a portable phone, a smartphone, a computer, a wearable device, a home appliance, a digital signage, a vehicle, a fixed robot, a mobile robot, or the like.

The XR device 1230 may acquire information about a surrounding space or a real object by analyzing 3D point cloud data or image data acquired from various sensors or an external device and thus generating position data and attribute data for the 3D points, and may render an XR object to be output. For example, the XR device 1230 may output an XR object including additional information about a recognized object in correspondence with the recognized object.

The XR device 1230 may perform the above-described operations by using the learning model composed of at least one ANN. For example, the XR device 1230 may recognize a real object from 3D point cloud data or image data by using the learning model, and may provide information corresponding to the recognized real object. The learning model may be trained directly by the XR device 1230 or by the external device such as the AI server 1260.

While the XR device 1230 may operate by generating a result by directly using the learning model, the XR device 1230 may operate by transmitting sensor information to the external device such as the AI server 1260 and receiving the result.

<AI+Robot+XR>

The robot 1210, to which AI and XR are applied, may be implemented as a guide robot, a delivery robot, a cleaning robot, a wearable robot, an entertainment robot, a pet robot, an unmanned flying robot, a drone, or the like.

The robot 1210, to which XR is applied, may refer to a robot to be controlled/interact within an XR image. In this case, the robot 1210 may be distinguished from the XR device 1230 and interwork with the XR device 1230.

When the robot 1210 to be controlled/interact within an XR image acquires sensor information from sensors each including a camera, the robot 1210 or the XR device 1230 may generate an XR image based on the sensor information, and the XR device 1230 may output the generated XR image. The robot 1210 may operate based on the control signal received through the XR device 1230 or based on the user's interaction.

For example, the user may check an XR image corresponding to a view of the robot 1210 interworking remotely through an external device such as the XR device 1210, adjust a self-driving route of the robot 1210 through interaction, control the operation or driving of the robot 1210, or check information about an ambient object around the robot 1210.

<AI+Self-Driving+XR>

The self-driving vehicle 1220, to which AI and XR are applied, may be implemented as a mobile robot, a vehicle, an unmanned flying vehicle, or the like.

The self-driving driving vehicle 1220, to which XR is applied, may refer to a self-driving vehicle provided with a means for providing an XR image or a self-driving vehicle to be controlled/interact within an XR image. Particularly, the self-driving vehicle 1220 to be controlled/interact within an XR image may be distinguished from the XR device 1230 and interwork with the XR device 1230.

The self-driving vehicle 1220 provided with the means for providing an XR image may acquire sensor information from the sensors each including a camera and output the generated XR image based on the acquired sensor information. For example, the self-driving vehicle 1220 may include an HUD to output an XR image, thereby providing a passenger with an XR object corresponding to a real object or an object on the screen.

When the XR object is output to the HUD, at least part of the XR object may be output to be overlaid on an actual object to which the passenger's gaze is directed. When the XR object is output to a display provided in the self-driving vehicle 1220, at least part of the XR object may be output to be overlaid on the object within the screen. For example, the self-driving vehicle 1220 may output XR objects corresponding to objects such as a lane, another vehicle, a traffic light, a traffic sign, a two-wheeled vehicle, a pedestrian, a building, and so on.

When the self-driving vehicle 1220 to be controlled/interact within an XR image acquires sensor information from the sensors each including a camera, the self-driving vehicle 1220 or the XR device 1230 may generate the XR image based on the sensor information, and the XR device 1230 may output the generated XR image. The self-driving vehicle 1220 may operate based on a control signal received through an external device such as the XR device 1230 or based on the user's interaction.

VR, AR, and MR technologies of the present disclosure are applicable to various devices, particularly, for example, a HMD, a HUD attached to a vehicle, a portable phone, a tablet PC, a laptop computer, a desktop computer, a TV, and a signage. The VR, AR, and MR technologies may also be applicable to a device equipped with a flexible or rollable display.

The above-described VR, AR, and MR technologies may be implemented based on CG and distinguished by the ratios of a CG image in an image viewed by the user.

That is, VR provides a real object or background only in a CG image, whereas AR overlays a virtual CG image on an image of a real object.

MR is similar to AR in that virtual objects are mixed and combined with a real world. However, a real object and a virtual object created as a CG image are distinctive from each other and the virtual object is used to complement the real object in AR, whereas a virtual object and a real object are handled equally in MR. More specifically, for example, a hologram service is an MR representation.

These days, VR, AR, and MR are collectively called XR without distinction among them. Therefore, embodiments of the present disclosure are applicable to all of VR, AR, MR, and XR.

For example, wired/wireless communication, input interfacing, output interfacing, and computing devices are available as hardware (HW)-related element techniques applied to VR, AR, MR, and XR. Further, tracking and matching, speech recognition, interaction and user interfacing, location-based service, search, and AI are available as software (SW)-related element techniques.

Particularly, the embodiments of the present disclosure are intended to address at least one of the issues of communication with another device, efficient memory use, data throughput decrease caused by inconvenient user experience/user interface (UX/UI), video, sound, motion sickness, or other issues.

Figure 13:
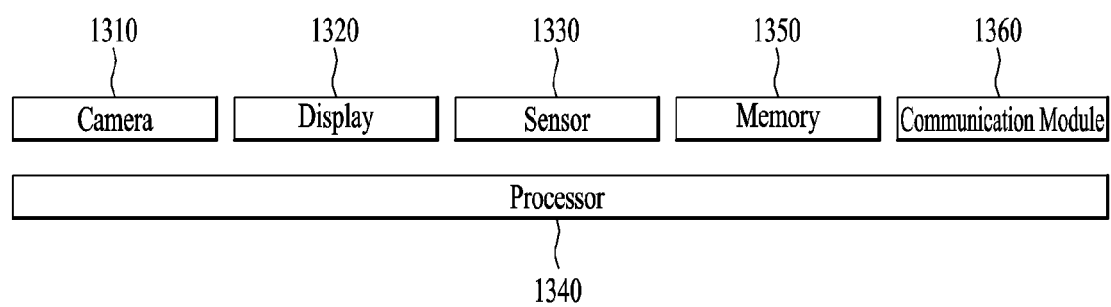
FIG. 13 is a block diagram illustrating an extended reality (XR) device according to embodiments of the present disclosure.

FIG. 13 is a block diagram illustrating an XR device according to embodiments of the present disclosure. The XR device 1300 includes a camera 1310, a display 1320, a sensor 1330, a processor 1340, a memory 1350, and a communication module 1360. Obviously, one or more of the modules may be deleted or modified, and one or more modules may be added to the modules, when needed, without departing from the scope and spirit of the present disclosure.

The communication module 1360 may communicate with an external device or a server, wiredly or wirelessly. The communication module 1360 may use, for example, Wi-Fi, Bluetooth, or the like, for short-range wireless communication, and for example, a 3GPP communication standard for long-range wireless communication. LTE is a technology beyond 3GPP TS 36.xxx Release 8. Specifically, LTE beyond 3GPP TS 36.xxx Release 10 is referred to as LTE-A, and LTE beyond 3GPP TS 36.xxx Release 13 is referred to as LTE-A pro. 3GPP 5G refers to a technology beyond TS 36.xxx Release 15 and a technology beyond TS 38.XXX Release 15. Specifically, the technology beyond TS 38.xxx Release 15 is referred to as 3GPP NR, and the technology beyond TS 36.xxx Release 15 is referred to as enhanced LTE. "xxx" represents the number of a technical specification. LTE/NR may be collectively referred to as a 3GPP system.

The camera 1310 may capture an ambient environment of the XR device 1300 and convert the captured image to an electric signal. The image, which has been captured and converted to an electric signal by the camera 1310, may be stored in the memory 1350 and then displayed on the display 1320 through the processor 1340. Further, the image may be displayed on the display 1320 by the processor 1340, without being stored in the memory 1350. Further, the camera 110 may have a field of view (FoV). The FoV is, for example, an area in which a real object around the camera 1310 may be detected. The camera 1310 may detect only a real object within the FoV. When a real object is located within the FoV of the camera 1310, the XR device 1300 may display an AR object corresponding to the real object. Further, the camera 1310 may detect an angle between the camera 1310 and the real object.

The sensor 1330 may include at least one sensor. For example, the sensor 1330 includes a sensing means such as a gravity sensor, a geomagnetic sensor, a motion sensor, a gyro sensor, an accelerator sensor, an inclination sensor, a brightness sensor, an altitude sensor, an olfactory sensor, a temperature sensor, a depth sensor, a pressure sensor, a bending sensor, an audio sensor, a video sensor, a global positioning system (GPS) sensor, and a touch sensor. Further, although the display 1320 may be of a fixed type, the display 1320 may be configured as a liquid crystal display (LCD), an organic light emitting diode (OLED) display, an electroluminescent display (ELD), or a micro LED (M-LED) display, to have flexibility. Herein, the sensor 1330 is designed to detect a bending degree of the display 1320 configured as the afore-described LCD, OLED display, ELD, or M-LED display.

The memory 1350 is equipped with a function of storing all or a part of result values obtained by wired/wireless communication with an external device or a service as well as a function of storing an image captured by the camera 1310. Particularly, considering the trend toward increased communication data traffic (e.g., in a 5G communication environment), efficient memory management is required. In this regard, a description will be given below with reference to FIG. 14.

Figure 14:
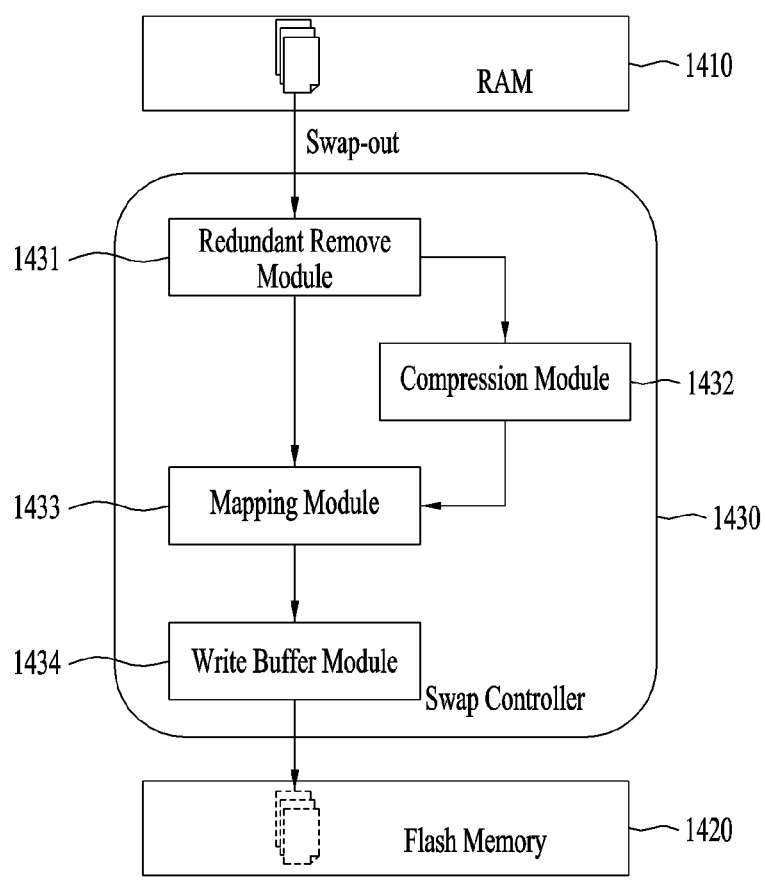
FIG. 14 is a detailed block diagram illustrating a memory illustrated in FIG. 13.

FIG. 14 is a detailed block diagram of the memory 1350 illustrated in FIG. 13. With reference to FIG. 14, a swap-out process between a random access memory (RAM) and a flash memory according to an embodiment of the present disclosure will be described.

When swapping out AR/VR page data from a RAM 1410 to a flash memory 1420, a controller 1430 may swap out only one of two or more AR/VR page data of the same contents among AR/VR page data to be swapped out to the flash memory 1420.

That is, the controller 1430 may calculate an identifier (e.g., a hash function) that identifies each of the contents of the AR/VR page data to be swapped out, and determine that two or more AR/VR page data having the same identifier among the calculated identifiers contain the same contents. Accordingly, the problem that the lifetime of an AR/VR device including the flash memory 1420 as well as the lifetime of the flash memory 1420 is reduced because unnecessary AR/VR page data is stored in the flash memory 1420 may be overcome.

The operations of the controller 1430 may be implemented in software or hardware without departing from the scope of the present disclosure. More specifically, the memory illustrated in FIG. 14 is included in a HMD, a vehicle, a portable phone, a tablet PC, a laptop computer, a desktop computer, a TV, a signage, or the like, and executes a swap function.

A device according to embodiments of the present disclosure may process 3D point cloud data to provide various services such as VR, AR, MR, XR, and self-driving to a user.

A sensor collecting 3D point cloud data may be any of, for example, a LiDAR, a red, green, blue depth (RGB-D), and a 3D laser scanner. The sensor may be mounted inside or outside of a HMD, a vehicle, a portable phone, a tablet PC, a laptop computer, a desktop computer, a TV, a signage, or the like.

Figure 15:
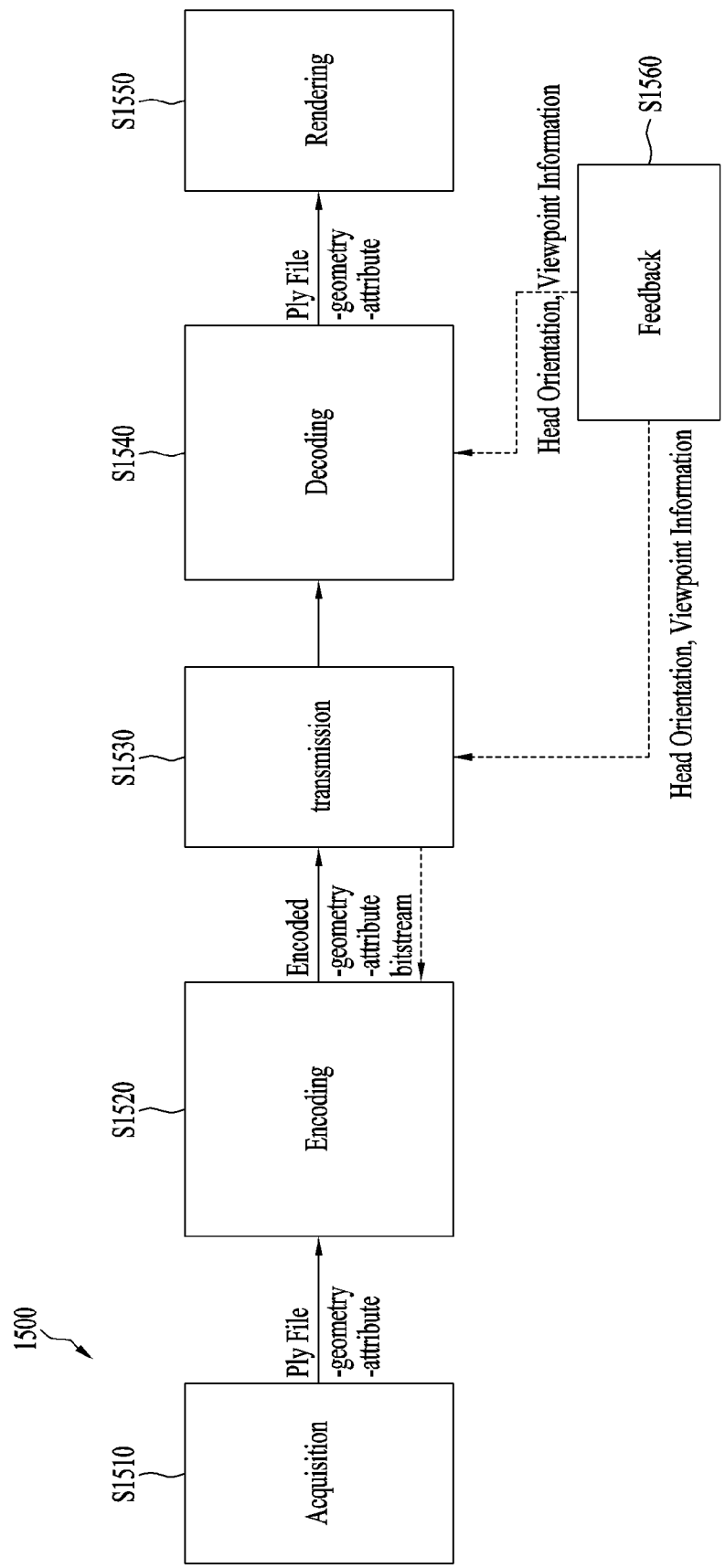
FIG. 15 is a block diagram illustrating a point cloud data processing system.

FIG. 15 illustrates a point cloud data processing system.

Referring to FIG. 15, a point cloud processing system 1500 includes a transmission device which acquires, encodes, and transmits point cloud data, and a reception device which acquires point cloud data by receiving and decoding video data. As illustrated in FIG. 15, point cloud data according to embodiments of the present disclosure may be acquired by capturing, synthesizing, or generating the point cloud data (S1510). During the acquisition, data (e.g., a polygon file format or standard triangle format (PLY) file) of 3D positions (x, y, z)/attributes (color, reflectance, transparency, and so on) of points may be generated. For a video of multiple frames, one or more files may be acquired. Point cloud data-related metadata (e.g., metadata related to capturing) may be generated during the capturing. The transmission device or encoder according to embodiments of the present disclosure may encode the point cloud data by video-based point cloud compression (V-PCC) or geometry-based point cloud compression (G-PCC), and output one or more video streams (S1520). V-PCC is a scheme of compressing point cloud data based on a 2D video codec such as high efficiency video coding (HEVC) or versatile video coding (VVC), G-PCC is a scheme of encoding point cloud data separately into two streams: geometry and attribute. The geometry stream may be generated by reconstructing and encoding position information about points, and the attribute stream may be generated by reconstructing and encoding attribute information (e.g., color) related to each point. In V-PCC, despite compatibility with a 2D video, much data is required to recover V-PCC-processed data (e.g., geometry video, attribute video, occupancy map video, and auxiliary information), compared to G-PCC, thereby causing a long latency in providing a service. One or more output bit streams may be encapsulated along with related metadata in the form of a file (e.g., a file format such as ISOBMFF) and transmitted over a network or through a digital storage medium (S1530).

The device or processor according to embodiments of the present disclosure may acquire one or more bit streams and related metadata by decapsulating the received video data, and recover 3D point cloud data by decoding the acquired bit streams in V-PCC or G-PCC (S1540). A renderer may render the decoded point cloud data and provide content suitable for VR/AR/MR/service to the user on a display (S1550).

As illustrated in FIG. 15, the device or processor according to embodiments of the present disclosure may perform a feedback process of transmitting various pieces of feedback information acquired during the rendering/display to the transmission device or to the decoding process (S1560). The feedback information according to embodiments of the present disclosure may include head orientation information, viewport information indicating an area that the user is viewing, and so on. Because the user interacts with a service (or content) provider through the feedback process, the device according to embodiments of the present disclosure may provide a higher data processing speed by using the afore-described V-PCC or G-PCC scheme or may enable clear video construction as well as provide various services in consideration of high user convenience.

Figure 16:
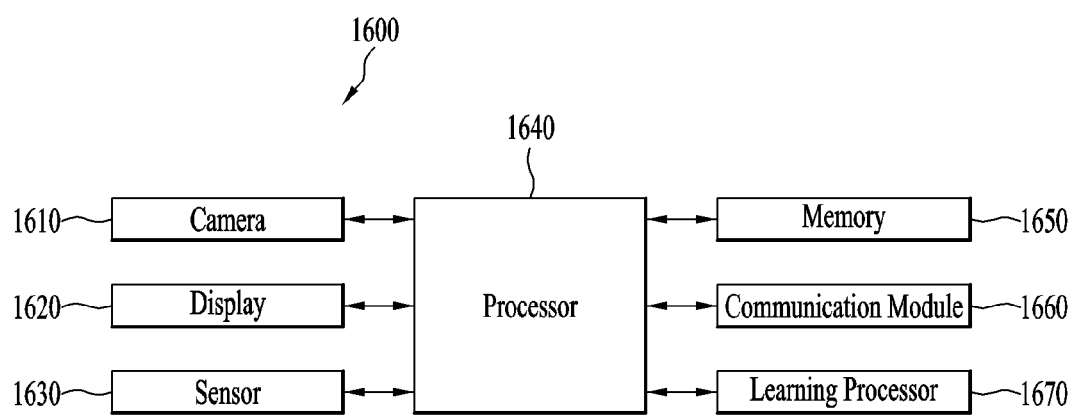
FIG. 16 is a block diagram illustrating a device including a learning processor.

FIG. 16 is a block diagram of an XR device 1600 including a learning processor. Compared to FIG. 13, only a learning processor 1670 is added, and thus a redundant description is avoided because FIG. 13 may be referred to for the other components.

Referring to FIG. 16, the XR device 1600 may be loaded with a learning model. The learning model may be implemented in hardware, software, or a combination of hardware and software. If the whole or part of the learning model is implemented in software, one or more instructions that form the learning model may be stored in a memory 1650.

According to embodiments of the present disclosure, a learning processor 1670 may be coupled communicably to a processor 1640, and repeatedly train a model including ANNs by using training data. An ANN is an information processing system in which multiple neurons are linked in layers, modeling an operation principle of biological neurons and links between neurons. An ANN is a statistical learning algorithm inspired by a neural network (particularly the brain in the central nervous system of an animal) in machine learning and cognitive science. Machine learning is one field of AI, in which the ability of learning without an explicit program is granted to a computer. Machine learning is a technology of studying and constructing a system for learning, predicting, and improving its capability based on empirical data, and an algorithm for the system. Therefore, according to embodiments of the present disclosure, the learning processor 1670 may infer a result value from new input data by determining optimized model parameters of an ANN. Therefore, the learning processor 1670 may analyze a device use pattern of a user based on device use history information about the user. Further, the learning processor 1670 may be configured to receive, classify, store, and output information to be used for data mining, data analysis, intelligent decision, and a machine learning algorithm and technique.

According to embodiments of the present disclosure, the processor 1640 may determine or predict at least one executable operation of the device based on data analyzed or generated by the learning processor 1670. Further, the processor 1640 may request, search, receive, or use data of the learning processor 1670, and control the XR device 1600 to perform a predicted operation or an operation determined to be desirable among the at least one executable operation. According to embodiments of the present disclosure, the processor 1640 may execute various functions of realizing intelligent emulation (i.e., knowledge-based system, reasoning system, and knowledge acquisition system). The various functions may be applied to an adaptation system, a machine learning system, and various types of systems including an ANN (e.g., a fuzzy logic system). That is, the processor 1640 may predict a user's device use pattern based on data of a use pattern analyzed by the learning processor 1670, and control the XR device 1600 to provide a more suitable XR service to the UE. Herein, the XR service includes at least one of the AR service, the VR service, or the MR service.

Figure 17:
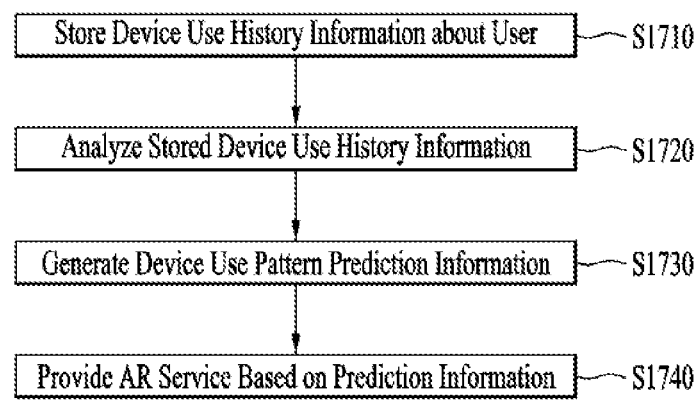
FIG. 17 is a flowchart illustrating a process of providing an XR service by an XR device 1600 of the present disclosure, illustrated in FIG. 16.

FIG. 17 illustrates a process of providing an XR service by the XR service 1600 of the present disclosure illustrated in FIG. 16.

According to embodiments of the present disclosure, the processor 1670 may store device use history information about a user in the memory 1650 (S1710). The device use history information may include information about the name, category, and contents of content provided to the user, information about a time at which a device has been used, information about a place in which the device has been used, time information, and information about use of an application installed in the device.

According to embodiments of the present disclosure, the learning processor 1670 may acquire device use pattern information about the user by analyzing the device use history information (S1720). For example, when the XR device 1600 provides specific content A to the user, the learning processor 1670 may learn information about a pattern of the device used by the user using the corresponding terminal by combining specific information about content A (e.g., information about the ages of users that generally use content A, information about the contents of content A, and content information similar to content A), and information about the time points, places, and number of times in which the user using the corresponding terminal has consumed content A.

According to embodiments of the present disclosure, the processor 1640 may acquire the user device pattern information generated based on the information learned by the learning processor 1670, and generate device use pattern prediction information (S1730). Further, when the user is not using the device 1600, if the processor 1640 determines that the user is located in a place where the user has frequently used the device 1600, or it is almost time for the user to usually use the device 1600, the processor 1640 may indicate the device 1600 to operate. In this case, the device according to embodiments of the present disclosure may provide AR content based on the user pattern prediction information (S1740).

When the user is using the device 1600, the processor 1640 may check information about content currently provided to the user, and generate device use pattern prediction information about the user in relation to the content (e.g., when the user requests other related content or additional data related to the current content). Further, the processor 1640 may provide AR content based on the device use pattern prediction information by indicating the device 1600 to operate (S1740). The AR content according to embodiments of the present disclosure may include an advertisement, navigation information, danger information, and so on.

Figure 18:
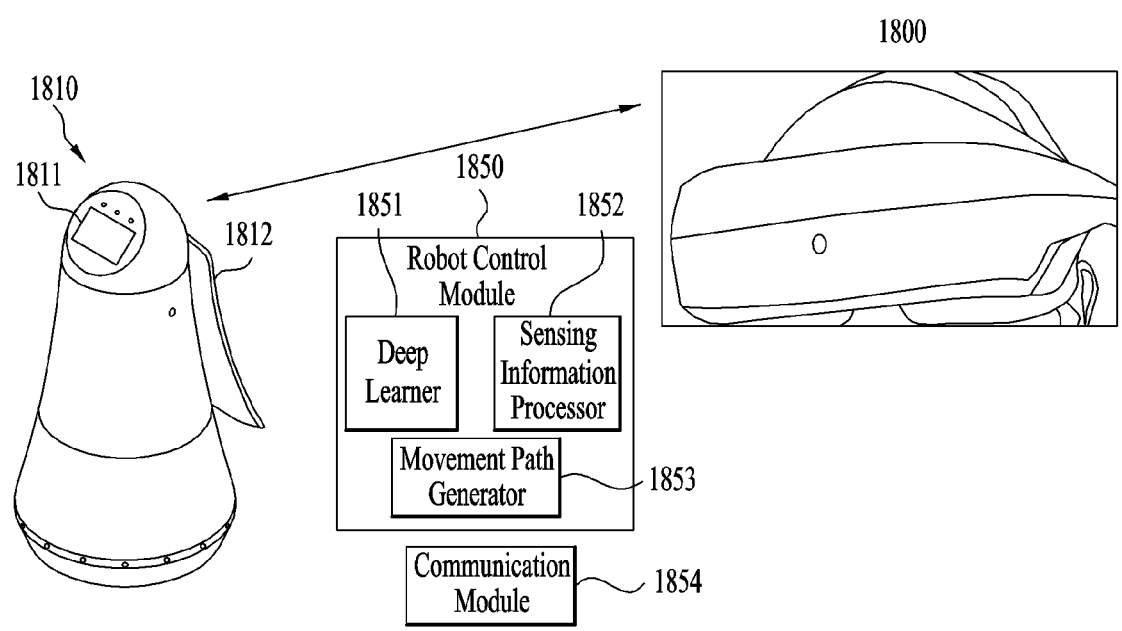
FIG. 18 is a diagram illustrating the outer appearances of an XR device and a robot.

FIG. 18 illustrates the outer appearances of an XR device and a robot.

Component modules of an XR device 1800 according to an embodiment of the present disclosure have been described before with reference to the previous drawings, and thus a redundant description is not provided herein.

The outer appearance of a robot 1810 illustrated in FIG. 18 is merely an example, and the robot 1810 may be implemented to have various outer appearances according to the present disclosure. For example, the robot 1810 illustrated in FIG. 18 may be a drone, a cleaner, a cook root, a wearable robot, or the like. Particularly, each component of the robot 1810 may be disposed at a different position such as up, down, left, right, back, or forth according to the shape of the robot 1810.

The robot 1810 may be provided, on the exterior thereof, with various sensors to identify ambient objects. Further, to provide specific information to a user, the robot 1810 may be provided with an interface unit 1811 on top or the rear surface 1812 thereof.

To sense movement of the robot 1810 and an ambient object, and control the robot 1810, a robot control module 1850 is mounted inside the robot 1810. The robot control module 1850 may be implemented as a software module or a hardware chip with the software module implemented therein. The robot control module 1850 may include a deep learner 1851, a sensing information processor 1852, a movement path generator 1853, and a communication module 1854.

The sensing information processor 1852 collects and processes information sensed by various types of sensors (e.g., a LiDAR sensor, an IR sensor, an ultrasonic sensor, a depth sensor, an image sensor, and a microphone) arranged in the robot 1810.

The deep learner 1851 may receive information processed by the sensing information processor 1851 or accumulative information stored during movement of the robot 1810, and output a result required for the robot 1810 to determine an ambient situation, process information, or generate a moving path.

The moving path generator 1852 may calculate a moving path of the robot 1810 by using the data calculated by the deep learner 8151 or the data processed by the sensing information processor 1852.

Because each of the XR device 1800 and the robot 1810 is provided with a communication module, the XR device 1800 and the robot 1810 may transmit and receive data by short-range wireless communication such as Wi-Fi or Bluetooth, or 5G long-range wireless communication. A technique of controlling the robot 1810 by using the XR device 1800 will be described below with reference to FIG. 19.

Figure 19:
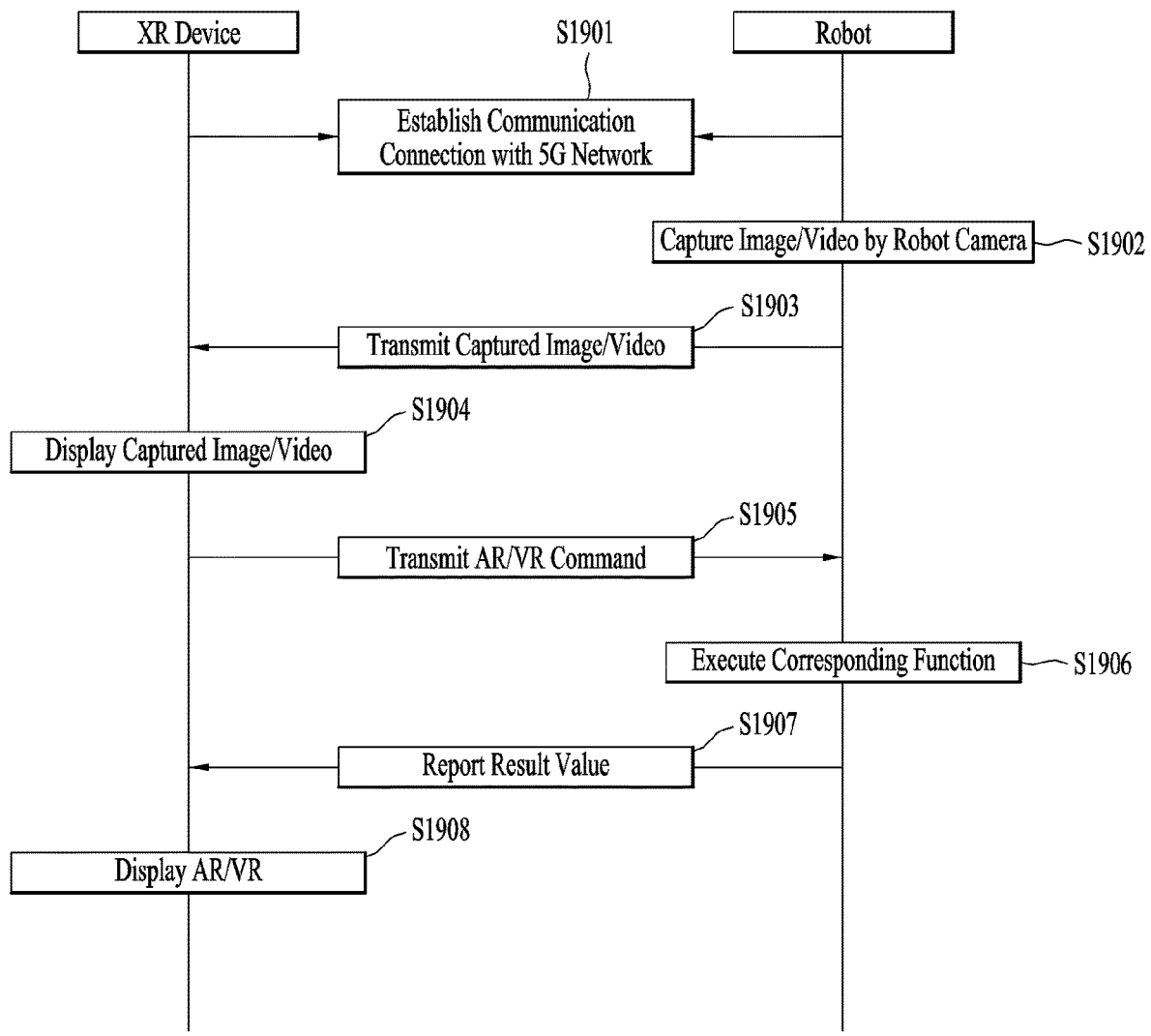
FIG. 19 is a flowchart illustrating a process of controlling a robot by using an XR device.

FIG. 19 is a flowchart illustrating a process of controlling a robot by using an XR device.

The XR device and the robot are connected communicably to a 5G network (S1901). Obviously, the XR device and the robot may transmit and receive data by any other short-range or long-range communication technology without departing from the scope of the present disclosure.

The robot captures an image/video of the surroundings of the robot by means of at least one camera installed on the interior or exterior of the robot (S1902) and transmits the captured image/video to the XR device (S1903). The XR device displays the captured image/video (S1904) and transmits a command for controlling the robot to the robot (S1905). The command may be input manually by a user of the XR device or automatically generated by AI without departing from the scope of the disclosure.

The robot executes a function corresponding to the command received in step S1905 (S1906) and transmits a result value to the XR device (S1907). The result value may be a general indicator indicating whether data has been successfully processed or not, a current captured image, or specific data in which the XR device is considered. The specific data is designed to change, for example, according to the state of the XR device. If a display of the XR device is in an off state, a command for turning on the display of the XR device is included in the result value in step S1907. Therefore, when an emergency situation occurs around the robot, even though the display of the remote XR device is turned off, a notification message may be transmitted.

AR/VR content is displayed according to the result value received in step S1907 (S1908).

According to another embodiment of the present disclosure, the XR device may display position information about the robot by using a GPS module attached to the robot.

The XR device 1300 described with reference to FIG. 13 may be connected to a vehicle that provides a self-driving service in a manner that allows wired/wireless communication, or may be mounted on the vehicle that provides the self-driving service. Accordingly, various services including AR/VR may be provided even in the vehicle that provides the self-driving service.

Figure 20:
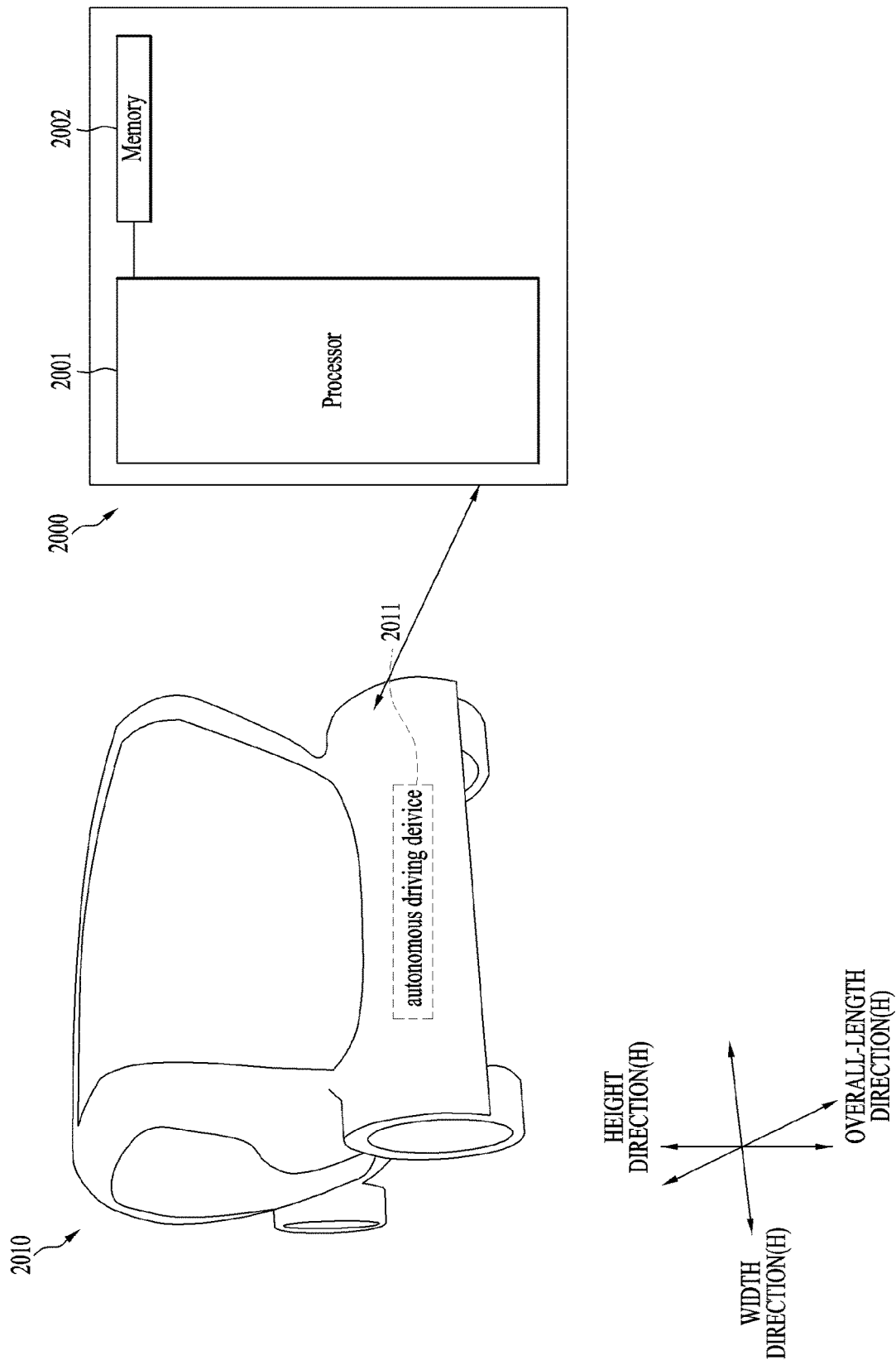
FIG. 20 is a diagram illustrating a vehicle that provides a self-driving service.

FIG. 20 illustrates a vehicle that provides a self-driving service.

According to embodiments of the present disclosure, a vehicle 2010 may include a car, a train, and a motor bike as transportation means traveling on a road or a railway. According to embodiments of the present disclosure, the vehicle 2010 may include all of an internal combustion engine vehicle provided with an engine as a power source, a hybrid vehicle provided with an engine and an electric motor as a power source, and an electric vehicle provided with an electric motor as a power source.

According to embodiments of the present disclosure, the vehicle 2010 may include the following components in order to control operations of the vehicle 2010: a user interface device, an object detection device, a communication device, a driving maneuver device, a main electronic control unit (ECU), a drive control device, a self-driving device, a sensing unit, and a position data generation device.

Each of the user interface device, the object detection device, the communication device, the driving maneuver device, the main ECU, the drive control device, the self-driving device, the sensing unit, and the position data generation device may generate an electric signal, and be implemented as an electronic device that exchanges electric signals.

The user interface device may receive a user input and provide information generated from the vehicle 2010 to a user in the form of a UI or UX. The user interface device may include an input/output (I/O) device and a user monitoring device. The object detection device may detect the presence or absence of an object outside of the vehicle 2010, and generate information about the object. The object detection device may include at least one of, for example, a camera, a LiDAR, an IR sensor, or an ultrasonic sensor. The camera may generate information about an object outside of the vehicle 2010. The camera may include one or more lenses, one or more image sensors, and one or more processors for generating object information. The camera may acquire information about the position, distance, or relative speed of an object by various image processing algorithms. Further, the camera may be mounted at a position where the camera may secure an FoV in the vehicle 2010, to capture an image of the surroundings of the vehicle 1020, and may be used to provide an AR/VR-based service. The LiDAR may generate information about an object outside of the vehicle 2010. The LiDAR may include a light transmitter, a light receiver, and at least one processor which is electrically coupled to the light transmitter and the light receiver, processes a received signal, and generates data about an object based on the processed signal.

The communication device may exchange signals with a device (e.g., infrastructure such as a server or a broadcasting station), another vehicle, or a terminal) outside of the vehicle 2010. The driving maneuver device is a device that receives a user input for driving. In manual mode, the vehicle 2010 may travel based on a signal provided by the driving maneuver device. The driving maneuver device may include a steering input device (e.g., a steering wheel), an acceleration input device (e.g., an accelerator pedal), and a brake input device (e.g., a brake pedal).

The sensing unit may sense a state of the vehicle 2010 and generate state information. The position data generation device may generate position data of the vehicle 2010. The position data generation device may include at least one of a GPS or a differential global positioning system (DGPS). The position data generation device may generate position data of the vehicle 2010 based on a signal generated from at least one of the GPS or the DGPS. The main ECU may provide overall control to at least one electronic device provided in the vehicle 2010, and the drive control device may electrically control a vehicle drive device in the vehicle 2010.

The self-driving device may generate a path for the self-driving service based on data acquired from the object detection device, the sensing unit, the position data generation device, and so on. The self-driving device may generate a driving plan for driving along the generated path, and generate a signal for controlling movement of the vehicle according to the driving plan. The signal generated from the self-driving device is transmitted to the drive control device, and thus the drive control device may control the vehicle drive device in the vehicle 2010.

As illustrated in FIG. 20, the vehicle 2010 that provides the self-driving service is connected to an XR device 2000 in a manner that allows wired/wireless communication. The XR device 2000 may include a processor 2001 and a memory 2002. While not shown, the XR device 2000 of FIG. 20 may further include the components of the XR device 1300 described before with reference to FIG. 13.

If the XR device 2000 is connected to the vehicle 2010 in a manner that allows wired/wireless communication. The XR device 2000 may receive/process AR/VR service-related content data that may be provided along with the self-driving service, and transmit the received/processed AR/VR service-related content data to the vehicle 2010. Further, when the XR device 2000 is mounted on the vehicle 2010, the XR device 2000 may receive/process AR/VR service-related content data according to a user input signal received through the user interface device and provide the received/processed AR/VR service-related content data to the user. In this case, the processor 2001 may receive/process the AR/VR service-related content data based on data acquired from the object detection device, the sensing unit, the position data generation device, the self-driving device, and so on. According to embodiments of the present disclosure, the AR/VR service-related content data may include entertainment content, weather information, and so on which are not related to the self-driving service as well as information related to the self-driving service such as driving information, path information for the self-driving service, driving maneuver information, vehicle state information, and object information.

Figure 21:
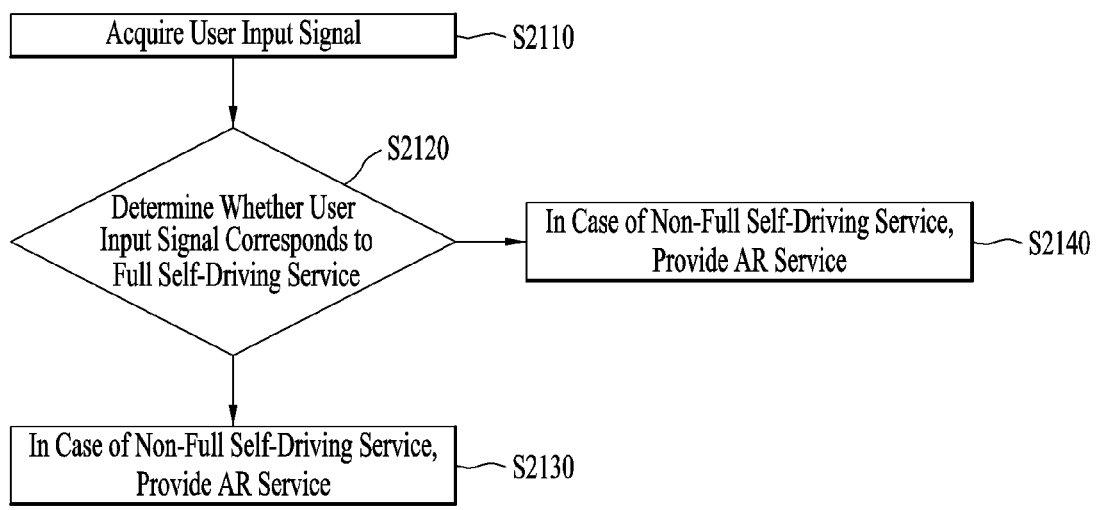
FIG. 21 is a flowchart illustrating a process of providing an augmented reality/virtual reality (AR/VR) service during a self-driving service in progress.

FIG. 21 illustrates a process of providing an AR/VR service during a self-driving service.

According to embodiments of the present disclosure, a vehicle or a user interface device may receive a user input signal (S2110). According to embodiments of the present disclosure, the user input signal may include a signal indicating a self-driving service. According to embodiments of the present disclosure, the self-driving service may include a full self-driving service and a general self-driving service. The full self-driving service refers to perfect self-driving of a vehicle to a destination without a user's manual driving, whereas the general self-driving service refers to driving a vehicle to a destination through a user's manual driving and self-driving in combination.

It may be determined whether the user input signal according to embodiments of the present disclosure corresponds to the full self-driving service (S2120). When it is determined that the user input signal corresponds to the full self-driving service, the vehicle according to embodiments of the present disclosure may provide the full self-driving service (S2130). Because the full self-driving service does not need the user's manipulation, the vehicle according to embodiments of the present disclosure may provide VR service-related content to the user through a window of the vehicle, a side mirror of the vehicle, an HMD, or a smartphone (S2130). The VR service-related content according to embodiments of the present disclosure may be content related to full self-driving (e.g., navigation information, driving information, and external object information), and may also be content which is not related to full self-driving according to user selection (e.g., weather information, a distance image, a nature image, and a voice call image).

If it is determined that the user input signal does not correspond to the full self-driving service, the vehicle according to embodiments of the present disclosure may provide the general self-driving service (S2140). Because the FoV of the user should be secured for the user's manual driving in the general self-driving service, the vehicle according to embodiments of the present disclosure may provide AR service-related content to the user through a window of the vehicle, a side mirror of the vehicle, an HMD, or a smartphone (S2140).

The AR service-related content according to embodiments of the present disclosure may be content related to full self-driving (e.g., navigation information, driving information, and external object information), and may also be content which is not related to self-driving according to user selection (e.g., weather information, a distance image, a nature image, and a voice call image).

Figure 22:
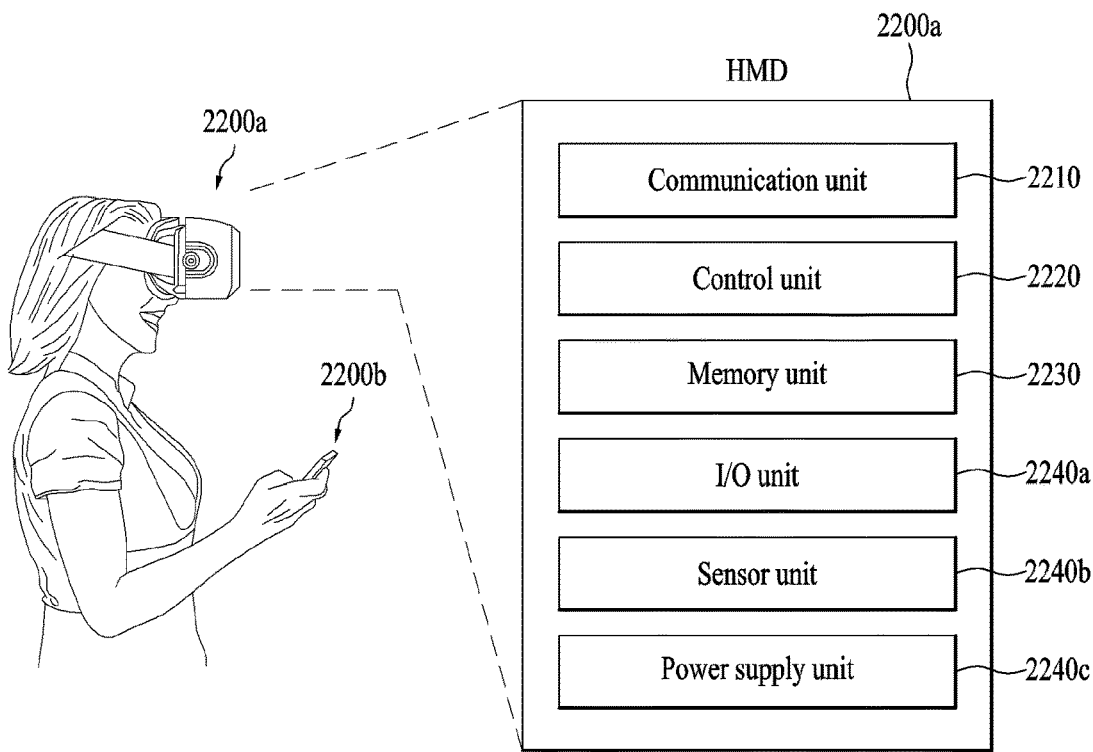
FIG. 22 is a view showing an embodiment of an XR device of an HMD type according to the present disclosure.

FIG. 22 is a conceptual diagram illustrating an exemplary method for implementing the XR device using an HMD type according to an embodiment of the present disclosure. The above-mentioned embodiments may also be implemented in HMD types shown in FIG. 22.

The HMD-type XR device 2200*a* shown in FIG. 22 may include a communication unit 2210, a control unit 2220, a memory unit 2230, an input/output (I/O) unit 2240*a*, a sensor unit 2240*b*, a power-supply unit 2240*c*, etc. Specifically, the communication unit 2210 embedded in the XR device 2200*a* may communicate with a mobile terminal 2200*b* by wire or wirelessly. The mobile terminal may be a smart phone or a tablet personal computer (PC).

Figure 23:
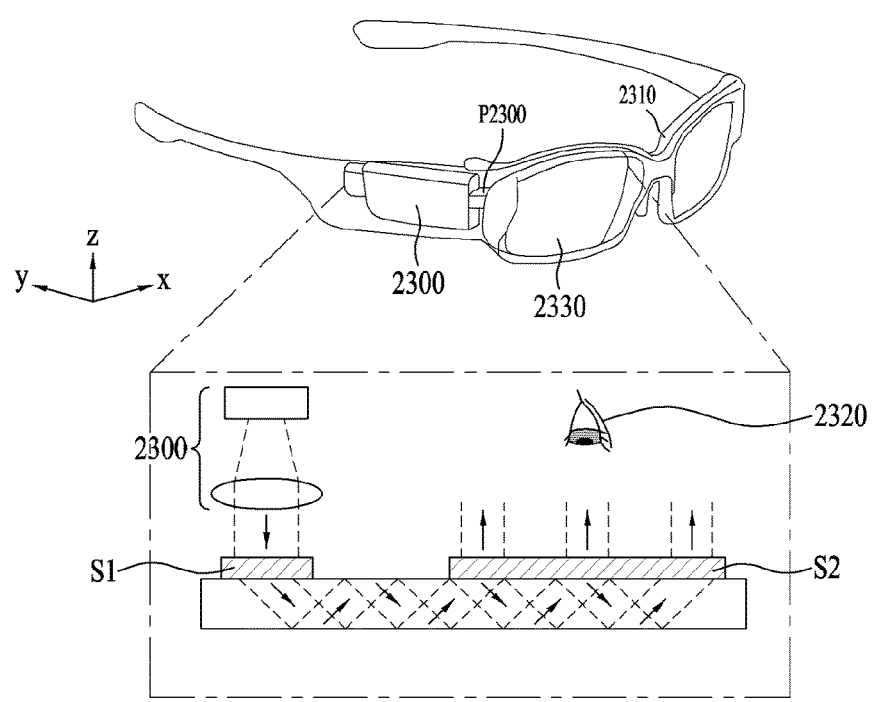
FIG. 23 is a view showing an embodiment of an XR device of XR glasses type according to the present disclosure.

FIG. 23 is a conceptual diagram illustrating an exemplary method for implementing an XR device using AR glasses according to an embodiment of the present disclosure. The above-mentioned embodiments may also be implemented in AR glass types shown in FIG. 23.

Referring to FIG. 23, the AR glasses may include a frame, a control unit 2300, and an optical display unit 2330.

Although the frame may be formed in a shape of glasses worn on the face of the user 2320 as shown in FIG. 23, the scope of the present disclosure is not limited thereto, and it should be noted that the frame may also be formed in a shape of goggles worn in close contact with the face of the user 2320.

The frame may include a front frame 2310 and first and second side frames.

The front frame 2310 may include at least one opening, and may extend in a first horizontal direction (i.e., an X-axis direction). The first and second side frames may extend in the second horizontal direction (i.e., a Y-axis direction) perpendicular to the front frame 2310, and may extend in parallel to each other.

The control unit 2300 may generate an image to be viewed by the user 2320 or may generate the resultant image formed by successive images. The control unit 2300 may include an image source configured to create and generate images, a plurality of lenses configured to diffuse and converge light generated from the image source, and the like. The images generated by the control unit 2300 may be transferred to the optical display unit 300 through a guide lens P2300 disposed between the control unit 2300 and the optical display unit 2330.

The control unit 2300 may be fixed to any one of the first and second side frames. For example, the control unit 2300 may be fixed to the inside or outside of any one of the side frames, or may be embedded in and integrated with any one of the side frames.

The optical display unit 2330 may be formed of a translucent material, so that the optical display unit 2330 can display images created by the control unit 2300 for recognition of the user 2320 and can allow the user to view the external environment through the opening.

The optical display unit 2330 may be inserted into and fixed to the opening contained in the front frame 2310, or may be located at the rear surface (interposed between the opening and the user 2320) of the opening so that the optical display unit 2330 may be fixed to the front frame 2310. For example, the optical display unit 2330 may be located at the rear surface of the opening, and may be fixed to the front frame 2310 as an example.

Referring to the XR device shown in FIG. 23, when image light are incident upon an incident region S1 of the optical display unit 2330 by the control unit 2300, image light may be transmitted to an emission region S2 of the optical display unit 2330 through the optical display unit 2330, images created by the control unit 2300 can be displayed for recognition of the user 2320.

Accordingly, the user 2320 may view the external environment through the opening of the frame, and at the same time may view the images created by the control unit 2300.

Meanwhile, a navigation system applied to a vehicle is one of a main driver support system that provides functions such as path search and navigation, and its utility has been remarkably increased.

The navigation system determines a current position of a moving body (e.g., car) by receiving a navigation message transmitted from a satellite for a global positioning system (GPS), displays the current position of the moving body on a screen by matching the current position of the moving body with map data, and searches a driving path from the current position of the moving body to a destination. Particularly, the navigation system applied to the vehicle guides a user to drive a vehicle along a driving path searched from a current position of a vehicle to a destination, whereby the user may efficiently use a given road network.

In one embodiment of the present disclosure, information for guiding a path to a user or information related to road is provided to the user by overlapping virtual objects (or AR objects) such as computer graphics (CG) or text message on an image (that is, a reality world actually viewed by a user) of a real space captured by a camera in real time.

At this time, in order to display AR objects such as a driving path on a real road captured by a camera by overlap, two positions should be matched with each other. That is, a coordinate of a screen where an image captured by a camera is displayed should be matched with a coordinate of an AR object overlapped on the screen. Camera parameters are adjusted to match these two coordinates with each other. This will be referred to as calibration.

Particularly, AR based navigation may obtain a good result based on that calibration should be performed in a state that a camera is fixed.

However, if navigation is applied to a vehicle, a position of a camera installed in a vehicle is easily changed due to movement and vibration characteristics of the vehicle. For this reason, since it is difficult to fix the camera installed in the vehicle, it is difficult to perform AR view rendering through AR based navigation. Also, since a camera which captures an image in front of a vehicle in real time to provide AR based navigation is a camera built in a portable XR device, it is required to initially adjust the camera. Particularly, since the camera frequently moves while the vehicle is driving, camera adjustment, that is, calibration is required more frequently.

The present disclosure is intended to display AR objects on a proper position of a camera preview by performing calibration using sensor information of the XR device or information of a camera view to provide AR based navigation.

The present disclosure is intended to automatically perform calibration based on lanes and a vanish point.

The present disclosure is intended to allow a driver to sufficiently make sure of a road screen from a camera preview by cropping an obstacle element, for example, bonnet, which is displayed on a screen, during calibration.

A vehicle described in the present disclosure means a vehicle driving on a road, and may be a concept that includes a car and a motorcycle. Hereinafter, a vehicle will be described based on a car.

In the following description, a left side of a vehicle means a left side of a driving direction of the vehicle, and a right side of the vehicle means a right side of the driving direction of the vehicle.

A road means a way where vehicles move. For example, the road may include various types of roads such as highway, national road, local road, expressway, and driveway. Also, the road may include one or more lanes. The lane may correspond to a road space identified through lines displayed on a road surface. That is, the lane may be identified by left and right lines adjacent thereto. Also, the lines may be understood as various types of lines such as solid lines marked with white, blue or yellow on a road surface, or dotted lines. A line region may include a region that includes lines within a driving image or a region corresponding to the lines.

Figure 24:
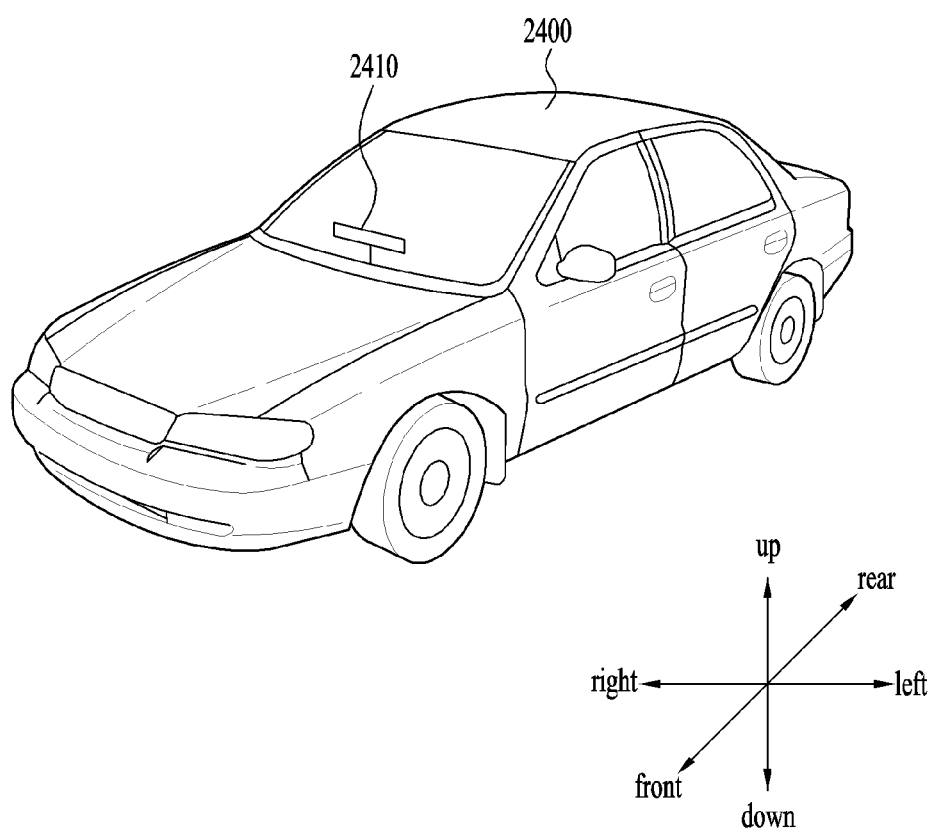
FIG. 24 illustrates an external appearance of a vehicle comprising an XR device according to one embodiment of the present disclosure.

FIG. 24 illustrates an external appearance of a vehicle comprising an XR device according to one embodiment of the present disclosure.

Referring to FIG. 24, a vehicle 2400 includes an XR device 2410 that provides a user with AR based navigation.

In the present disclosure, a device that provides AR based navigation will be referred to as an XR device 2410.

The XR device 2410 that provides AR based navigation according to the embodiments may be implemented as a head-up display (HUD) provided in a vehicle, a smart glass, an HMD, a smart phone, a wearable device, a tablet PC, etc.

In one embodiment, the XR device 2410 of the present disclosure is arranged in the vehicle 2400. In this case, the arrangement position of the XR device 2410 may be set in various ways in accordance with embodiments. The XR device 2410 according to the embodiments may be arranged below a front window of the vehicle 2400 (see FIG. 24) or may be arranged in a bonnet, etc.

Figure 25:
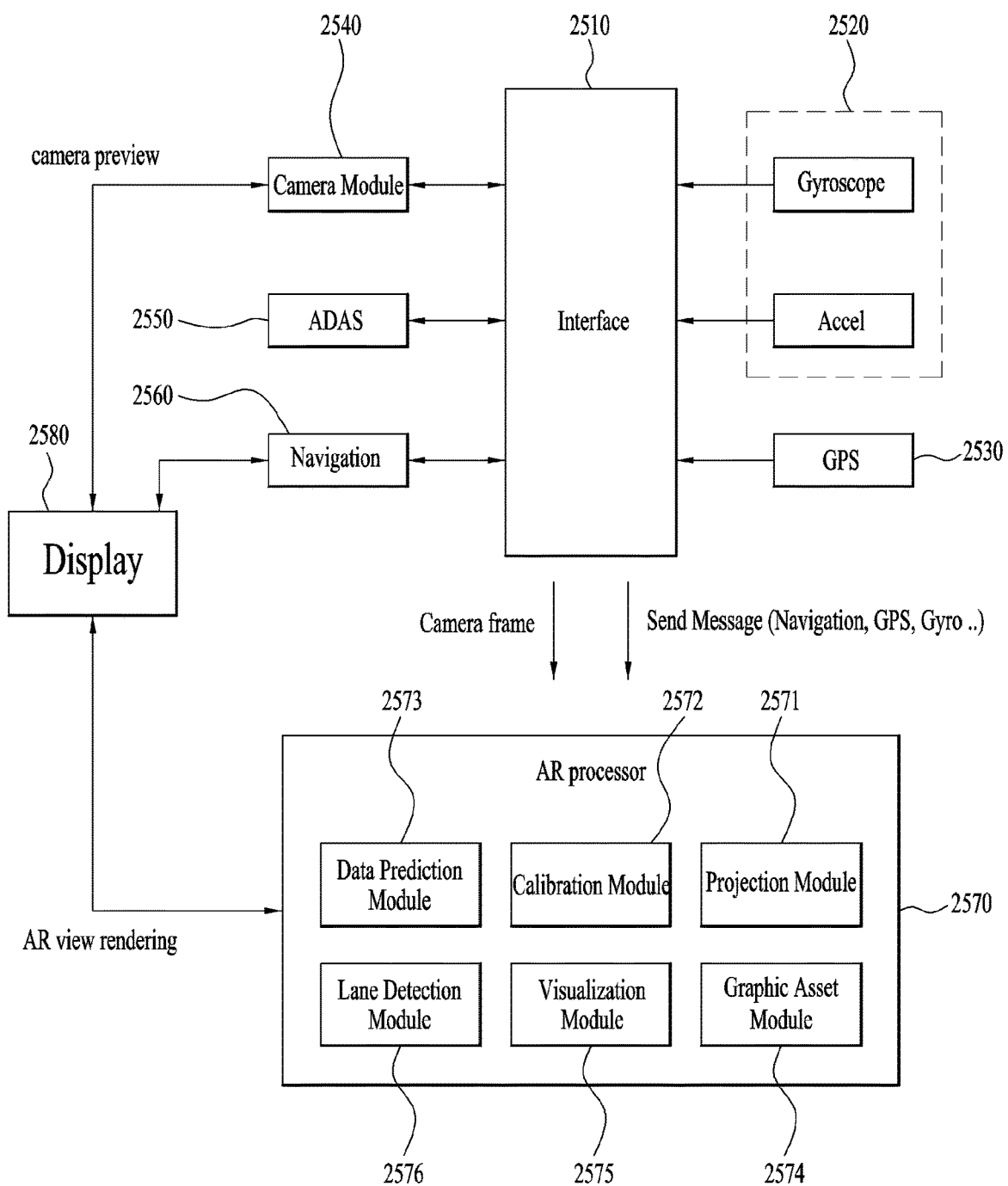
FIG. 25 is a schematic block view illustrating one embodiment of an XR device for providing AR based navigation in accordance with the present disclosure.

FIG. 25 is a schematic block view illustrating one embodiment of an XR device for providing AR based navigation in accordance with the present disclosure.

In one embodiment, the XR device 2410 includes an interface module 2510, a sensing module 2520, a GPS module 2530, a camera module 2540, an advanced driver assistance system (ADAS) module 2550, a navigation module 2560, an AR processor 2570, and a display module 2580. Some blocks in FIG. 25 may be deleted, modified, and added within the scope of the present disclosure in accordance with the need of a person with ordinary skill in the art.

In one embodiment, the AR processor 2570 includes a projection module 2571, a calibration module 2572, a data prediction module 2573, a graphic asset module 2574, a visualization module 2575, and a lane detection module 2576. Some blocks in the AR processor 2570 may be deleted, modified, and added within the scope of the present disclosure in accordance with the need of a person with ordinary skill in the art.

The interface module 2510 according to the embodiments is connected with the sensing module 2520, the GPS module 2530, the camera module 2540, the ADAS module 2550, the navigation module 2560, and the AR processor 2570, which are provided in the XR device 2410, by a wire or wireless mode to transmit and receive information for AR based navigation to and from each other. To this end, the interface module 2510 may be provided as at least one of a communication module, a terminal pin, a cable, a port, a circuit, an element, and a device. The interface module 2510 may receive a user input required to perform calibration and/or obstacle element crop.

The sensing module 2520 according to the embodiments may include a gyroscope sensor and an acceleration sensor. This is one embodiment, and the sensing module 2520 may further other sensors that may sense movement of the XR device and/or the vehicle. For example, the sensing module 2520 may further include an inclination sensor, a radar sensor, an infrared sensor, an ultrasonic sensor, a depth sensor, an image sensor, and a wheel sensor.

The sensing module 2520 may sense movement of the vehicle 2400 and/or movement of the XR device 2410 from various types of sensors (acceleration sensor, gyroscope sensor, inclination sensor, radar sensor, infrared sensor, ultrasonic sensor, depth sensor, image sensor, wheel sensor, etc.) in real time, and provides sensing information to the interface module 2510.

In one embodiment, the sensing information provided by the sensing module 2520 is used as a reference of coordinate transformation when geographic information is acquired from the navigation module 2560 and output to the screen in accordance with a current position and a current direction during AR based navigation.

The GPS module 2530 acquires a position of the vehicle based on a signal generated from the GPS and provides the acquired position to the interface module 2510.

In one embodiment, the camera module 2540 includes one or more cameras, and at least one of the cameras is arranged in a position where the front of the vehicle may be captured for AR navigation. For example, at least one camera that may capture the front of the vehicle may be a camera built in the XR device 2410, or may be a camera arranged toward the front of the vehicle separately from the XR device 2410. For another example, at least one camera that may capture the front of the vehicle may be a camera built in a black box. In one embodiment of the present disclosure, at least one camera that may capture the front of the vehicle is built in the XR device 2410. At least one camera may be a stereo camera. At least one camera may include one or more lenses, or one or more image sensors. At this time, a camera parameter of at least one camera that may capture the front of the vehicle may be a parameter constituting a camera matrix which is information indicating a relation of a real space formed on a photo.

The ADAS module 2550 is referred to as an intelligent driver assistance system, and notifies various unexpected situations generated when a driver drives a car, by using an alarm, etc. The ADAS module includes functions of automatic emergency braking (AEB), forward collision avoidance assistance (FCA), forward collision warning (FCW), lane departure avoidance (LKA), lane departure warning (LDW), lane follow assistance (LFA), lane keeping aid support system (LKAS), active blind spot detection (ABSD), around view monitoring (AVM), low beam control assistance (LBA), driver attention warning (DAW), smart cruise control (SCC), etc. Since the functions of the ADAS continue to be advanced in accordance with the development of technologies, they are not limited to the aforementioned examples.

For the ADAS functions according to the embodiments, the cameras of the camera module 2540 may additionally be provided in a side mirror, front/rear bumpers of a car, etc., and the sensing module 2520 may further include an ultrasonic sensor, a long/short distance radar sensor, a yawing rate sensor, a lateral acceleration sensor, a wheel speed sensor, a steering angle sensor, and a LIDAR sensor, which are provided in front/rear bumpers of the car. That is, the cameras of the camera module 2540 may be arranged in a position capable of making sure of a field of view in the vehicle to capture the outside of the vehicle, and the LIDAR of the sensing module 2520 may generate information on an object outside the vehicle by using laser lights. That is, the ADAS module 2550 actively handles a risk status of a driver and the vehicle by analyzing position information, image information and sensing information, which are provided from the GPS, the cameras and the sensors provided in the vehicle and/or the SR device 2410.

The navigation module 2560 provides navigation information for driving of the vehicle to the interface module 2510. To this end, the navigation module 2560 may include a memory that stores map information and provides the map information to the interface module 2510 if necessary.

In one embodiment, the memory stores map information indicating topography (mountain, stream, river, way, etc.) according to position and landmark (bridge, tunnel, building, road). In this case, the map information may be stored in the form of a two-dimensional map or a three-dimensional map. Also, the map information may include a curvature of a road, a grade or altitude of a road, a shape of a road (for example, elevated road, underground road, rotary road, one-way road, etc.), a speed limit of a road, and the presence of a speed bump. The memory that stores map information may include at least one storage medium of a flash memory type, a hard disk type, a multimedia card micro type, a card type memory (for example, SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. However, the memory is not limited to these examples, and may be implemented in another random form known in the art.

The navigation module 2560 may be connected to an external server by a wireless mode, or may be connected to an external device by a wire mode through a cable, whereby the map information stored in the memory may be updated. The navigation information provided from the navigation module 2560 to the interface module 2510 may further include a destination set by a user and path information according to the destination.

In one embodiment, the interface module 2510 transmits information provided from at least one of the sensing module 2520, the GPS module 2530, the camera module 2540, the ADAS module 2550, and the navigation module 2560 to the AR processor 2570 to perform calibration and AR based navigation. For example, when a camera frame acquired from the camera module 2540 may be provided to the AR processor 2570 and therefore used when a vanish point is acquired. Also, the information acquired from the sensing module 2520, the GPS module 2530, the ADAS module 2550, and the navigation module 2560 may be transmitted to the AR processor 2570 in the form of a message.

In one embodiment, the AR processor 2570 outputs virtual objects, which will be overlapped on an image (that is, reality world actually viewed by a user) of a real space, to the display module 2580 to provide AR based navigation. In one embodiment, the information for guiding a path to a user or information related to a road in the virtual objects is implemented in the form of computer graphics (CG) or text message. In one embodiment, the AR processor 2570 performs calibration automatically or manually. In addition, in one embodiment, an obstacle element, for example, a vehicle bonnet is automatically or manually detected during calibration and then cropped.

To this end, the AR processor 2570 may electrically be connected with the interface module 2510 to exchange information with the interface module 2510. Also, the AR processor 2570 may include a separate memory to perform the aforementioned calibration and/or obstacle element crop, or may use the memory of the navigation module 2560. The AR processor 2570 may include a projection module 2571, a calibration module 2572, a data prediction module 2573, a graphic asset module 2574, a visualization module 2575, and a lane detection module 2576, and may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, and microprocessors.

In one embodiment, the projection module 2571 receives a road image of the real space acquired by the camera module 2540 through the interface module 2510, and projects a virtual object such as AR carpet on a road of the real space.

The calibration module 2572 performs camera calibration manually or automatically. An AR mode, a map mode and a method for performing calibration manually or automatically according to the present disclosure will later be described in detail.

The data prediction module 2573 predicts a path to a destination input by a driver and provides the predicted path information to the display module 2580.

The graphic asset module 2574 generates virtual objects such as AR carpet displayed to guide a path or virtual objects that include information related to a road, or externally receives the virtual objects, and then stores the virtual objects therein.

The visualization module 2575 visualizes the virtual objects stored in the graphic asset module 2574 and provides the visualized virtual objects to the display module 2580.

The lane detection module 2576 detects one or more lanes in front of the vehicle to obtain a vanish point. Particularly, in one embodiment, the lane detection module 2576 detects one or more lanes by using the image captured by the camera module 2540 and determines a point where one or more lanes meet, as a vanish point.

In one embodiment, the navigation mode of the present disclosure is performed as an AR mode or a map mode to guide a driving path to a destination set by a driver. The AR mode is a mode for displaying a lane, a progress direction, etc. by overlapping the lane, the progress direction, etc. using virtual objects on the road of the real space acquired by the camera module 2540. The map mode is a mode for displaying a lane, a progress direction, etc. in a graphic image on a map.

In one embodiment of the present disclosure, camera calibration is performed by using the camera provided in the portable XR device to provide AR based navigation.

In one embodiment of the present disclosure, calibration is performed based on a vanish point. In one embodiment of the present disclosure, calibration is performed manually or automatically.

In one embodiment, a driver may manually perform calibration prior to driving of the vehicle to operate the navigation mode in the AR mode. That is, in one embodiment, if the driver inputs a user command (e.g., menu selection, keyboard input, icon selection, etc.) for performing calibration, a screen for calibration is displayed on the display module 2580.

Figure 26:
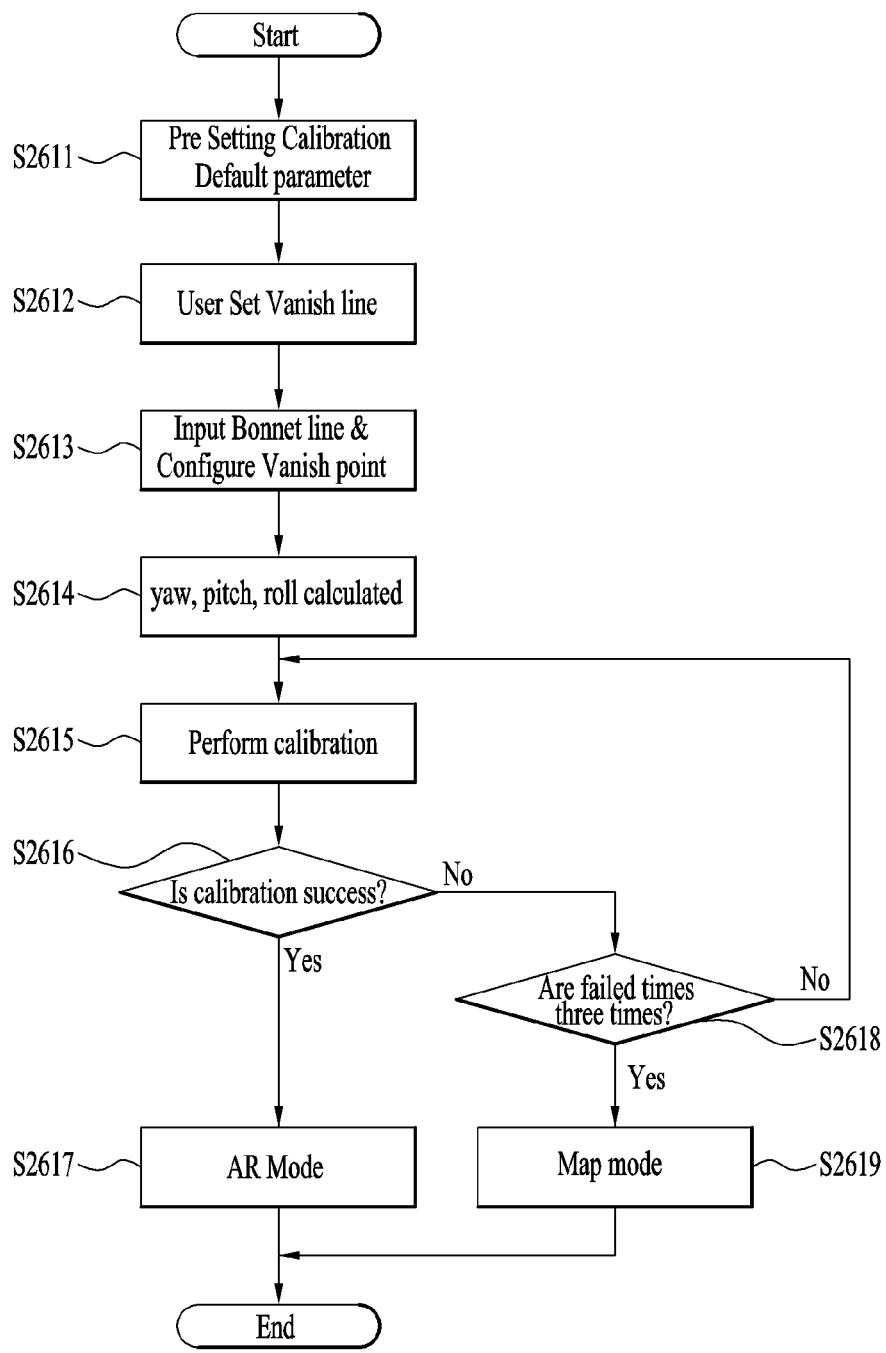
FIG. 26 is a flow chart illustrating a method for manually performing calibration in accordance with one embodiment of the present disclosure.

FIG. 26 is a flow chart illustrating a method for manually performing calibration in accordance with one embodiment of the present disclosure.

FIGS. 27(a) and 27(b) illustrate one example of a calibration guide screen when a navigation mode is set in a horizontal mode and one example of a calibration guide screen when a navigation mode is set in a vertical mode in the XR device 2410. In this case, switching of the horizontal mode and the vertical mode may be selected through a specific button, a menu, an icon, etc. Alternatively, the horizontal mode or the vertical mode may previously be fixed, or switching of the horizontal mode or the vertical mode may be performed automatically in accordance with rotation of the XR device.

FIGS. 28(a) to 28(d) illustrate examples of a calibration guide screen, an AR mode and a map mode, which are displayed on the display module 2580 when the navigation mode of the XR device according to the present disclosure is set in a vertical mode.

That is, if a user input for manually performing calibration is input from a driver, the AR processor 2570 controls the display module 2580 to display a calibration guide screen such as FIG. 27(a) or (b) or FIG. 28(a), and displays preset calibration default parameters (S2611). A vehicle front (that is, real space) acquired by the camera module 2540 is displayed on the calibration guide screen together with preset calibration default parameters. For example, a guide message such as 'AR mode is automatically executed if the vehicle drives after a camera screen is synchronized along a bottom line' may be displayed on the calibration guide screen. A content of the guide message in FIG. 27 is an example for assisting understanding of the present disclosure, and may be changed in accordance with a person with ordinary skill in the art, whereby the guide message for configuring a vanish point is not limited to the embodiment of FIG. 27. In one embodiment of the present disclosure, the guide message is displayed in the form of pop-up. In another embodiment of the present disclosure, the guide message may be output in the form of voice.

The driver sets a vanish line for configuring a vanish point in accordance with the guide message of the calibration guide screen such as FIG. 27(a) or 27(b) or FIG. 28(a) (S2612). In one embodiment, the vanish line is horizontally displayed in a specific position of the calibration guide screen, and is movable up and down by the driver.

The driver inputs a bonnet line, adjusts the vehicle to the center based on the bonnet line and then moves the vanish line up and down to set the vanish point (S2613). For example, as shown in FIG. 27(a) or 27(b) or FIG. 28(a), the camera of the camera module 2540 is adjusted to match a vertical line vertically displayed in a specific position of the bonnet line with the center of the vehicle.

Subsequently, the AR processor 2570 obtains a coordinate system transform matrix by calculating a yaw direction rotation angle, a pitch direction rotation angle, and a roll direction rotation angle of at least one camera for AR based navigation based on the sensing information provided from the sensing module 2520 (S2614).

The calibration module 2572 performs camera calibration based on the vanish point determined in the step S2613 and the coordinate system transform matrix acquired in the step S2614 (S2615).

Calibration of the step S2615 is a procedure of matching a coordinate of a screen where an image captured by at least one camera is displayed with a coordinate of an AR object overlapped on the coordinate of the screen such that AR based virtual objects may be displayed on a proper position of a camera preview.

If calibration is performed in the step S2615, the calibration module determines that the calibration has been successfully performed (S2616). If two coordinates are matched with each other in the step S2615, the calibration module determines that the calibration has been successfully performed. If not so, the calibration module determines that the calibration has been failed.

If it is determined that the calibration has been successfully performed in the step S2616, as shown in FIG. 28(b) or FIG. 28(c), the navigation mode is switched to the AR mode (S2617). At this time, the display module 2580 may be switched to the AR mode while providing a guide message, which may recognize success of the calibration such as 'a position and an angle of a camera are completely set. Guide is started', in the form of pop-up or voice. If the navigation mode is switched to the AR mode, AR based virtual objects for assisting driving of the driver are displayed to be overlapped on a real road in front of the vehicle, which is acquired by the camera module 2540.

FIG. 28(b) illustrates that AR carpet is displayed on a straight road of the real space as a virtual object. FIG. 28(c) illustrates that an arrow shape is displayed on a real road as a virtual object to guide a vehicle of a driver to turn left.

In FIG. 28(c), the virtual object of the AR carpet may be displayed together with the virtual object of the arrow shape. The AR carpet provided by AR based navigation denotes a carpet type AR object for guiding a path displayed on a road where the vehicle is located.

In the present disclosure, the AR carpet may be displayed by setting a color or shape differently depending on a moving direction of the vehicle, for example, straight movement, right turn, left turn, U-turn, etc. Also, the AR carpet may be displayed by setting a color or shape differently even in case of overspeeding of a corresponding vehicle or a guard zone in front of a school. For another example, if a driving guide line is drawn on a real road, AR carpet displayed at the same position as the road may be displayed in the same color as that of the driving guide line.

That is, the AR processor 2570 provides a driver with a navigation function with reality by displaying a virtual object such as a carpet on a real road based on image information of the real space acquired by the camera module 2540, movement information of the vehicle sensed from the sensing module 2520, and position information of the vehicle acquired from the GPS module 2530.

If it is determined that the calibration has been failed in the step S2616, it is checked whether failed times have reached preset reference times (S2618). In one embodiment of the present disclosure, three times may be set as reference times for calibration reattempt. In this case, since the reference times may easily be changed by the person with ordinary skill in the art, the present disclosure is not limited to the aforementioned embodiment.

If the calibration failed times do not reach three times in the step S2618, the step S2615 is performed to reattempt calibration.

If the calibration failed times reach three times in the step S2618, the current mode may be switched to the map mode automatically, or may selectively be switched to the map mode in accordance with an input of a user.

For example, if it is determined that the failed times have reached three times in the step S2618, a guide message such as 'camera setup has been failed three times. Do you want to be guided a path in a map mode?', a selection message (or menu or icon) such as 'reattempt' and 'switching to map mode' are displayed on the display module 2580. If the user selects 'reattempt', the calibration may be reattempted, and if the user selects 'guide to the map mode', the current mode may be switched to the map mode.

Also, when calibration attempt times are less than three times, reattempt times or the failed times may be displayed whenever the calibration is reattempted, whereby the driver may recognize calibration reattempt times.

If the failed times reach three times in the step S2618 and the user selects 'switching to the map mode', the step S2619 is performed, whereby the navigation mode is switched to the map mode as shown in FIG. 28(d).

As described above, according to the present disclosure, when the driver manually performs calibration, an optimal position for providing navigation in an AR mode is guided to the driver and a guide for camera screen adjustment is provided to the driver. Particularly, in case of manual calibration, the driver sets a center line and a bonnet line such that the driver's vehicle is arranged at the center. If the calibration is failed, for example, if calibration including calibration reattempt is failed three times, the map mode (that is, normal navigation mode) is performed. If the calibration is successfully performed, the AR mode is performed.

Figure 29:
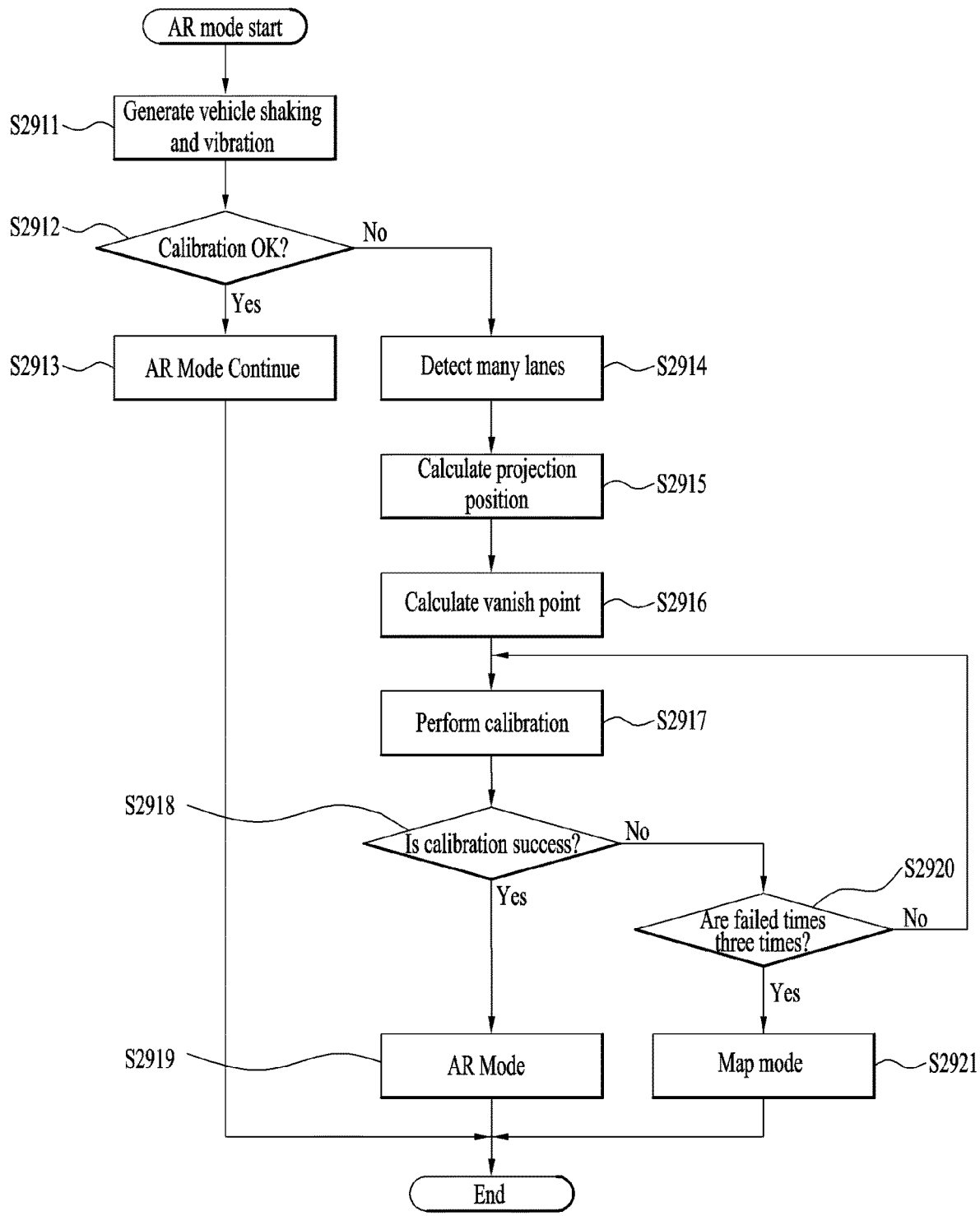
FIG. 29 is a flow chart illustrating a method for automatically performing calibration in accordance with one embodiment of the present disclosure.

FIG. 29 is a flow chart illustrating a method for automatically performing calibration in accordance with one embodiment of the present disclosure. Particularly, FIG. 29 illustrates that calibration is automatically performed while a vehicle is driving in a state that a navigation mode is set in an AR mode.

Figure 30:
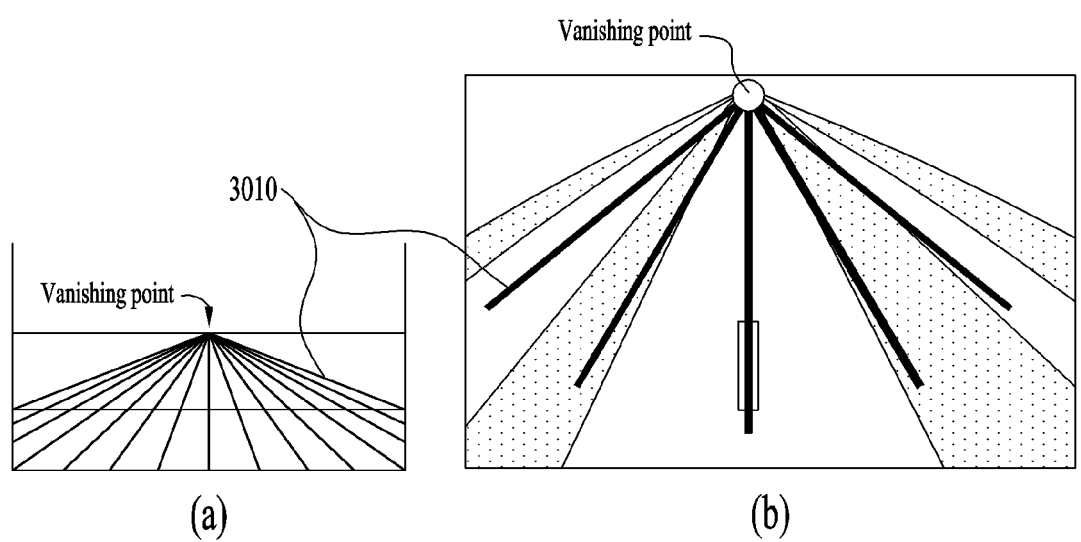
FIG. 30 illustrates examples of detecting lanes and acquiring a vanish point based on the detected lanes to automatically perform calibration.

FIGS. 30(a) and 30(b) illustrate examples of detecting lanes 3010 and acquiring a vanish point based on the detected lanes 3010 to automatically perform calibration. Even in case of an automatic mode, calibration may be performed in a horizontal mode or a vertical mode of the XR device, and AR based navigation may be provided.

In one embodiment, automatic calibration may be applied before release of the XR device, before a driver drives a vehicle, or while a vehicle is driving. Manual calibration or automatic calibration may be set, by a user, using a menu, an icon, a button, a guide message, etc., or may be set in any one mode which is set as a default when the XR device is released.

In addition, selection of an AR mode and a map mode may display a mode switch button (or icon) on a specific position of a navigation screen, and may alternately switch the AR mode and the map mode whenever the driver (or user) pushes the above button. In one embodiment, if the map mode is switched to the AR mode, calibration is checked and AR based navigation is started. At this time, calibration may be performed automatically or manually.

That is, when AR based navigation is provided from the vehicle which is driving as shown in FIG. 29, if vehicle shaking or vibration occurs (S2911), it is checked whether correction through calibration is required (S2912). For example, if vehicle shaking or vibration occurs due to bump pass and therefore a camera position is changed, camera parameters previously set by calibration are changed, whereby AR objects may not be recognized by the camera module 2540 or AR objects are displayed on a wrong position of a real road acquired by the camera module 2540. At this time, in one embodiment, the AR objects are not displayed. In one embodiment, if this case continues for a preset time (e.g., n seconds), a guide message such as 'a camera position and angle readjustment are required. Do you want to reset a camera?' is displayed on the display module 2580 as shown in FIG. 31. Even in this case, a selection message (or menu or icon) such as 'switching to map mode' and 'camera reset' is displayed together with the guide message, and if the user selects 'camera reset', calibration is performed automatically, and if the user selects 'switching to map mode', the current mode may be switched to the map mode. Also, if the driver does not select any one of 'switching to map mode' and 'camera reset' until n seconds (for example, 10 seconds) pass, camera reset may be performed automatically or the current mode may automatically be switched to the map mode.

If it is checked that correction through calibration is not required in the step S2912, the AR mode is continuously maintained (S2913). That is, AR based navigation is continuously provided to the driver without switching to the map mode.

Meanwhile, if it is checked that correction through calibration is required in the step S2912 due to vehicle shaking and vibration while the vehicle is driving, for example, if the driver selects 'camera reset', the lane detection module 2576 of the AR processor 2570 detects one or more lanes from the road in front of the vehicle as shown in FIG. 31(a) or 31(b) to calculate a vanish point (S2914).

If one or more lanes are detected in the step S2914, a projection position is calculated (S2915), and the vanish point is calculated based on the detected lanes and a projection position (S2916). In one embodiment of the present disclosure, a point where lanes 3010 meet as shown in FIGS. 30(a) and 30(b) is regarded as a vanish point, and this vanish point is set to a reference point of automatic calibration. For example, a point where the detected lanes are extended to meet or a point where the detected lanes cross is set to a vanish point.

Calibration is automatically performed based on the vanish point calculated in the step S2916 and the camera frame provided from the camera module 2540 through the interface module 2510 (S2917).

Even in this case, after it is checked whether calibration has been successfully performed, the current mode is switched to the AR mode only when calibration has been successfully performed. If calibration is failed for preset times, the current mode may automatically be switched to the map mode, and may selectively be switched to the map mode in accordance with selection of the driver.

Since the step S2918 to the step S2921 include the same steps as those of FIG. 26 and perform the same operations, the steps will be understood with reference to FIG. 26 and their detailed description will be omitted herein.

After calibration is automatically performed as above, calibration is performed based on the camera frame and the vanish point to provide AR based navigation, whereby the AR objects are displayed in a proper position of the camera preview in the present disclosure.

If calibration is automatically performed as described above, a separate user input is not required for calibration.

FIG. 32(a) illustrates a navigation screen of an AR mode according to the present specification, and FIG. 32(b) illustrates an example of a guide message 3211 displayed in the form of pop-up when a camera position is changed due to vehicle shaking or vibration while the vehicle provided with navigation in an AR mode is driving and therefore calibration is required. FIG. 32(c) illustrates an example of a guide message 3212 displayed in the form of pop-up when calibration is failed for preset times, and 32(d) illustrates an example of a navigation screen of a map mode performed when a driver selects 'switching to map mode' or 'guide to map mode' in FIG. 32(b) or 32(c). In one embodiment of the present disclosure, a mini map is additionally displayed on a portion of a camera preview screen when AR based navigation is provided as shown in FIG. 32(a).

Meanwhile, in case of the vehicle, the camera preview may be covered by an obstacle element such as bonnet or dashboard. In this case, a problem may occur in that it is difficult to make sure of a screen during AR view rendering or lane recognition.

Particularly, if AR based navigation is performed using the camera provided in the portable XR device, since the camera preview is covered by the obstacle element such as bonnet or dashboard in accordance with an arrangement position of the XR device, a problem occurs in that a limited road screen may only be provided to a driver.

To solve this problem, the present disclosure is intended to allow a driver to sufficiently make sure of a road screen from the camera preview by additionally cropping (or removing) the obstacle element such as bonnet included in the camera preview when calibration is performed manually or automatically.

In the present disclosure, the obstacle element of the camera preview may manually be set and then cropped, or may automatically be cropped based on the vanish point calculated for automatic calibration. In one embodiment of the present disclosure, after the obstacle element (that is, at least a portion of bonnet) of the camera preview is removed manually or automatically, calibration is performed manually or automatically.

Figure 33:
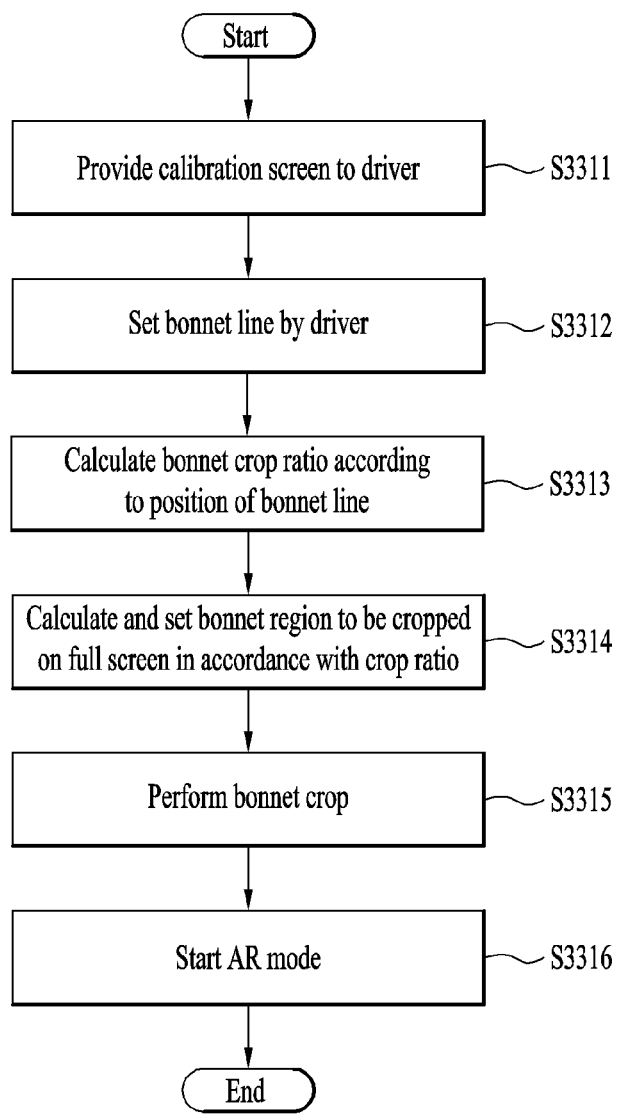
FIG. 33 is a flow chart illustrating a method for manually detecting obstacle elements of a camera preview and cropping them in accordance with one embodiment of the present disclosure.

FIG. 33 is a flow chart illustrating a method for manually detecting obstacle elements of a camera preview and cropping them in accordance with one embodiment of the present disclosure.

In the present disclosure, the obstacle element crop of the camera preview and calibration may be performed automatically or manually. Also, the obstacle element of the camera preview may be detected manually and then cropped, and calibration may be performed automatically. On the contrary, the obstacle element of the camera preview may be detected automatically and then cropped, and calibration may be performed manually.

In one embodiment of the present disclosure, for convenience of description, the obstacle element of the camera preview is manually detected and cropped and calibration is also manually performed, or the obstacle element of the camera preview is automatically detected and cropped and calibration is also automatically performed.

That is, the AR processor 2570 controls the display 2580 to display the calibration guide screen such as FIG. 27(a) or 27(b) or FIG. 28(a) if a user command for manually performing calibration is input from the driver (S3311). A vehicle front (that is, real space) acquired by the camera module 2540 is displayed on the calibration guide screen together with preset calibration default parameters.

The driver sets a bonnet line on the calibration guide screen such as FIG. 27(*a*) or 27(*b*) or FIG. 28(*a*) (S3312). Then, the driver calculates a bonnet crop ratio according to a position of the bonnet line set by the driver (S3313).

The driver calculates a bonnet region to be cropped on a full screen of the camera preview in accordance with the bonnet crop ratio calculated in the step S3313, and sets the calculated crop bonnet region for crop (S3314).

If the region to be cropped is set in the step S3314, the set bonnet region is cropped (that is, removed) (S3315). Then, the AR mode is started (S3316).

That is, in one embodiment, if at least a region of the bonnet is cropped in the step S3315, the step S2612 of FIG. 26 is performed and therefore calibration is manually performed.

In another embodiment of the present disclosure, if at least a region of the bonnet is cropped in the step S3315, the step S2911 of FIG. 29 is performed and therefore calibration is automatically performed.

Figure 34:
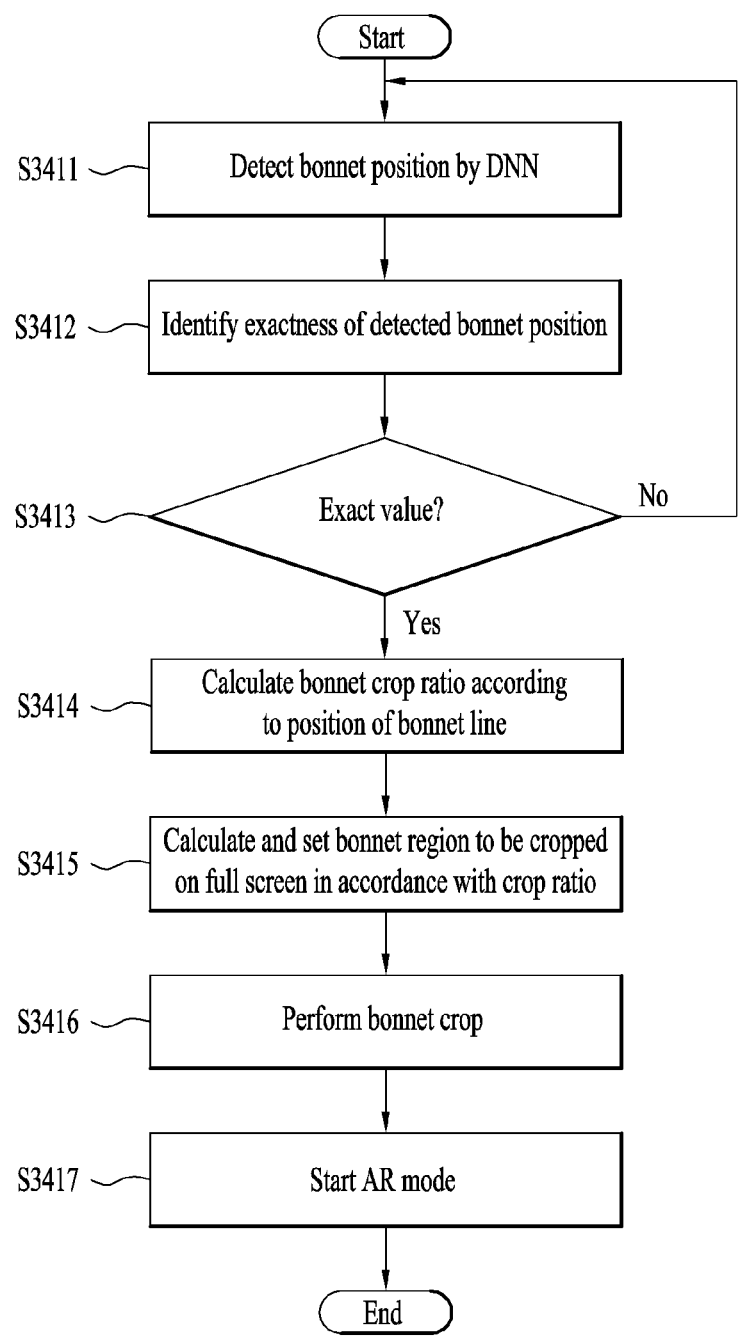
FIG. 34 is a flow chart illustrating a method for automatically detecting obstacle elements of a camera preview and cropping them in accordance with one embodiment of the present disclosure.

FIG. 34 is a flow chart illustrating a method for automatically detecting obstacle elements of a camera preview and cropping them in accordance with one embodiment of the present disclosure.

That is, a bonnet position of the vehicle is detected by a deep neural network (DNN) (S3411). Exactness of the detected bonnet position is identified (S3412).

It is checked whether the value identified in the step S3412 is exact (S3413). If it is checked in the step S3413 that the value is not exact, the step S3311 is performed and therefore the bonnet position is repeatedly detected by the DNN capable of learning position and time information. The DNN means an artificial neural network (ANN) that includes multiple hidden layers between an input layer and an output layer.

If it is checked in the step S3413 that the value is exact, the bonnet crop ratio according to the position of the bonnet line is calculated (S3414).

The bonnet region to be cropped is calculated from a full screen of the camera preview in accordance with the bonnet crop ratio calculated in the step S3414, and the calculated crop bonnet region is set for crop (S3415).

If the region to be cropped is set in the step S3415, the set bonnet region is cropped (that is, removed) (S3416). Then, the AR mode is started (S3417).

That is, in one embodiment, if at least a region of the bonnet is cropped in the step S3416, the step S2612 of FIG. 26 is performed and therefore calibration is manually performed.

In another embodiment of the present disclosure, if at least a region of the bonnet is cropped in the step S3416, the step S2911 of FIG. 29 is performed and therefore calibration is automatically performed.

In the present disclosure, as described above, in order to automatically detect and crop the obstacle elements of the camera preview and automatically perform calibration, after a vanish point and a crop position are acquired from the initial camera preview screen through an algorithm and then stored, the region to be cropped is calculated based on the vanish point and the crop position. After the calculated region is cropped, AR navigation is performed in such a manner that AR object such as AR carpet is displayed to be overlapped on the real road of the camera preview screen.

Figure 35:
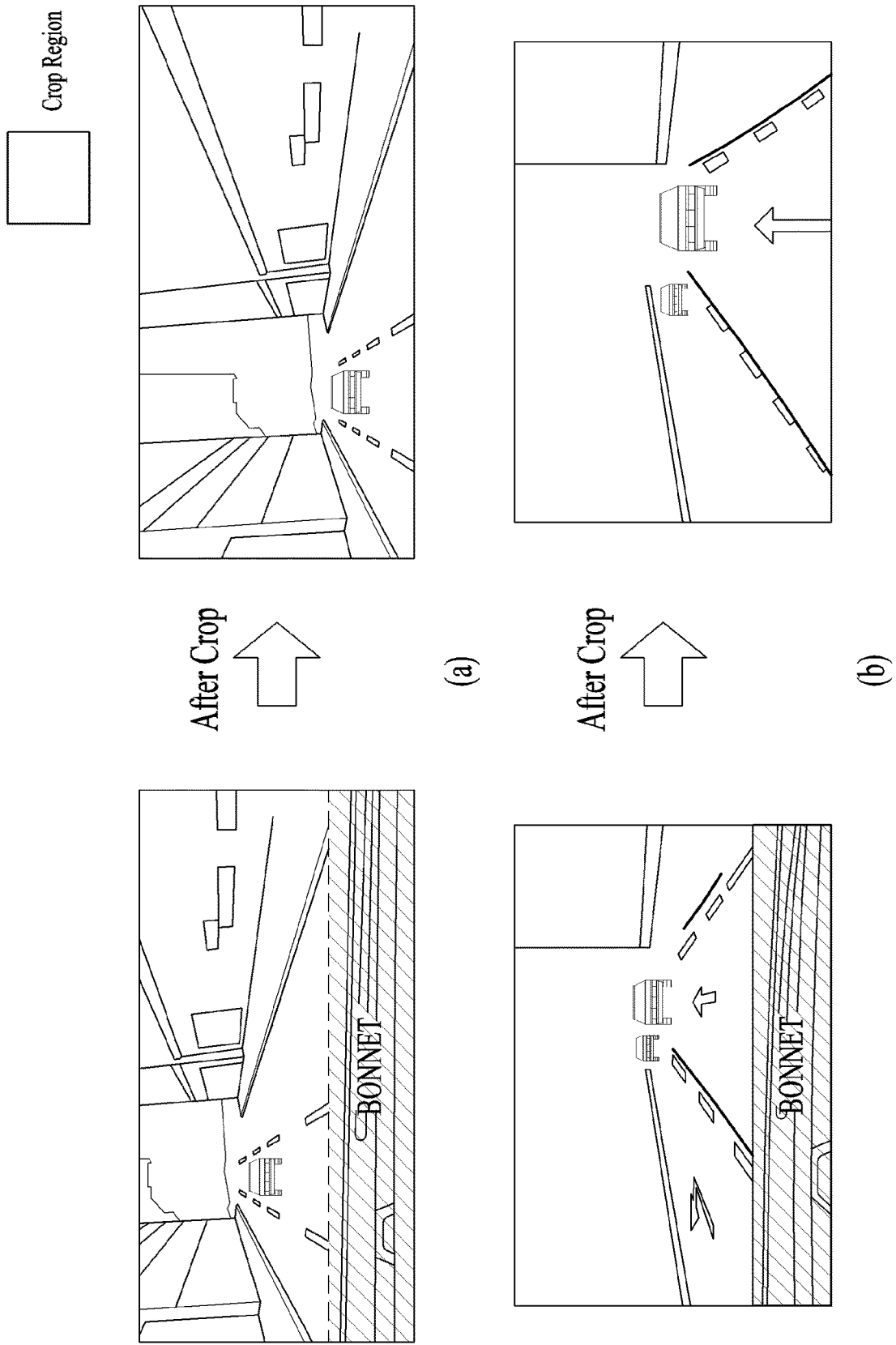
FIG. 35 illustrates that a bonnet region to be cropped is set in a full screen of a camera preview and then cropped in accordance with embodiments of the present disclosure.

FIGS. 35(*a*) and 35(*b*) illustrate that a bonnet region to be cropped is set in a full screen of a camera preview and then cropped in accordance with embodiments of the present disclosure.

As shown in FIGS. 35(*a*) and 35(*b*), the obstacle elements such as a bonnet displayed on the screen are cropped during calibration, whereby it is noted that the driver may sufficiently make sure of the road screen. That is, the driver may provide AR based navigation information to the driver by removing the obstacle element such as a bonnet from the camera screen acquired by the camera module 2540 of the portable XR device arranged in the vehicle and making sure of the screen if possible so as not to generate a region which is covered.

As described above, the bonnet screen of the camera preview is cropped and then excluded from the camera view for real AR navigation.

In one embodiment of the present disclosure, the crop region is set on the camera preview screen considering the vanish point. That is, an upper end of the region to be cropped is adjusted based on the vanish point to make sure of the screen. For example, the crop region may be adjusted based on the vanish point so as not to exclude the screen on the upper end of the camera preview.

As described above, in the present disclosure, the region to be cropped is set in the camera preview based on a relation between the vanish point manually or automatically acquired and the crop position, whereby the region may be mapped to be matched with a ratio of camera lenses and the camera preview.

In one embodiment of the present disclosure, the bonnet region to be cropped is varied depending on when the XR device provides navigation in a vertical mode and when the XR device provides navigation in a horizontal mode. Therefore, in one embodiment, the obstacle element of the camera preview is detected and cropped whenever the XR device is switched from the horizontal mode to the vertical mode or vice versa. At this time, the crop is performed on the condition that a position (or inclination) is sensed by at least one sensor of the sensing module 2520 if the position (or inclination) is changed to an angle of a specific range of the portable XR device, and an orientation value is changed. The corresponding condition may be different per XR device between y-axis and x-axis. That is, the orientation value is changed by horizontal/vertical determination based on values obtained through the sensor in the system in accordance with an inclination (position) of the XR device.

Meanwhile, in one embodiment of the present disclosure, if a user selects a navigation service to receive a road guide from the XR device, a navigation app is executed to guide vehicle arrangement of the XR device and calibration to the screen of the XR device in the form of graphic or text. The navigation application program (or navigation app) executed when the user has selected the navigation service may be installed in the XR device 2410 at the time when the XR device 2410 is released, or may be installed in the XR device 2410 after being downloaded by a request of a user. The navigation application program may be displayed on the display module 2580 in the form of menu or icon to notify the user that the navigation application program has been installed.

FIG. 36(*a*) illustrates a guide example of a method for arranging an XR device in a vehicle when a navigation app according to the present disclosure is executed, and FIG. 36(*b*) illustrates a guide example of a method for performing calibration when the XR device is arranged in a specific position of a vehicle. That is, an optimal position for using AR mode is guided to the driver, and a guide for camera screen adjustment is also provided to the driver. The guide screen of FIGS. 36(a) and 36(b) may initially be displayed just once in accordance with selection of the user, or may be displayed whenever the navigation app is executed.

Although the embodiments of the present disclosure has been described in the present specification with reference to the accompanying drawings, it will be apparent to those skilled in the art that the present disclosure can be embodied in other specific forms without departing from the spirit and essential characteristics of the disclosure. The scope of the present disclosure should be determined by reasonable interpretation of the appended claims and all modifications which come within the equivalent scope of the disclosure are included in the scope according to claims of the present disclosure. Also, the modified embodiments are therefore to be construed in all aspects as illustrative and not restrictive.

What is claimed is:

1. An extended reality (XR) device of a vehicle, the XR device comprising:
    a display configured to display, on a camera view screen, an image in front of the vehicle captured by at least one camera; and
    a processor configured to provide navigation information of an augmented reality (AR) mode by overlapping at least one virtual object on the camera view screen,
    wherein the processor is further configured to:
    set a crop region in the image displayed on the camera view screen, wherein the crop region is a region that is an obstacle to providing the navigation information to a user;
    crop the crop region from the camera view screen; and
    perform calibration based on the camera view screen in which the crop region is cropped,
    wherein guide information for the calibration is rendered on the camera view screen, and
    wherein the guide information includes a graphic user interface.

2. The XR device of claim 1, wherein the processor is further configured to set the crop region based on at least a vanish point of a road or a bonnet line of the vehicle included in the camera view screen.

3. The XR device of claim 2, wherein the processor is further configured to detect one or more lanes of the road based on the image captured by the at least one camera and determine a point where the detected one or more lanes meet, as the vanish point.

4. The XR device of claim 2, wherein the processor is further configured to determine the bonnet line of the vehicle included in the camera view screen based on a deep neural network (DNN) model capable of learning position and time information.

5. The XR device of claim 2, wherein the processor is further configured to perform the calibration for matching a coordinate of the at least one virtual object with a coordinate of the camera view screen by controlling the coordinate of the camera view screen based on the vanish point of the road and the bonnet line of the vehicle included in the camera view screen.

6. The XR device of claim 1, wherein the processor is further configured to maintain the AR mode if the calibration is successfully performed, and provide navigation information of a map mode if the calibration is failed many times.

7. The XR device of claim 1, wherein the the crop region is at least a portion of a bonnet of the vehicle included in the camera view screen.

8. A method for controlling an extended reality (XR) device of a vehicle, the method comprising:
    displaying, on a camera view screen, an image in front of the vehicle captured by at least one camera; and
    providing navigation information of an augmented reality (AR) mode by overlapping at least one virtual object on the camera view screen,
    wherein providing the navigation information comprises:
    setting a crop region in the image displayed on the camera view screen, wherein the crop region is a region that is an obstacle to providing the navigation information to a user;
    cropping the crop region from the camera view screen; and
    performing calibration based on the camera view screen in which the crop region is cropped,
    wherein guide information for the calibration is rendered on the camera view screen, and
    wherein the guide information includes a graphic user interface.

9. The method of claim 8, wherein the crop region is set based on at least a vanish point of a road or a bonnet line of the vehicle included in the camera view screen.

10. The method of claim 9, further comprising:
    detecting one or more lanes of the road based on the image captured by the at least one camera; and
    determining a point where the detected one or more lanes meet, as the vanish point.

11. The method of claim 9, further comprising:
    determining the bonnet line of the vehicle included in the camera view screen based on a deep neural network (DNN) model capable of learning position and time information.

12. The method of claim 9, wherein performing the calibration includes performing the calibration for matching a coordinate of the at least one virtual object with a coordinate of the camera view screen by controlling the coordinate of the camera view screen based on the vanish point of the road and the bonnet line of the vehicle included in the camera view screen.

13. The method of claim 8, wherein of providing the navigation information includes maintaining the AR mode if the calibration is successfully performed, and providing navigation information of a map mode if the calibration is failed many times.

14. The method of claim 8, wherein the crop region is at least a portion of a bonnet of the vehicle included in the camera view screen.

15. The XR device of claim 1, wherein the processor is further configured to control the display to display a carpet image with the navigation information depending on at least a moving direction of the vehicle or a driving guide line on the camera view screen on which the crop region is cropped and the calibration is performed.

16. The XR device of claim 1, wherein the crop region is at least a portion of a dashboard of the vehicle included in the camera view screen.

17. The XR device of claim 1, wherein the at least one camera is fixed within the vehicle to capture the image in front of the vehicle.

18. The XR device of claim 1, wherein the at least one camera is built in the XR device to capture the image in front of the vehicle.

19. The XR device of claim 1, wherein the guide information further includes a guide message in text form for guiding and adjusting an optimal position of the XR device with the at least one camera built-in.

20. The XR device of claim 19, wherein the guide information further includes a guide message for representing whether the position adjustment of the XR device succeeds.

21. The method of claim 8, further comprising:
  displaying a carpet image with the navigation information depending on at least a moving direction of the vehicle or a driving guide line on the camera view screen on which the crop region is removed and the calibration is performed.

22. The method of claim 8, wherein the crop region is at least a portion of a dashboard of the vehicle included in the camera view screen.

23. The method of claim 8, wherein the image in front of the vehicle is captured by the at least one camera that is fixed within the vehicle.

24. The method of claim 8, wherein the image in front of the vehicle is captured by the at least one camera that is built in the XR device.

25. The method of claim 8, wherein the guide information further includes a guide message in text form for guiding and adjusting an optimal position of the XR device with the at least one camera built-in.

26. The method of claim 25, wherein the guide information further includes a guide message for representing whether the position adjustment of the XR device succeeds.

* * * * *